United States Patent
Kim et al.

(10) Patent No.: US 10,334,648 B2
(45) Date of Patent: Jun. 25, 2019

(54) METHOD FOR DEVICE-TO-DEVICE COMMUNICATION IN WIRELESS COMMUNICATION SYSTEM AND APPARATUS THEREFOR

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 152 days.

(21) Appl. No.: 15/504,643

(22) PCT Filed: Aug. 18, 2015

(86) PCT No.: PCT/KR2015/008612
§ 371 (c)(1),
(2) Date: Feb. 16, 2017

(87) PCT Pub. No.: WO2016/028059
PCT Pub. Date: Feb. 25, 2016

(65) Prior Publication Data
US 2017/0245313 A1 Aug. 24, 2017

Related U.S. Application Data

(60) Provisional application No. 62/038,811, filed on Aug. 18, 2014.

(51) Int. Cl.
*H04W 76/14* (2018.01)
*H04L 1/00* (2006.01)
(Continued)

(52) U.S. Cl.
CPC .......... *H04W 76/14* (2018.02); *H04L 1/0013* (2013.01); *H04L 5/0044* (2013.01);
(Continued)

(58) Field of Classification Search
CPC ..... H04W 76/14; H04W 8/005; H04W 72/04; H04W 72/02; H04W 92/18;
(Continued)

(56) References Cited

U.S. PATENT DOCUMENTS

2015/0009910 A1* 1/2015 Ryu ...................... H04W 72/04
370/329
2015/0078279 A1* 3/2015 Ko ........................ H04W 76/14
370/329

(Continued)

FOREIGN PATENT DOCUMENTS

WO 2013162333 10/2013

OTHER PUBLICATIONS

PCT International Application No. PCT/KR2015/008612, International Search Report dated Dec. 11, 2015, 2 pages.
(Continued)

*Primary Examiner* — Will W Lin
(74) *Attorney, Agent, or Firm* — Lee, Hong, Degerman, Kang & Waimey

(57) ABSTRACT

The present specification relates to a method for transmitting and receiving data in a wireless communication system supporting device-to-device (D2D) communication. The method performed by a first terminal comprises the steps of: receiving, from a base station, a resource pool for use in D2D communication, the resource pool including at least one of a scheduling assignment (SA) resource pool indicating a resource region where SA is transmitted, and a data resource pool indicating a resource region where D2D data are transmitted; transmitting SA including information relating to D2D data transmission, to a second terminal through the SA resource pool; and transmitting D2D data to the second terminal.

10 Claims, 43 Drawing Sheets

(51) Int. Cl.
  *H04W 72/04* (2009.01)
  *H04W 72/14* (2009.01)
  *H04L 5/00* (2006.01)
  *H04L 1/18* (2006.01)

(52) U.S. Cl.
  CPC .......... *H04L 5/0053* (2013.01); *H04L 5/0092* (2013.01); *H04W 72/042* (2013.01); *H04W 72/14* (2013.01); *H04L 1/0025* (2013.01); *H04L 1/1819* (2013.01)

(58) Field of Classification Search
  CPC ............. H04W 72/0453; H04W 72/14; H04W 72/042; H04L 5/0092; H04L 5/0053; H04L 5/0044; H04L 1/0013; H04L 1/1819; H04L 1/0025
  See application file for complete search history.

(56) References Cited

U.S. PATENT DOCUMENTS

| | | | | |
|---|---|---|---|---|
| 2015/0271846 A1* | 9/2015 | Kowalski | ............... | H04W 72/14 370/329 |
| 2015/0327188 A1* | 11/2015 | Bagheri | ............... | H04W 52/383 455/426.1 |
| 2015/0327220 A1* | 11/2015 | Pan | ............... | H04W 72/042 370/329 |
| 2015/0327315 A1* | 11/2015 | Xue | ............... | H04L 5/0044 370/330 |
| 2016/0044619 A1* | 2/2016 | Ryu | ............... | H04W 76/14 370/350 |
| 2016/0183276 A1* | 6/2016 | Marinier | ............... | H04W 72/02 370/329 |
| 2017/0048908 A1* | 2/2017 | Matsumoto | ........... | H04W 76/14 |
| 2017/0150480 A1* | 5/2017 | Kim | ............... | H04W 72/02 |
| 2018/0270801 A1* | 9/2018 | Novlan | ............... | H04W 72/042 |

OTHER PUBLICATIONS

LG Electronics, "D2D Grant in Mode 1 Communication", R1-143182, 3GPP TSG RAN WG1 Meeting #78, Aug. 2014, 7 pages.

Microsoft Corporation, "Remaining issues of Mode 1 resource allocation", R1-143203, 3GPP TSG-RAN WG1 Meeting #78, Aug. 2014, 5 pages.

Fujitsu, "Further Analysis on Control Information for D2D Communication", R1-140196, 3GPP TSG RAN WG1 Meeting #76, Feb. 2014, 3 pages.

CATT, "Frequency hopping design in D2D communication", R1-142897, 3GPP TSG RAN WG1 Meeting #78, Aug. 2014, 4 pages.

* cited by examiner

[Figure 1]
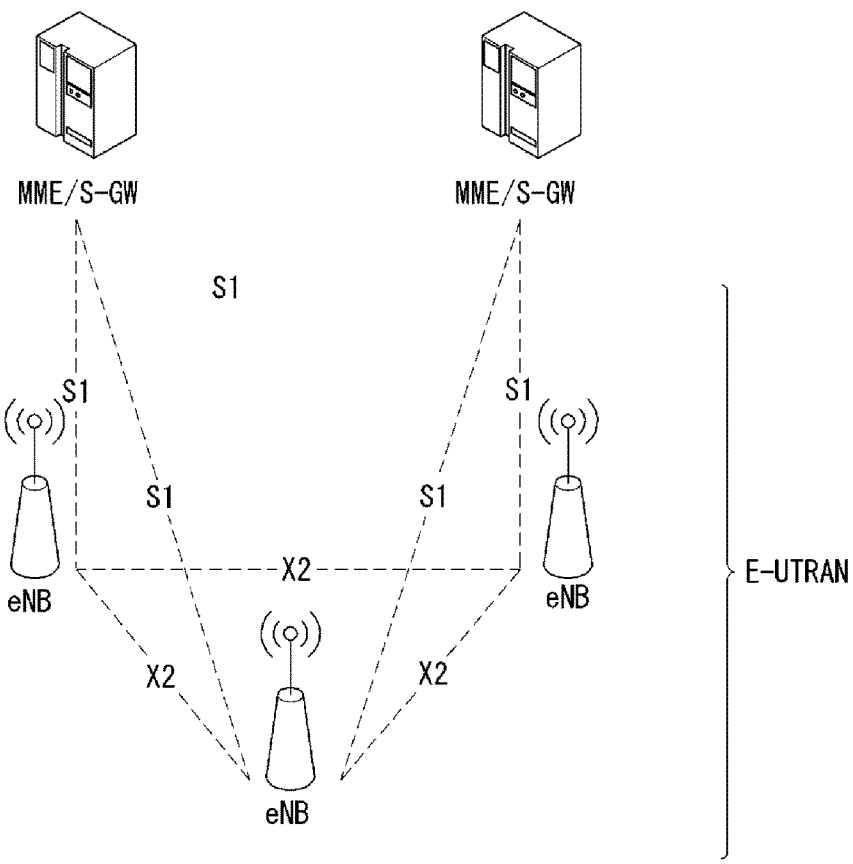
[Figure 2]
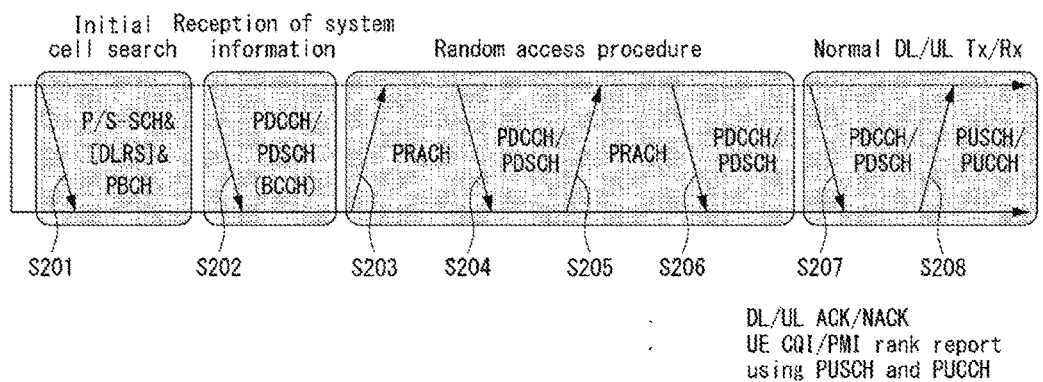

【Figure 3】
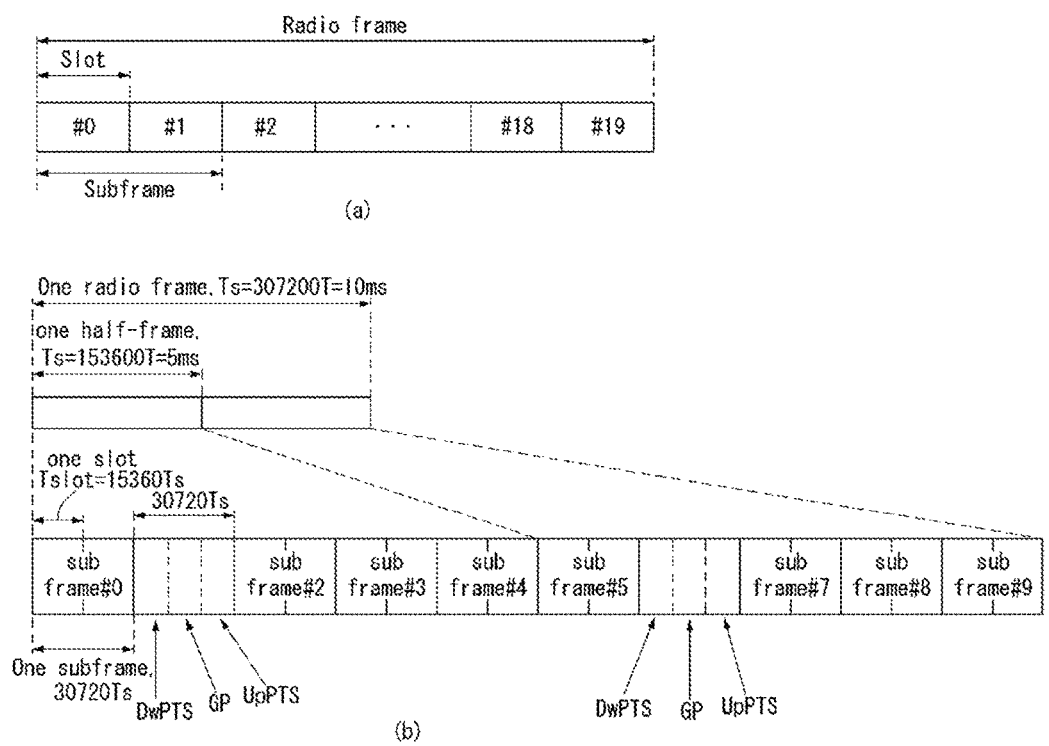

[Figure 4]
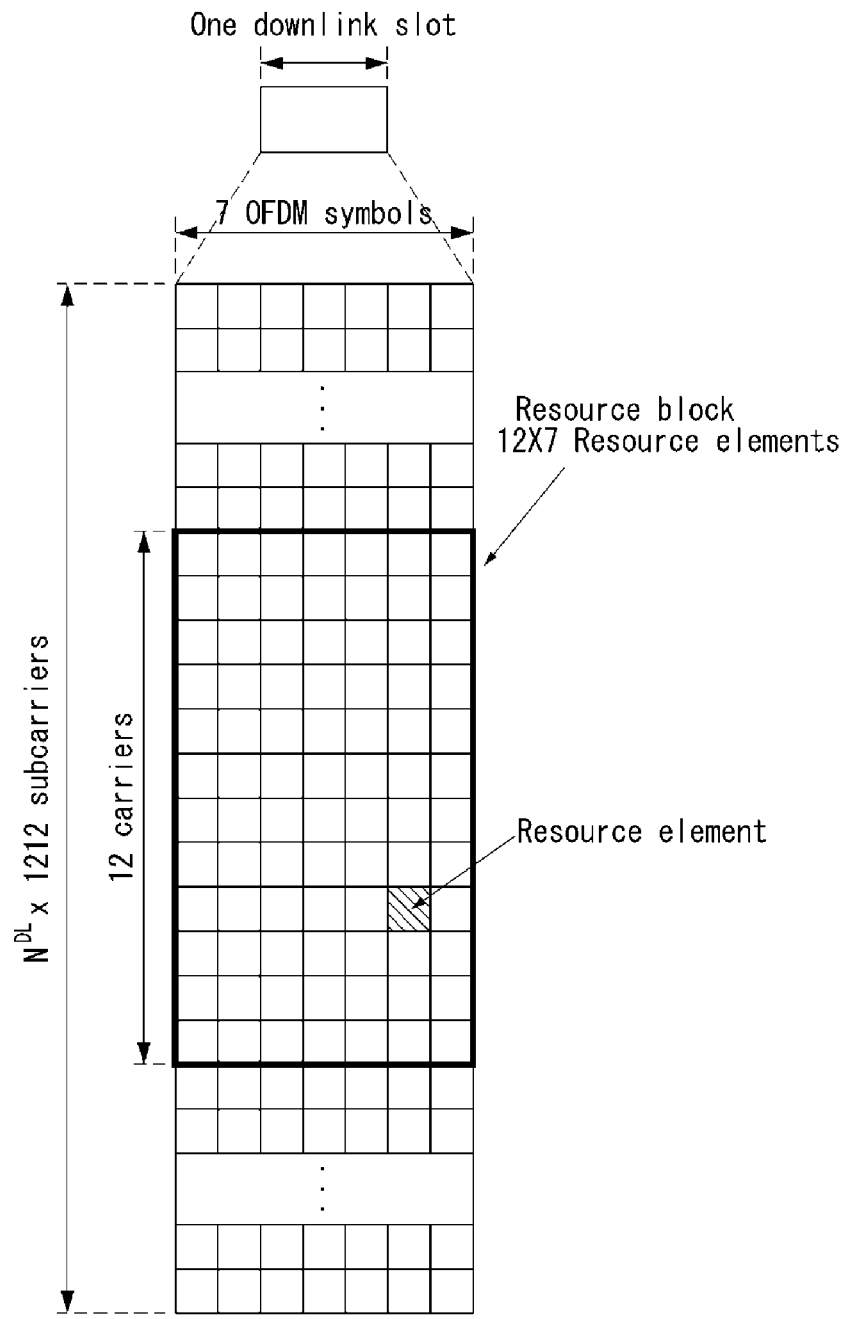

[Figure 5]
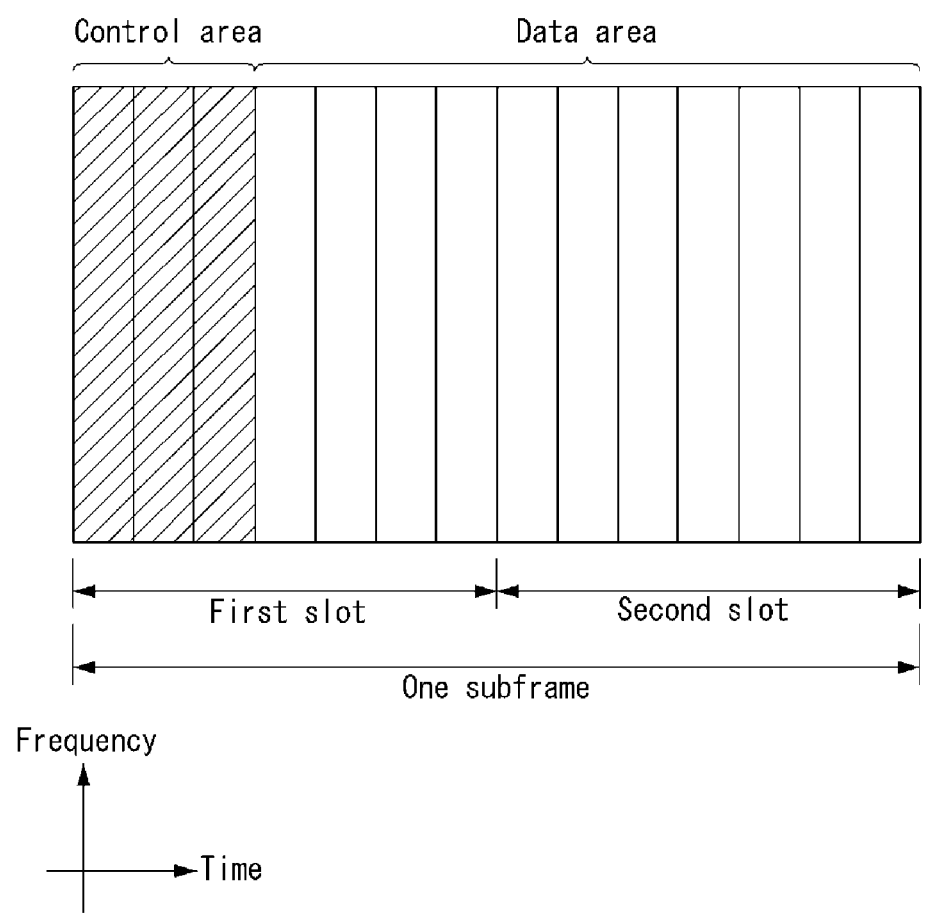

【Figure 6】
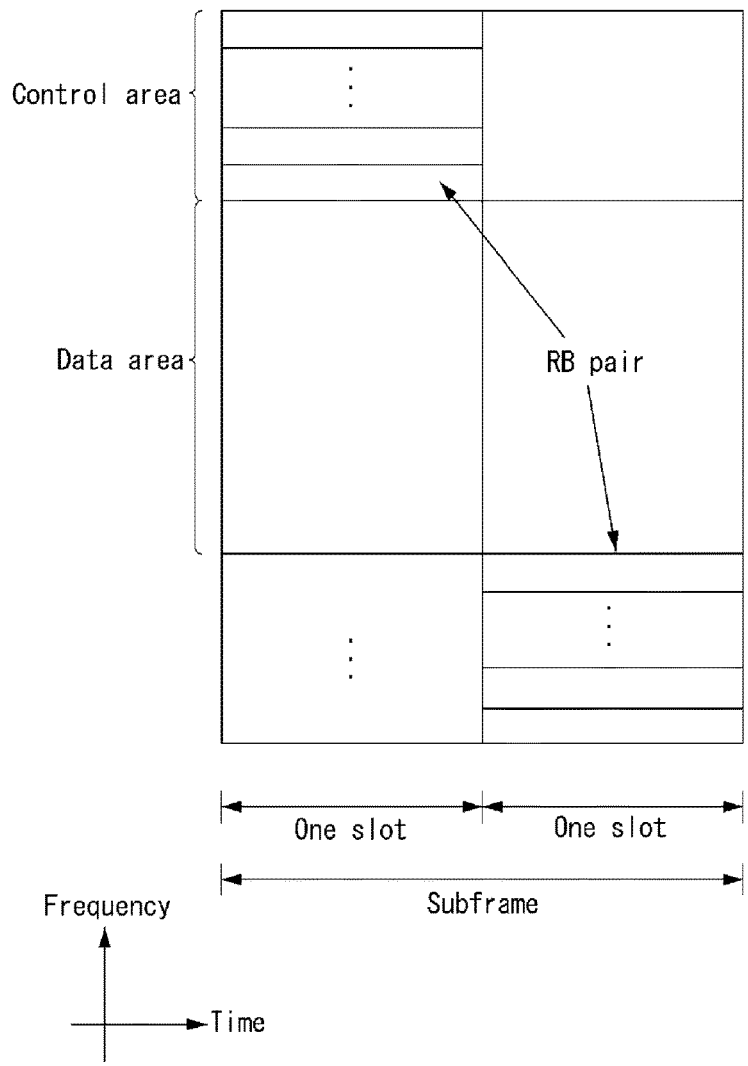
【Figure 7】
| CIF (3) | 0/1A | FH | Resource block assignment | MCS/RV (5) | NDI | TPC(2) | DM RS CS(3) | DAI(2) | CQI req. | SRS | RAT |

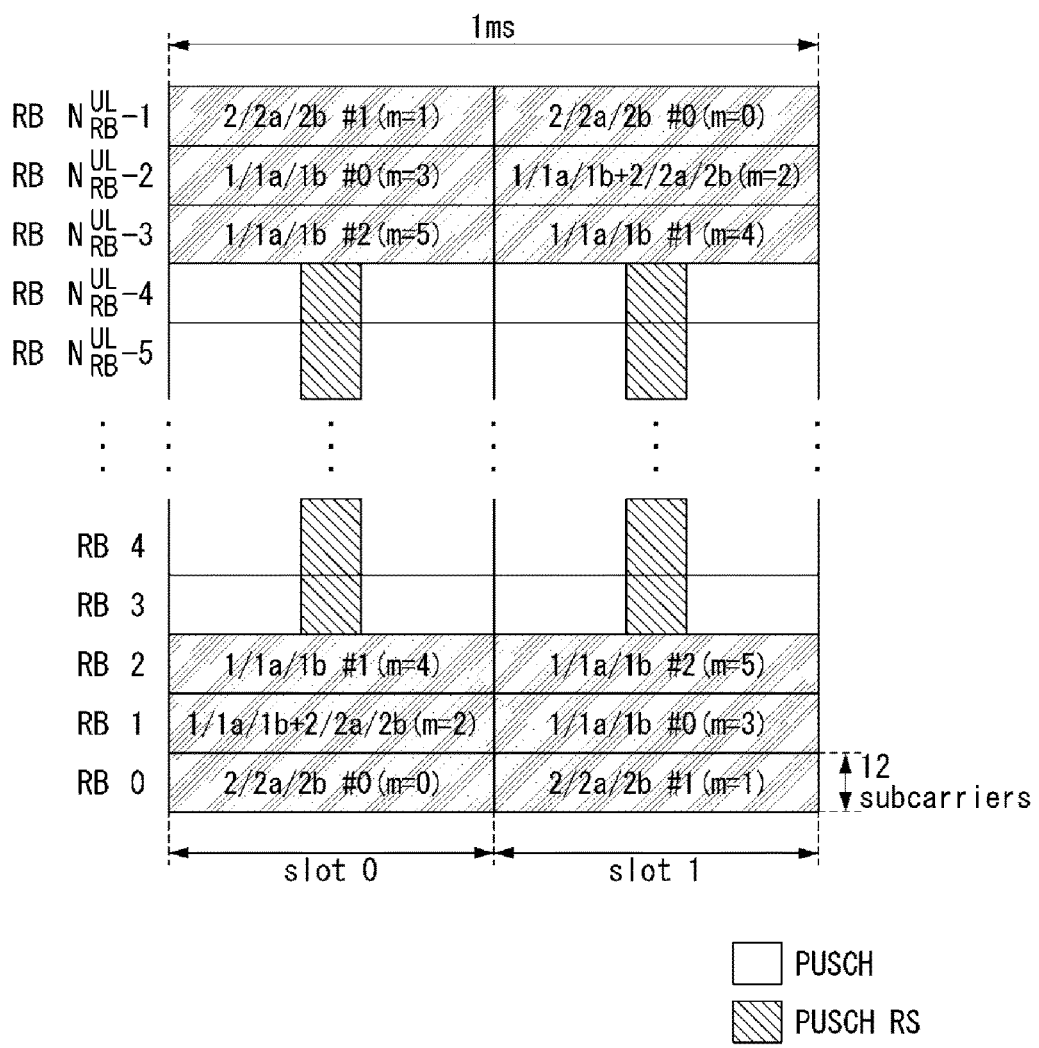
[Figure 8]

[Figure 9]
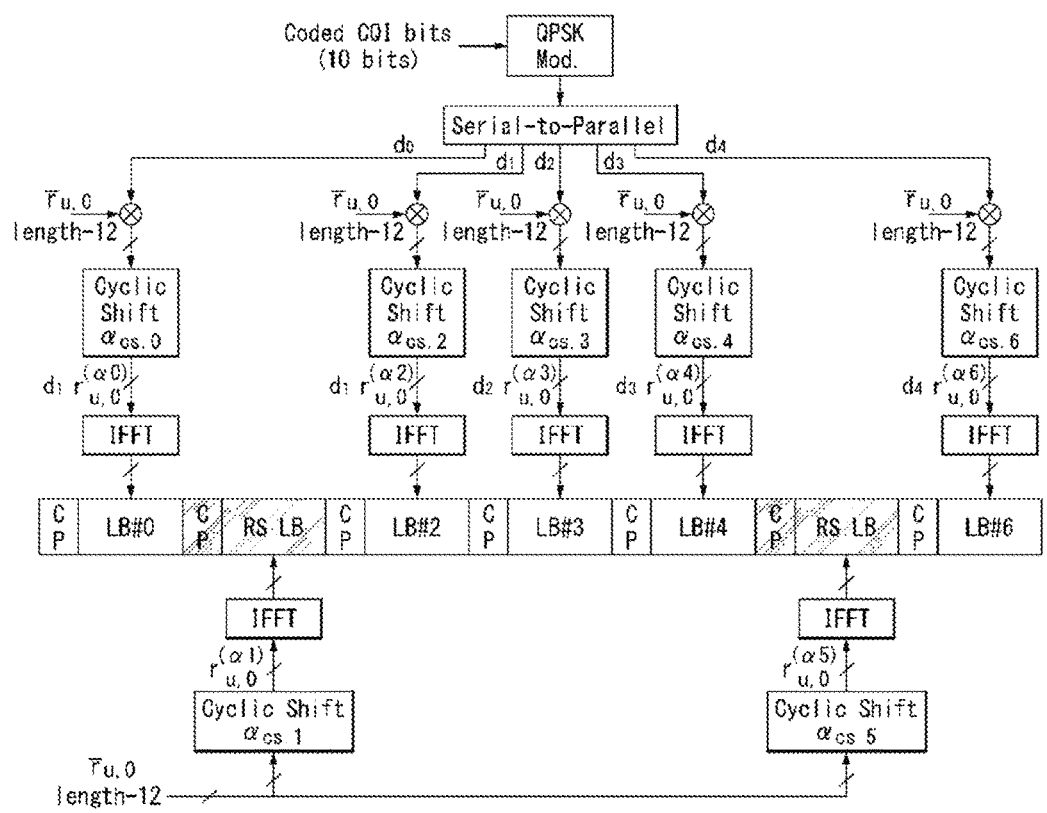

【Figure 10】
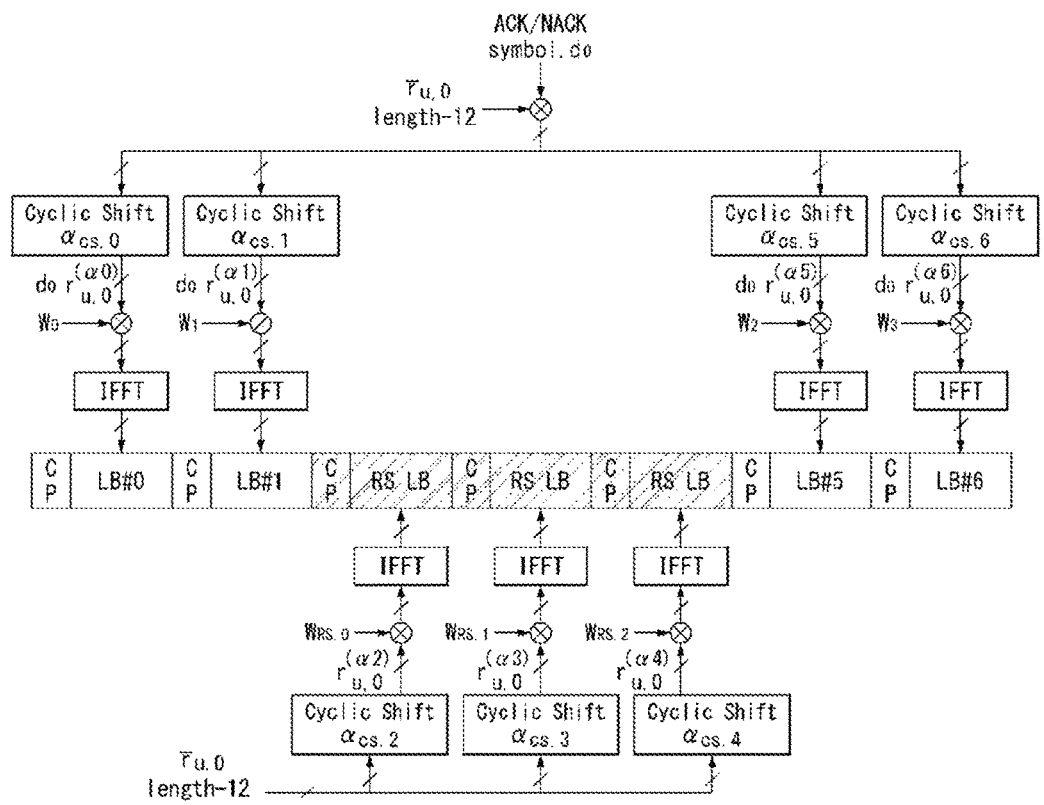
【Figure 11】
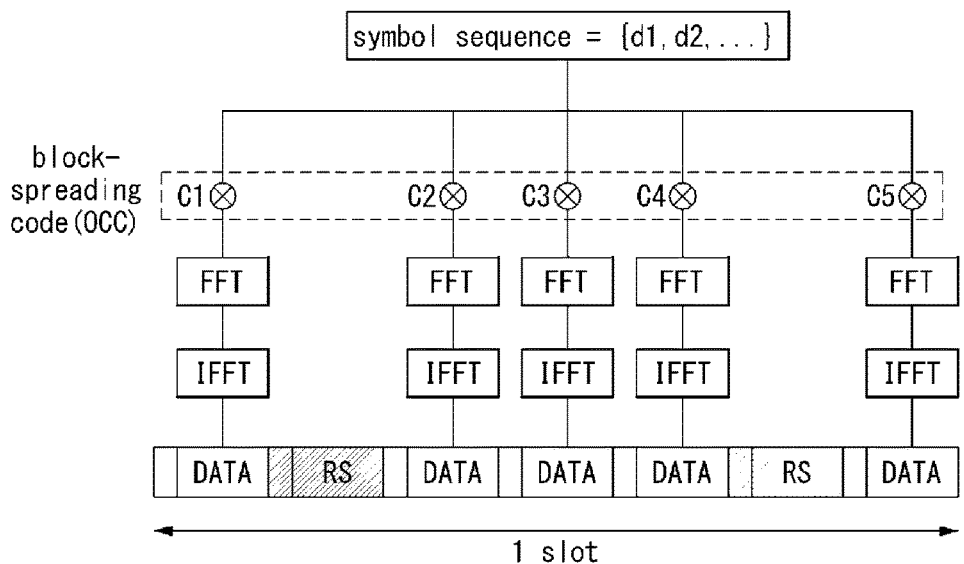

[Figure 12]
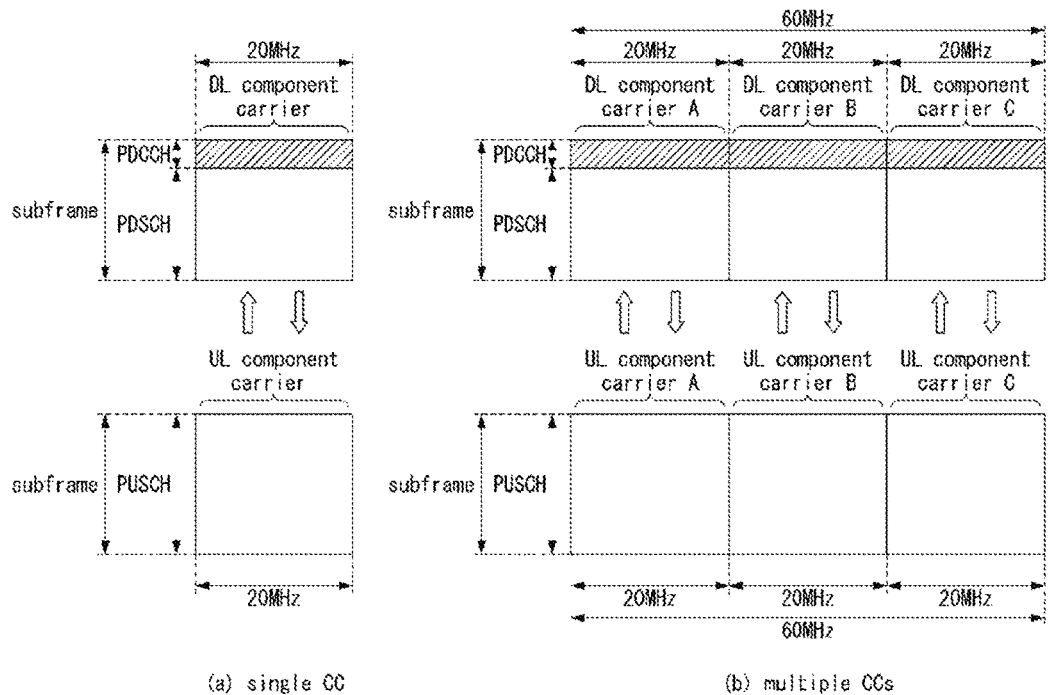
(a) single CC   (b) multiple CCs
[Figure 13]
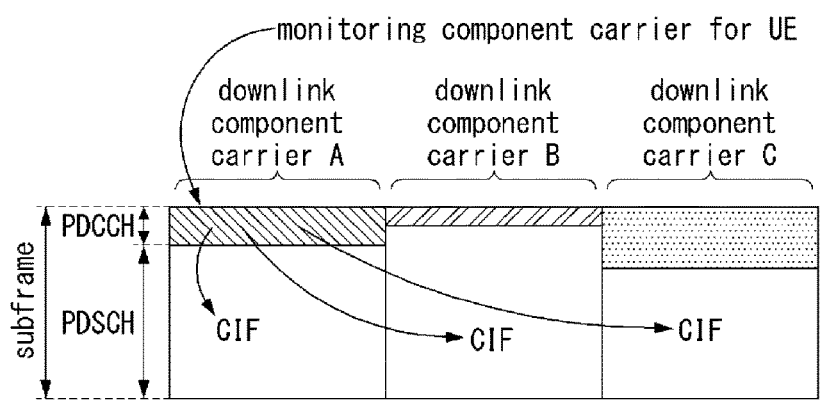

【Figure 14】
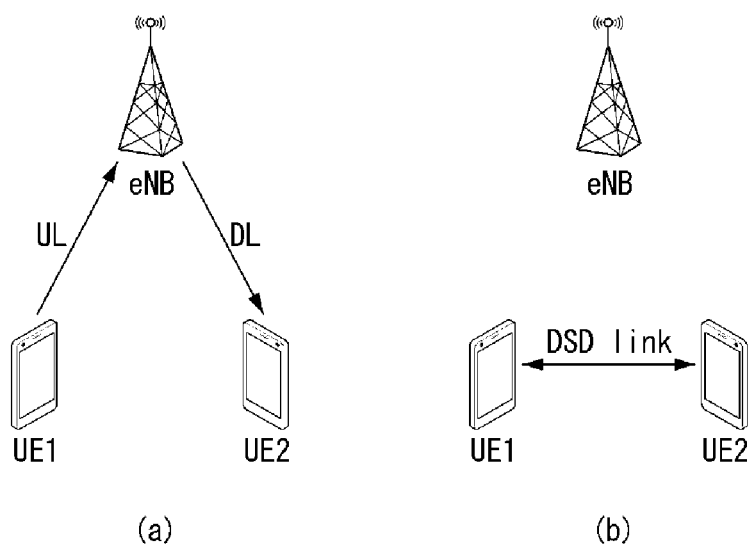

[Figure 15]
(a) 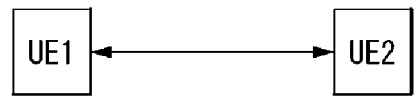
(b) 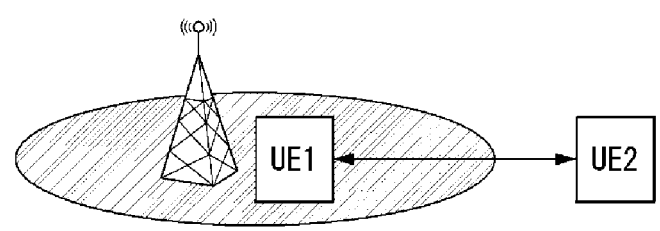
(c) 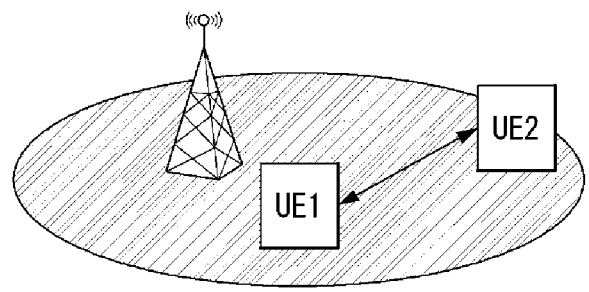
(d) 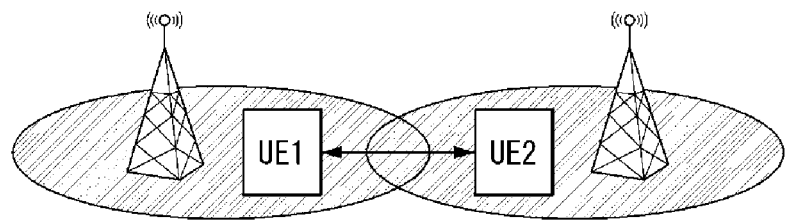

【Figure 16】
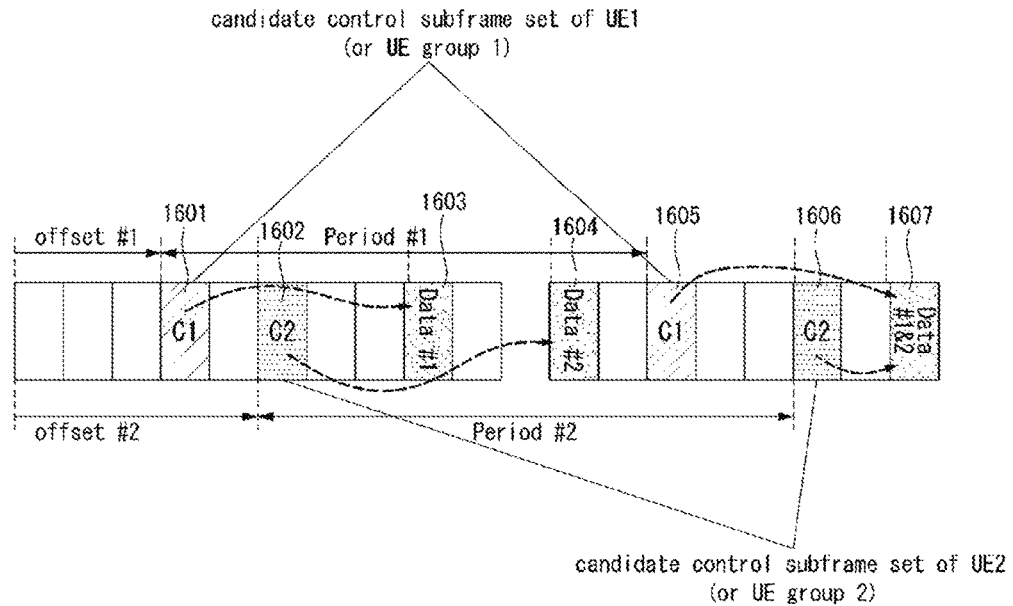
【Figure 17】
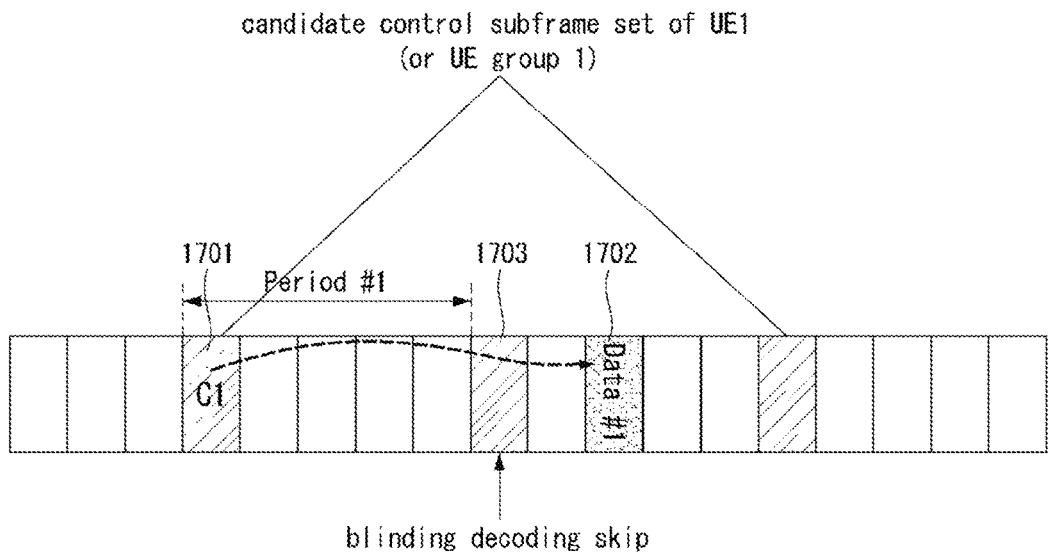

【Figure 18】
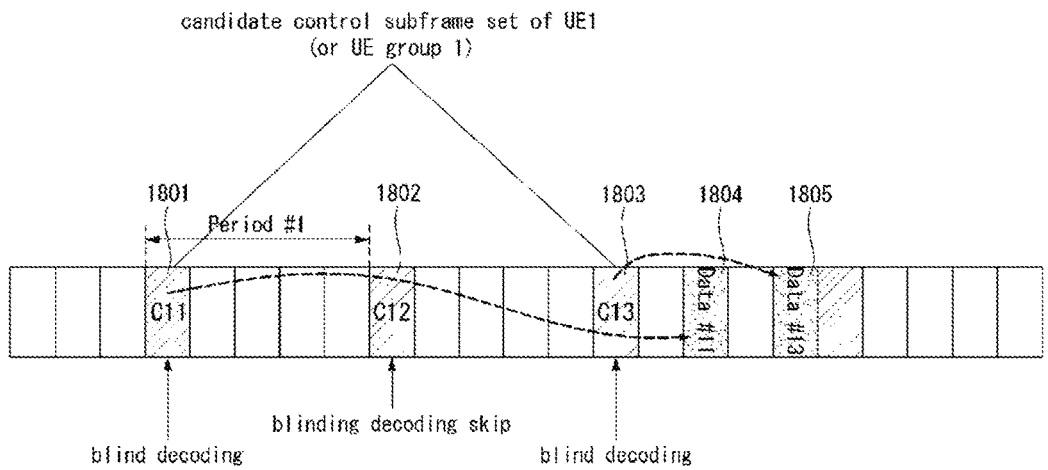
【Figure 19】
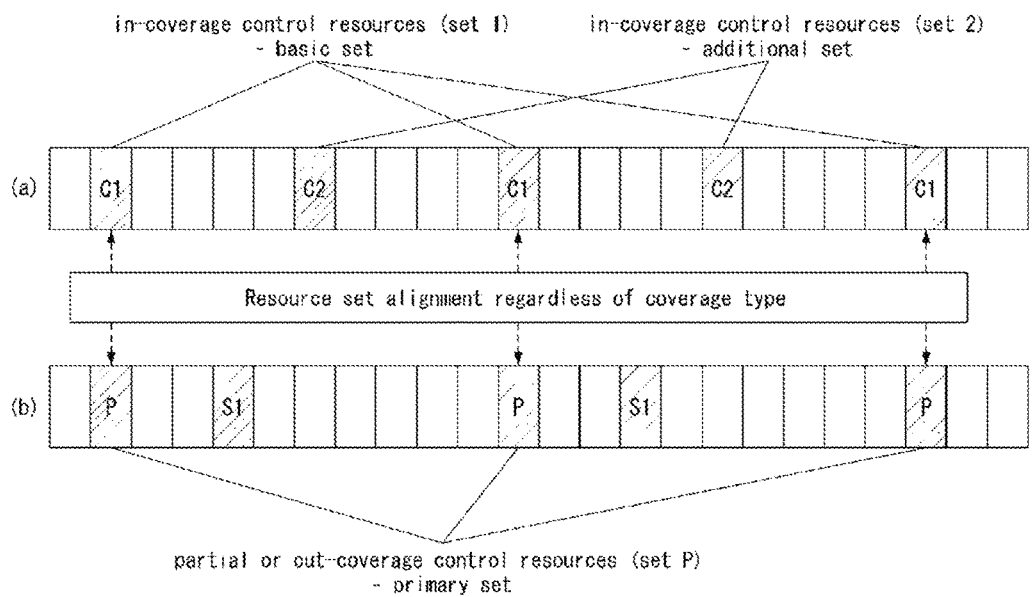

[Figure 20]
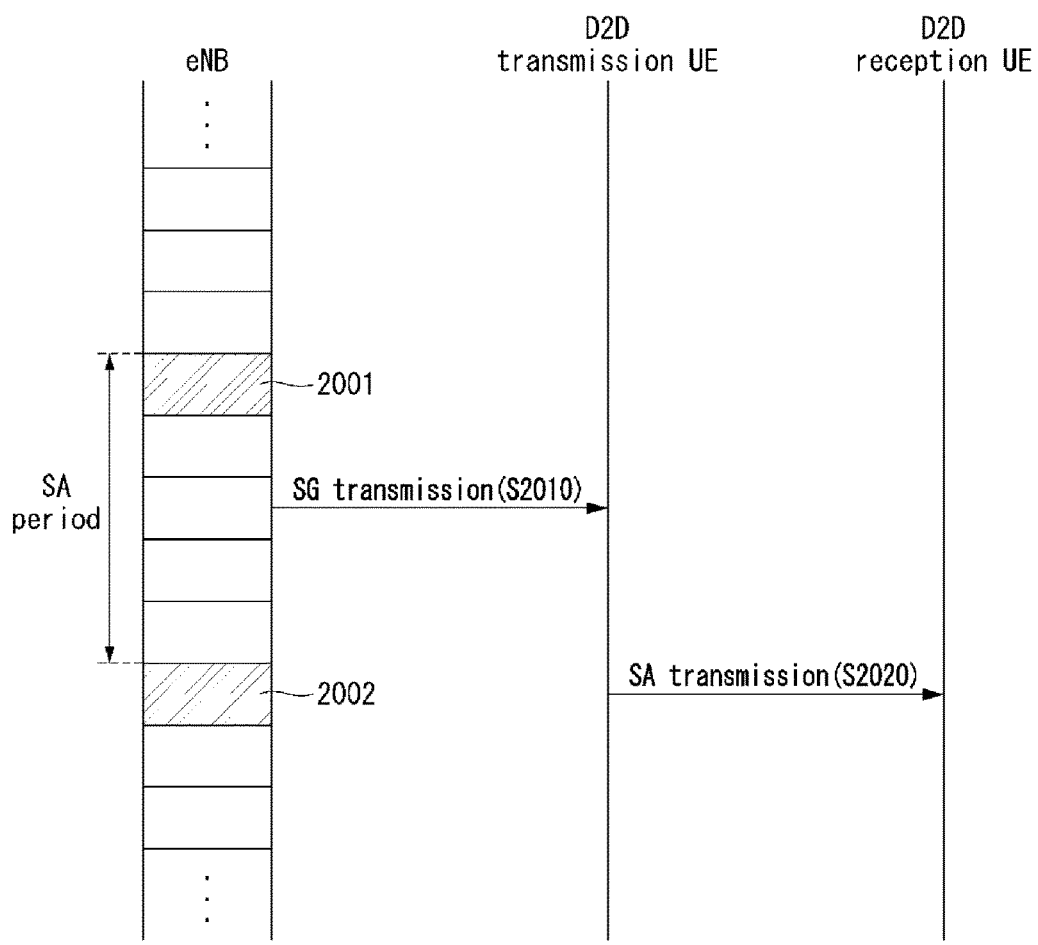

【Figure 21】
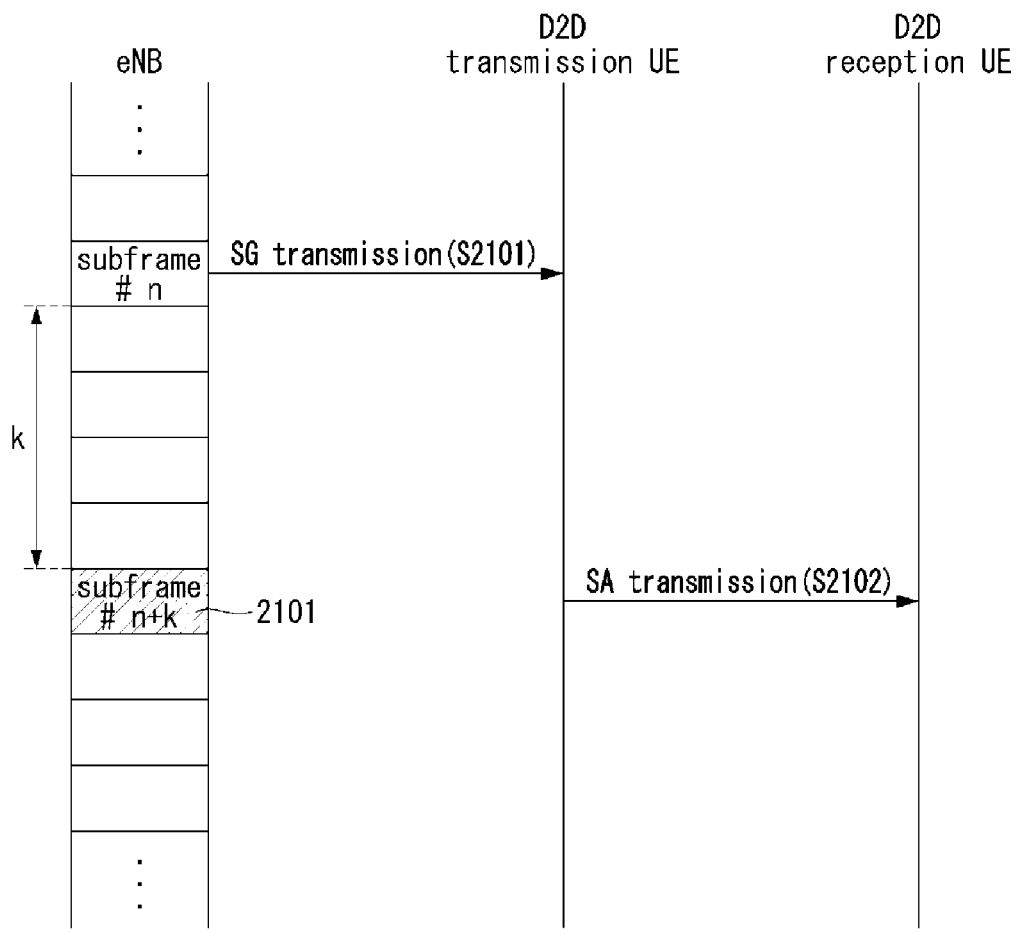

【Figure 22】
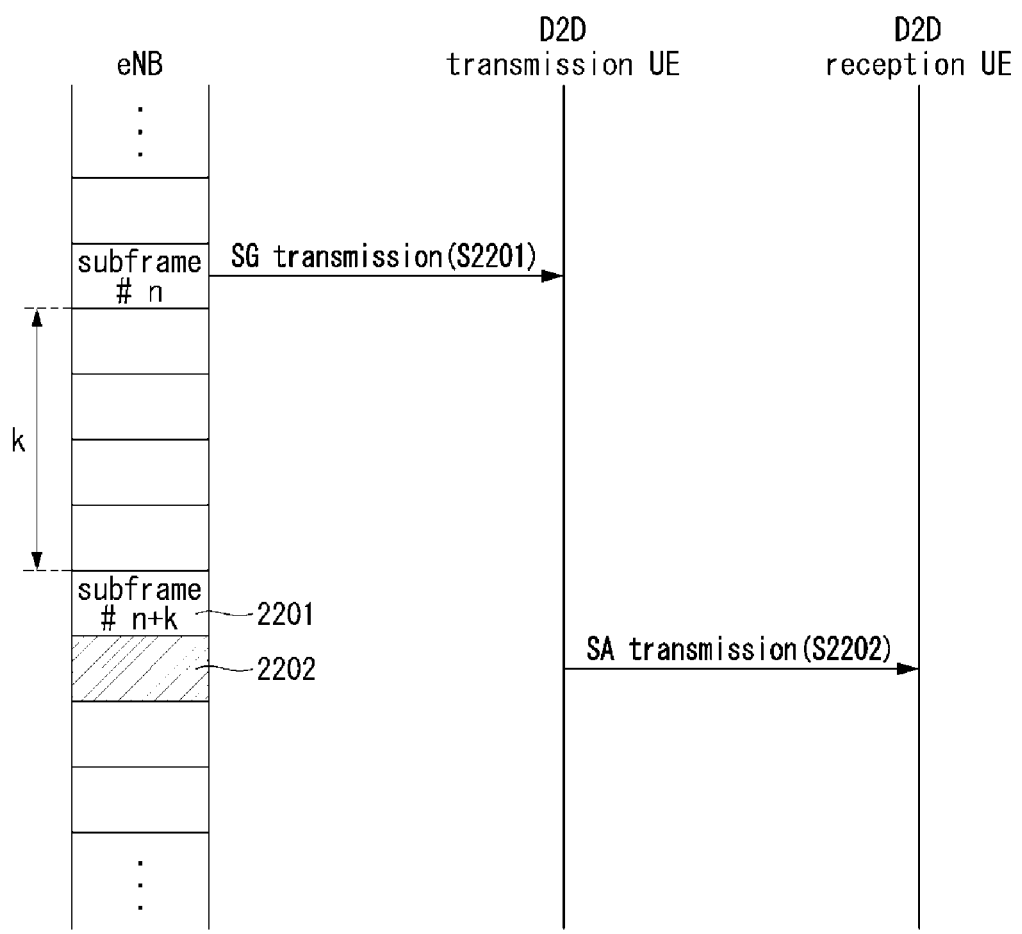

[Figure 23]
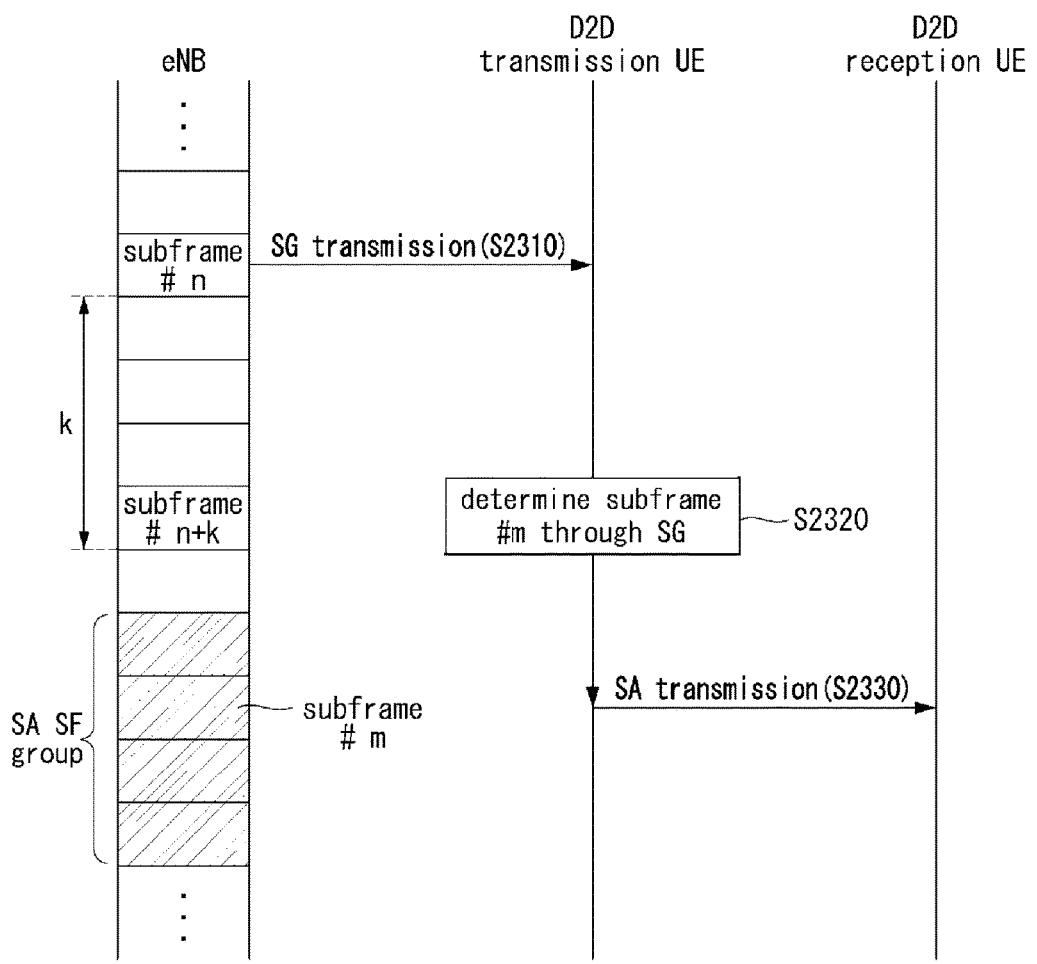

【Figure 24】
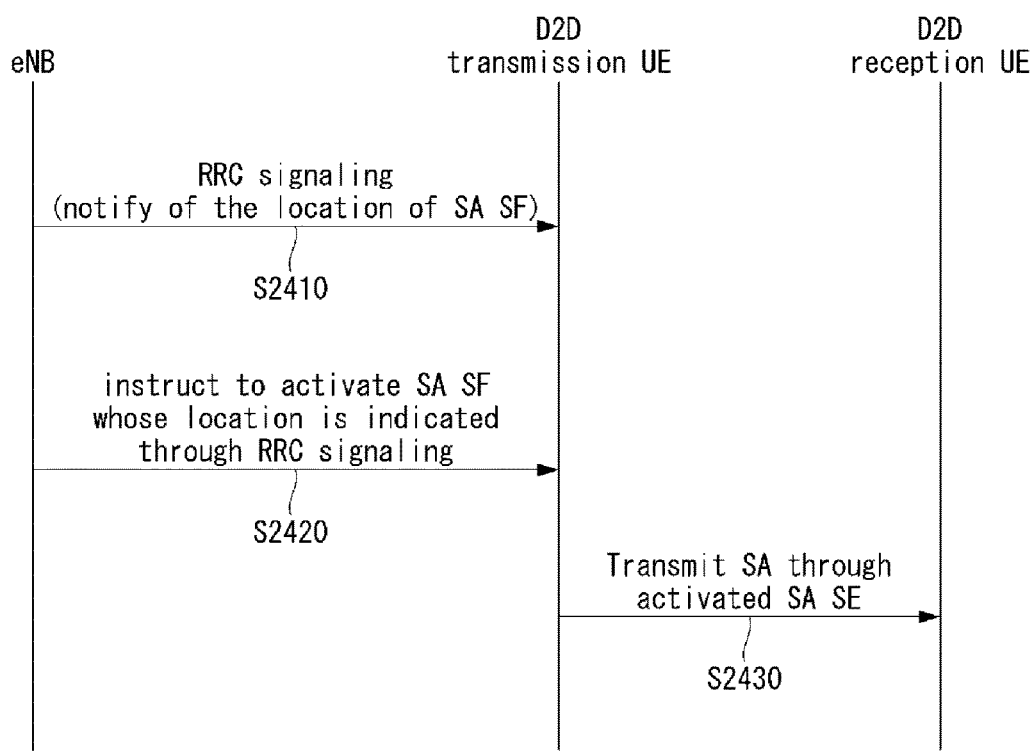

[Figure 25]
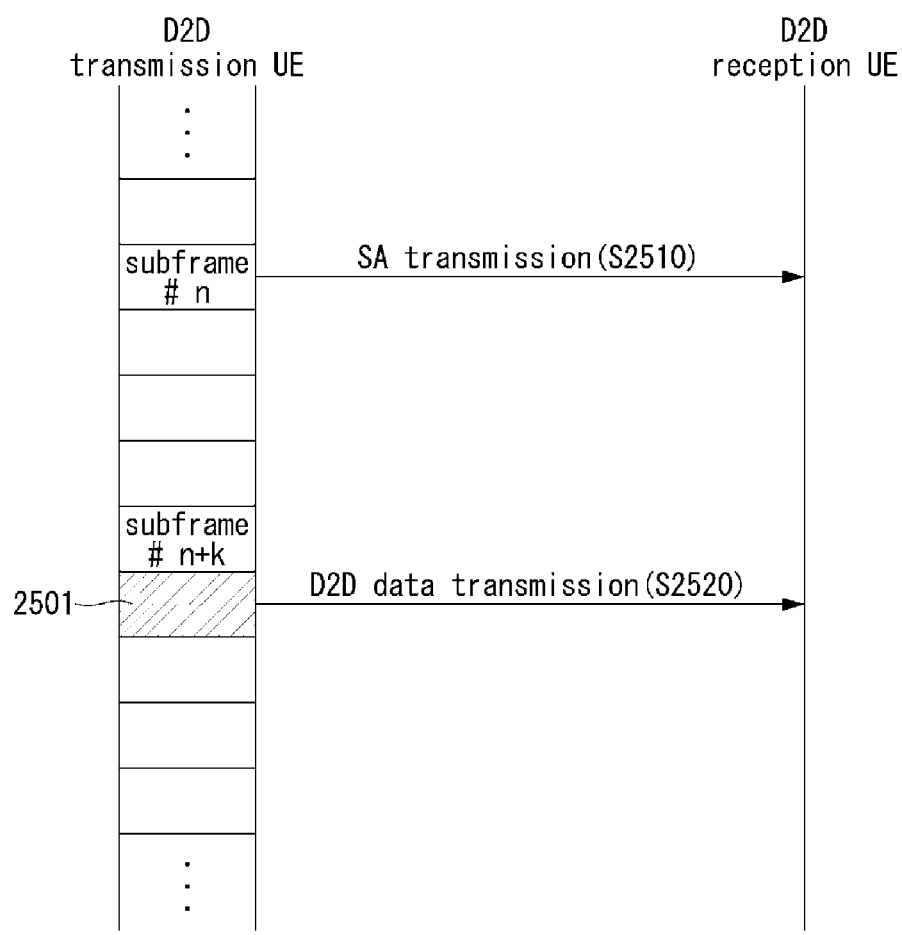

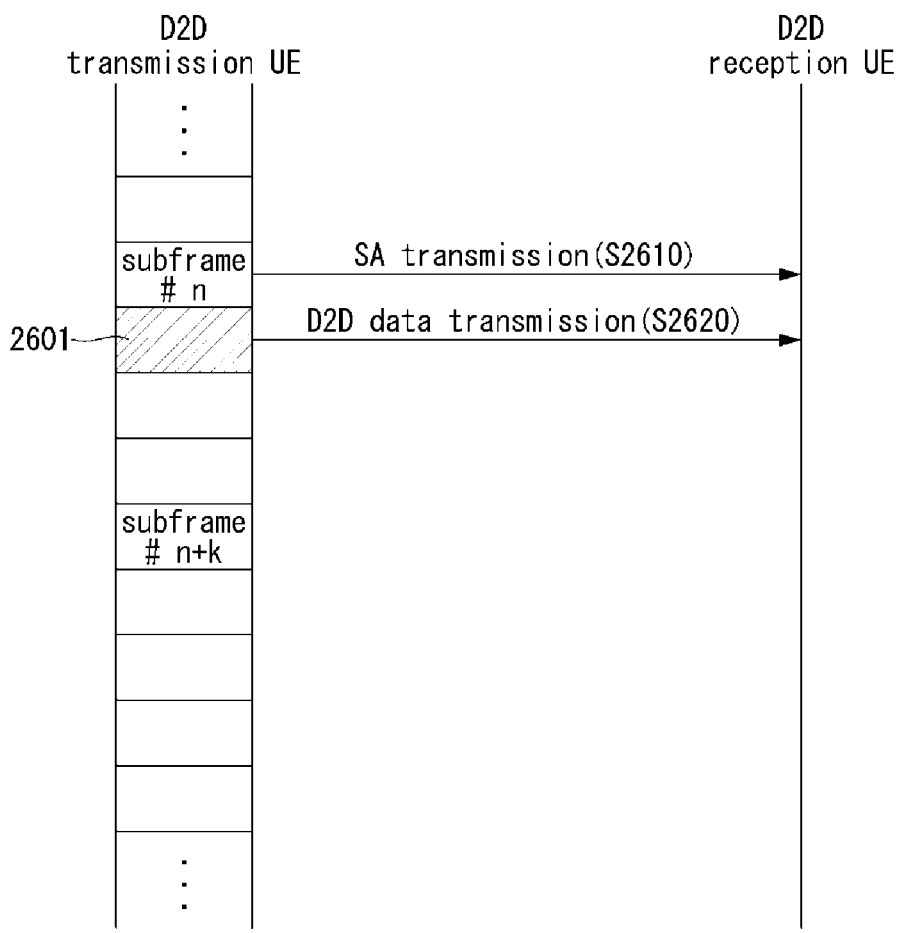
[Figure 26]

【Figure 27】
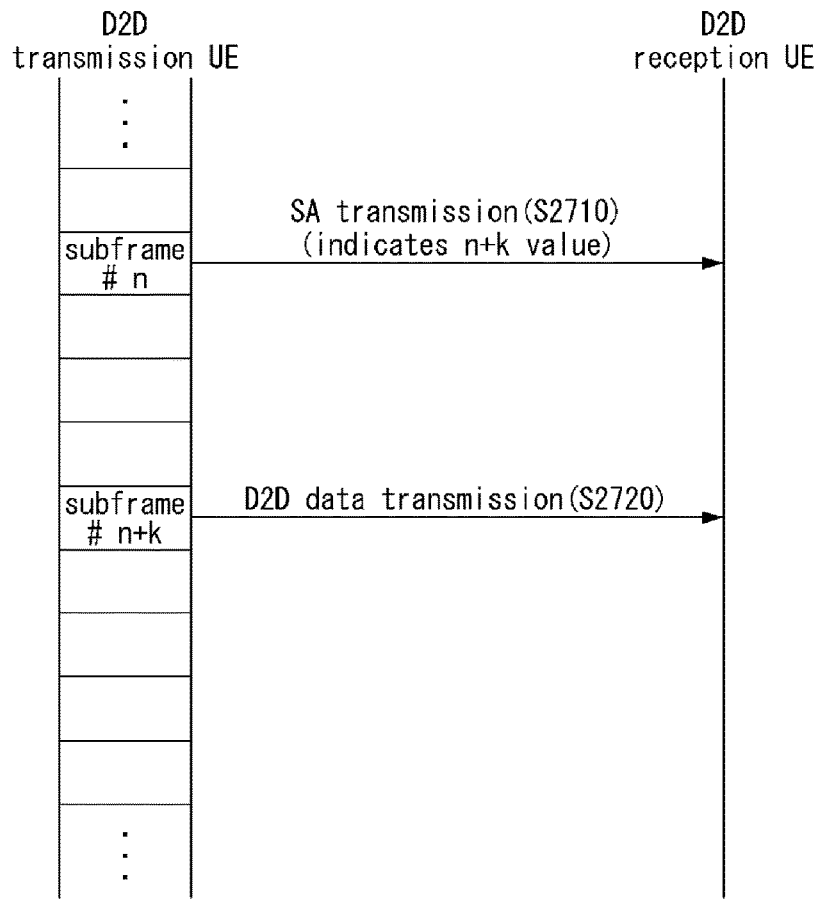
【Figure 28】
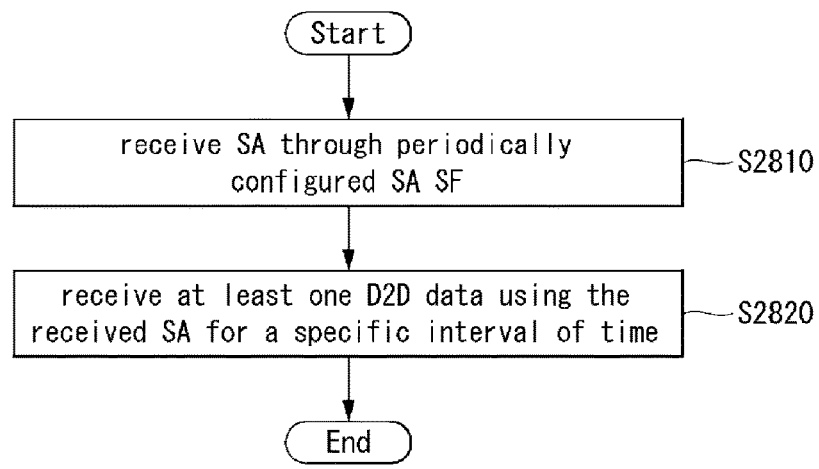

[Figure 29]
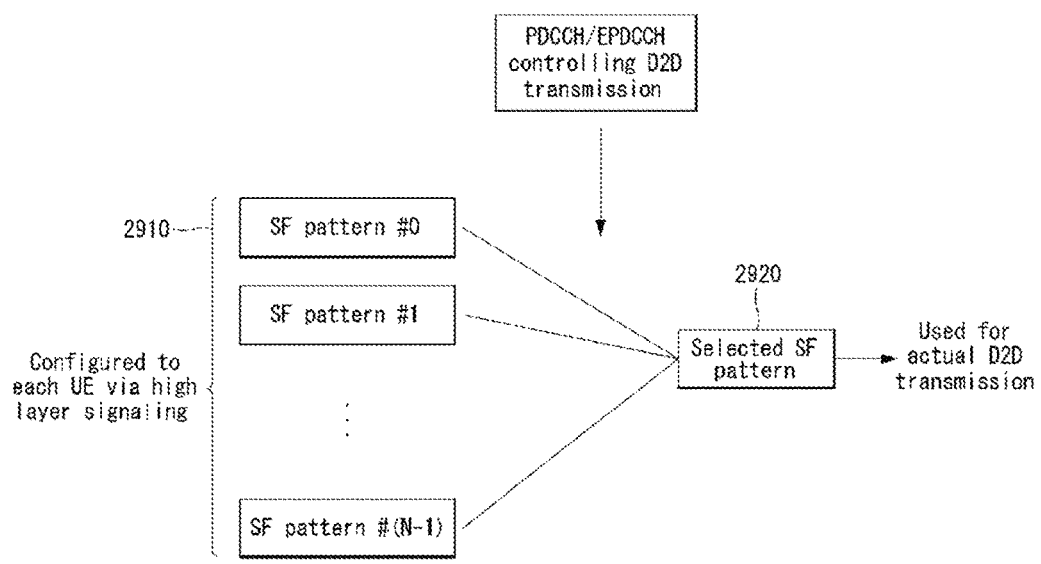

【Figure 30】
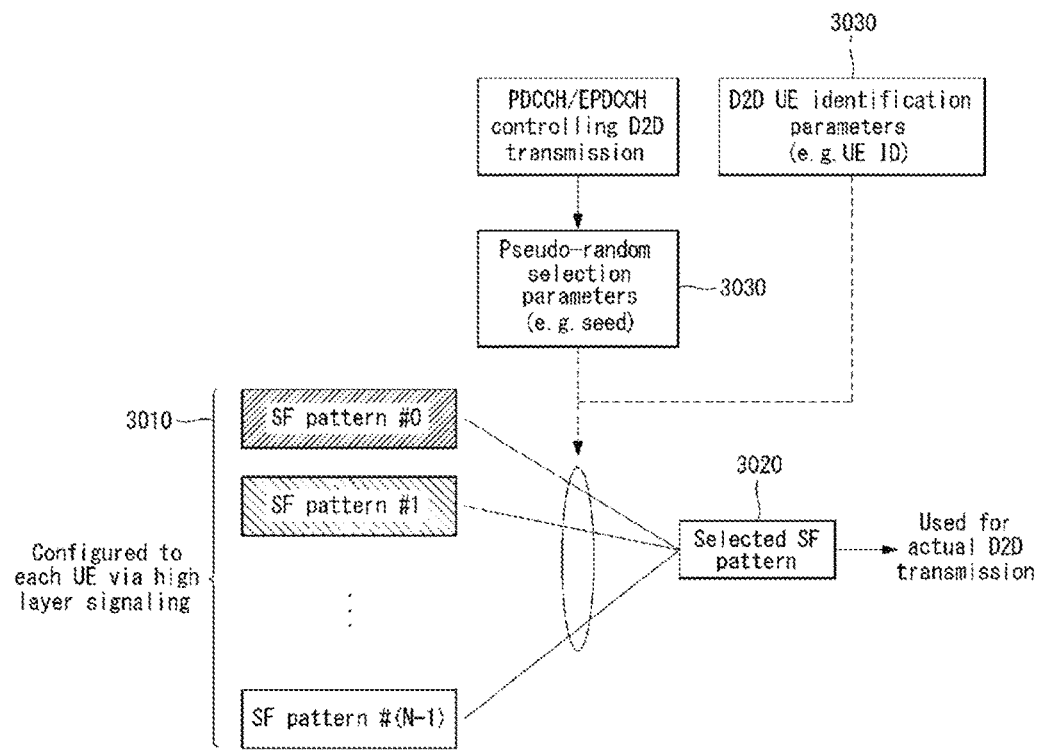
【Figure 31】
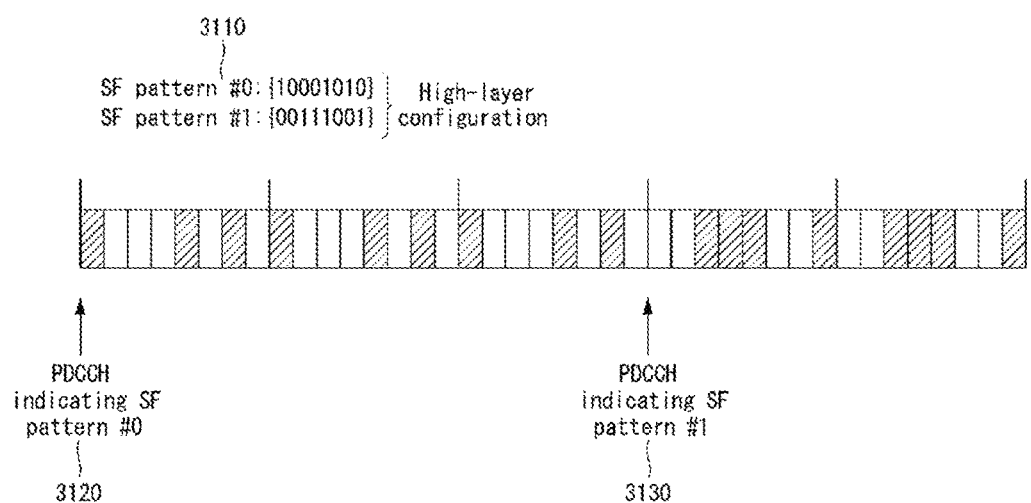

【Figure 32】
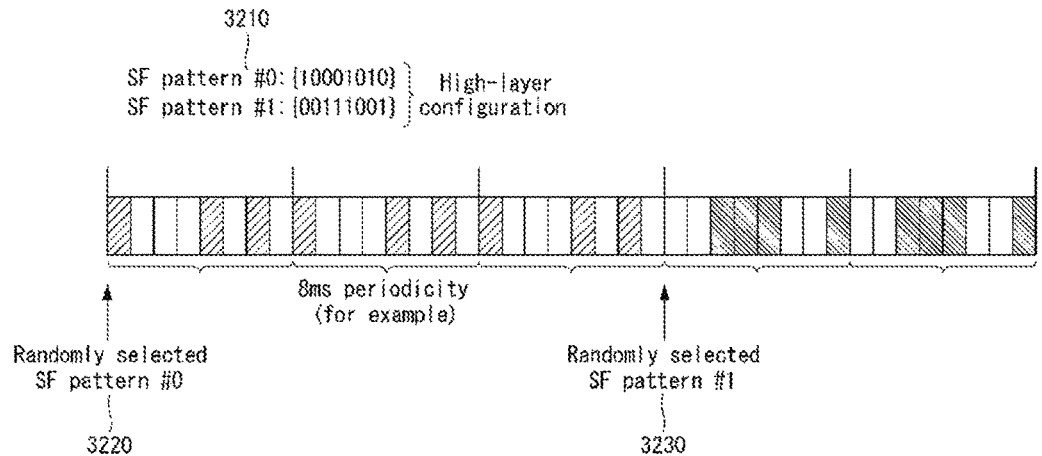
【Figure 33】
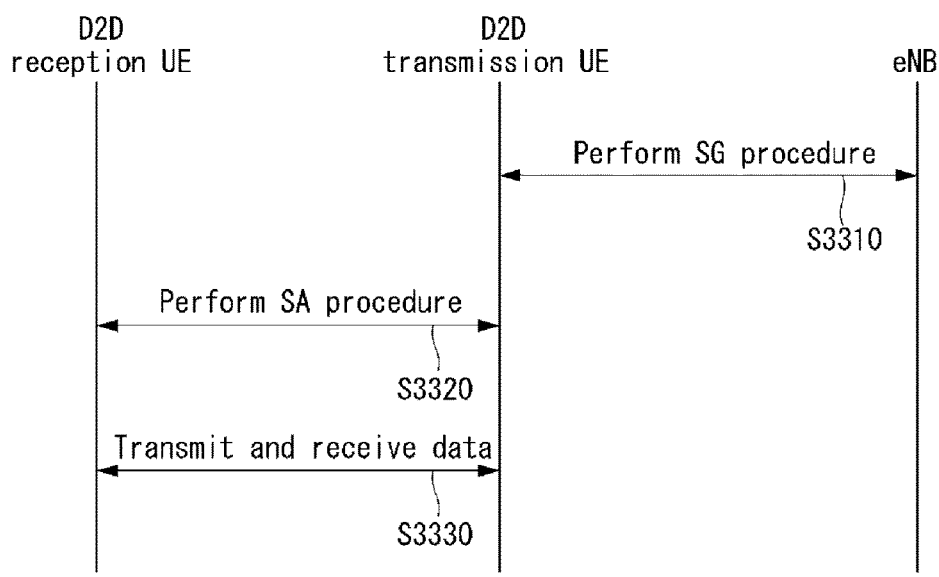

[Figure 34]
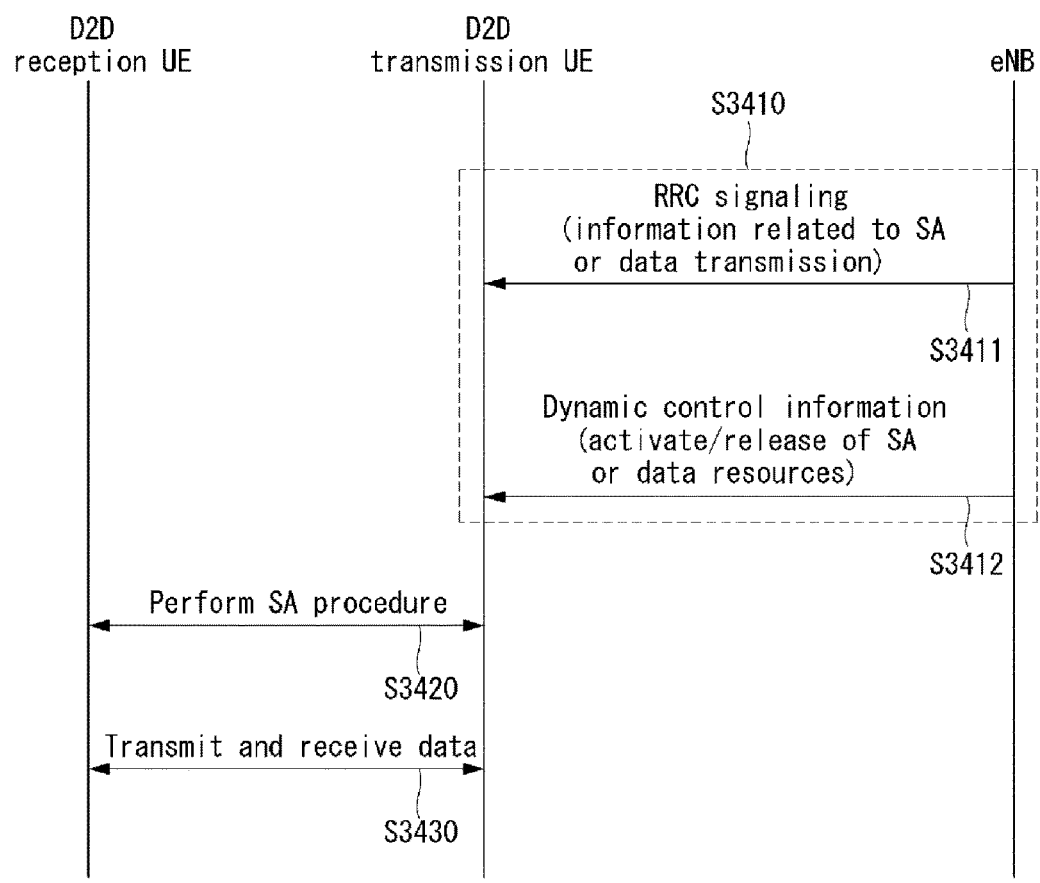

[Figure 35]
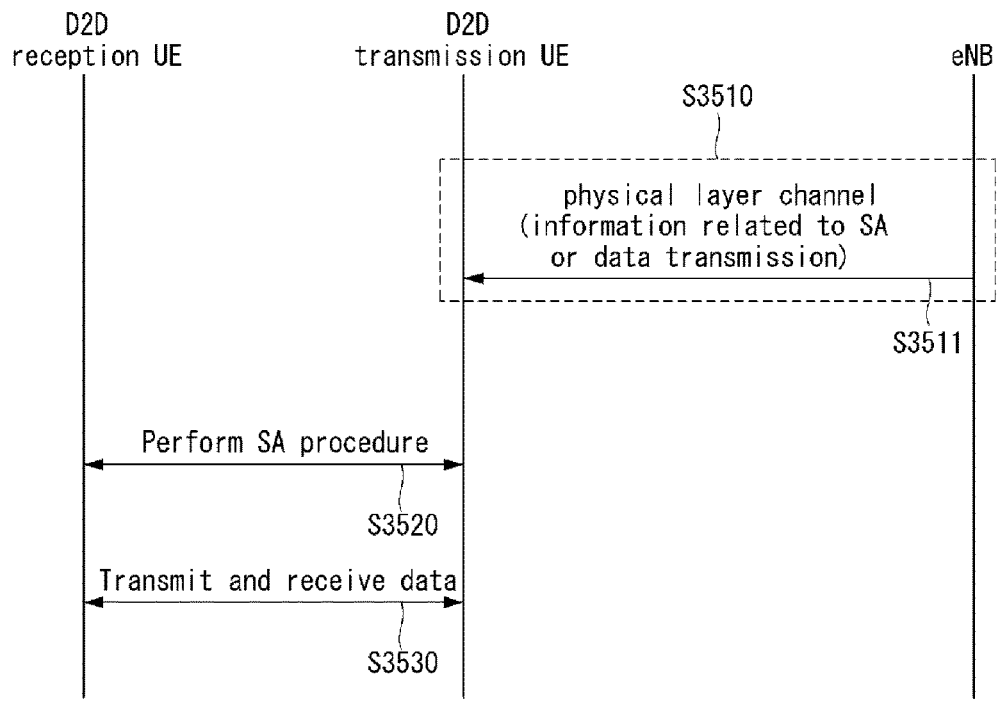
[Figure 36]
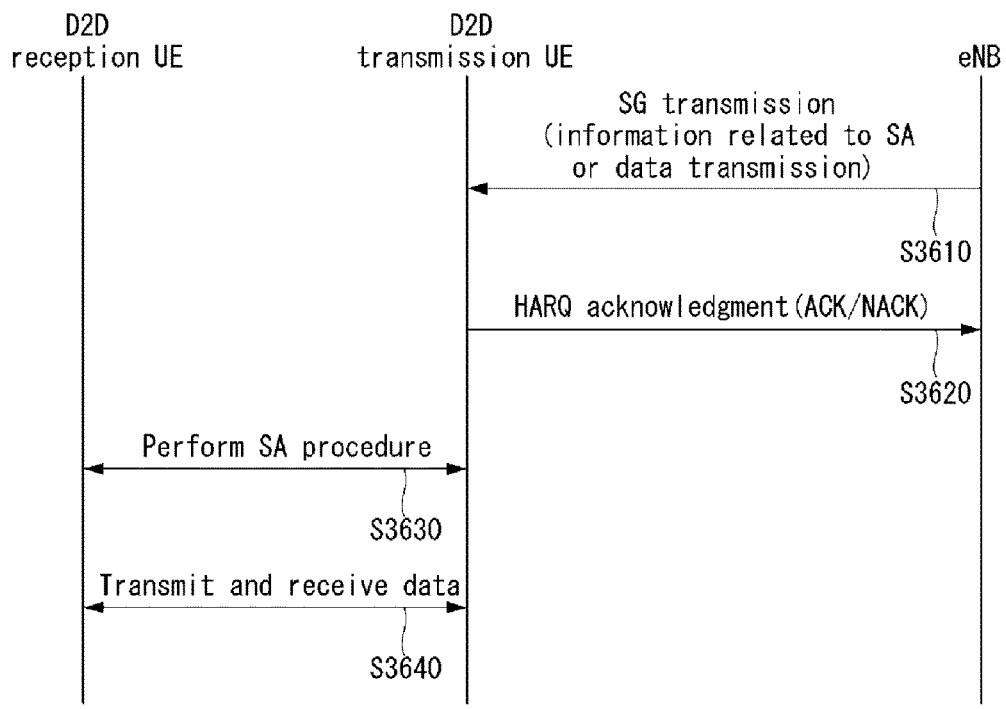

【Figure 37】
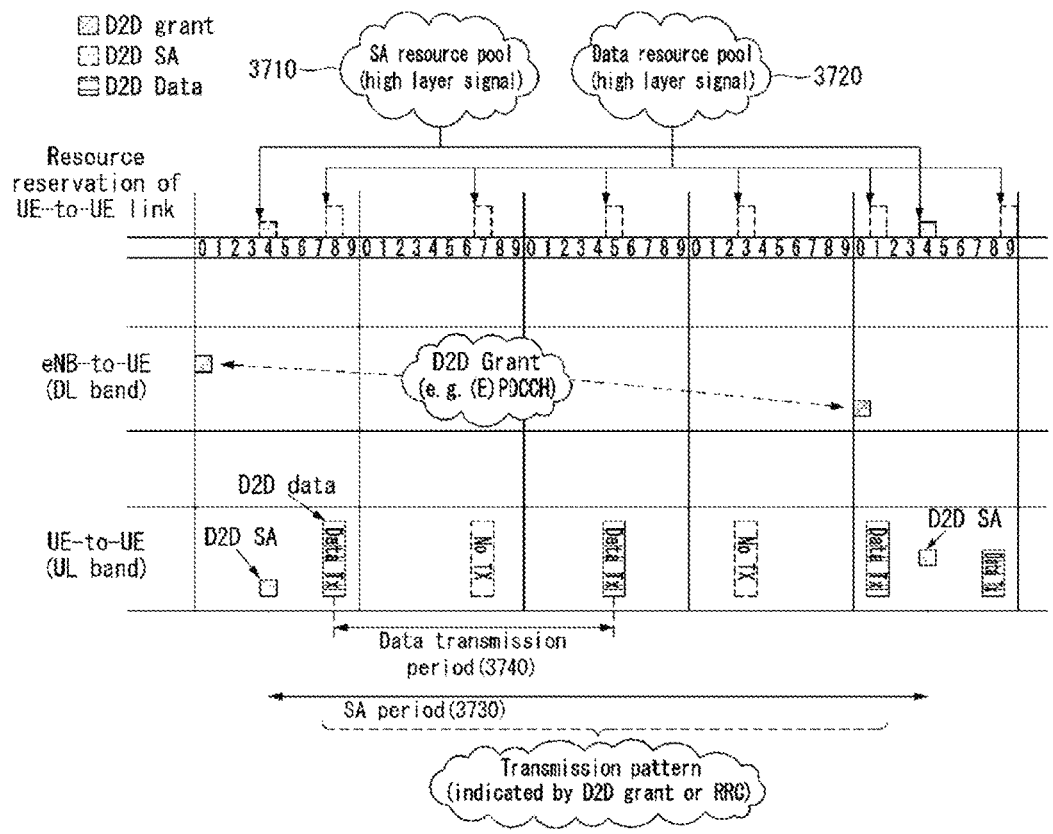

[Figure 38]
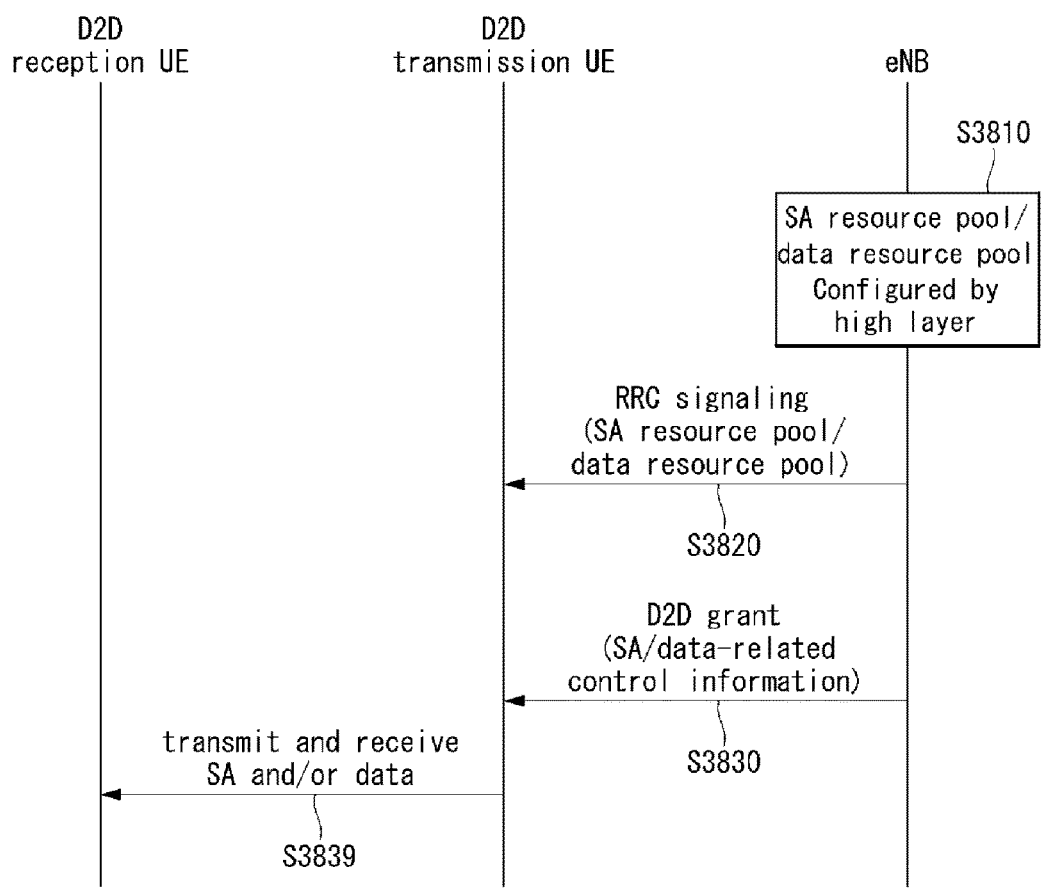

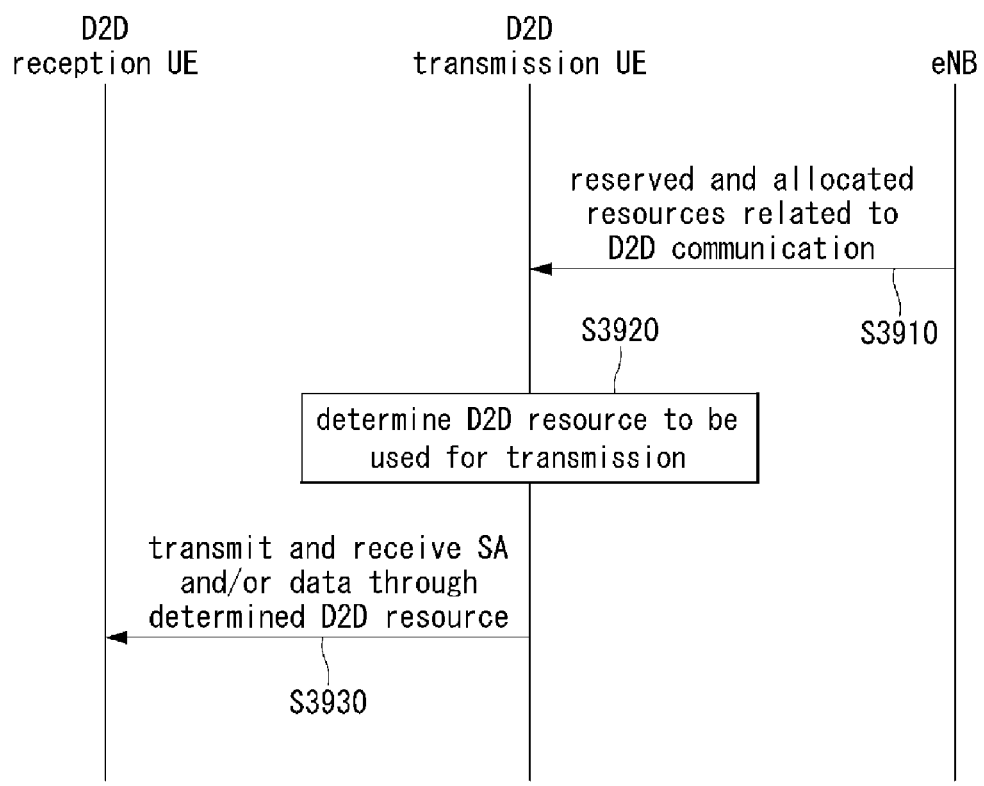
[Figure 39]

[Figure 40]
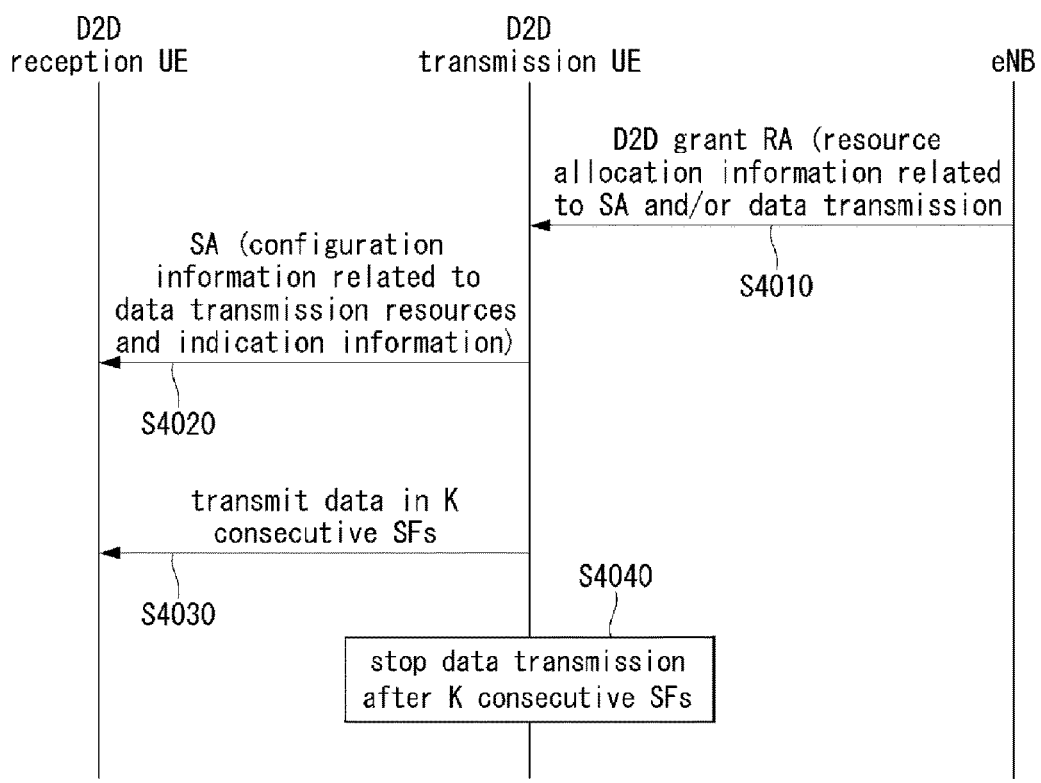

【Figure 41】
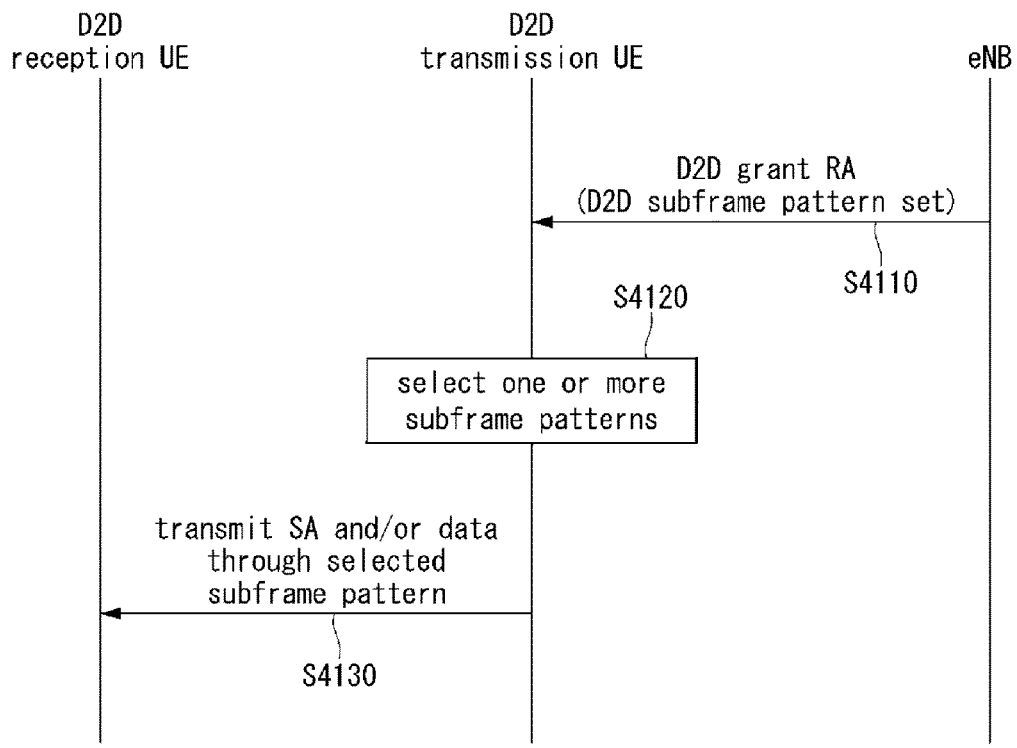
【Figure 42】
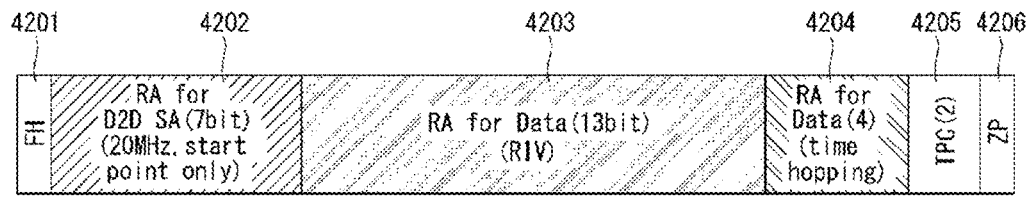

[Figure 43]
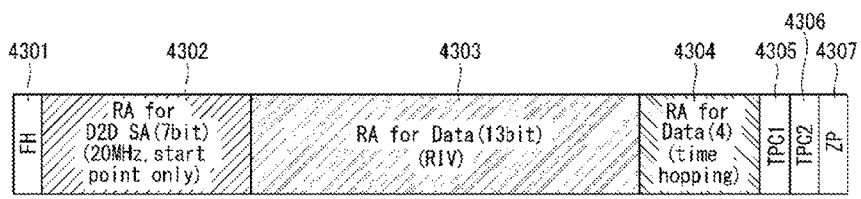
[Figure 44]
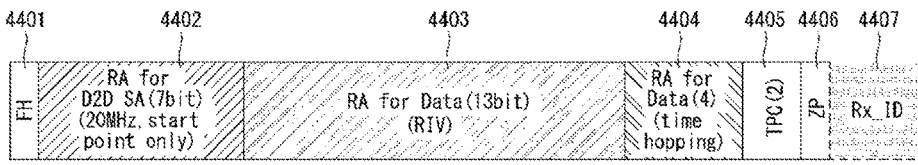
[Figure 45]
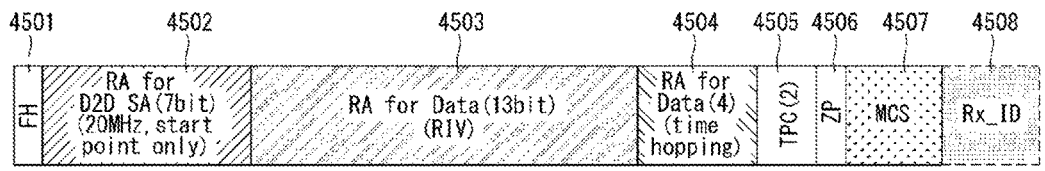
[Figure 46]
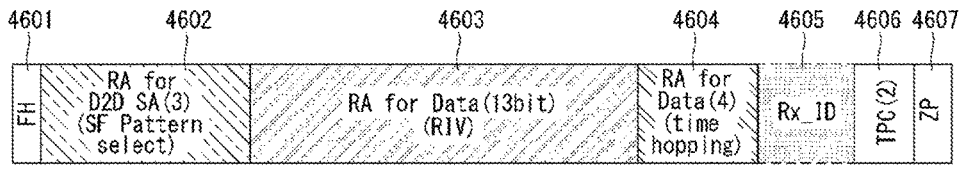

[Figure 47]
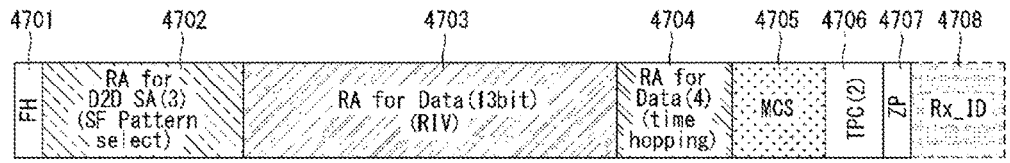
[Figure 48]
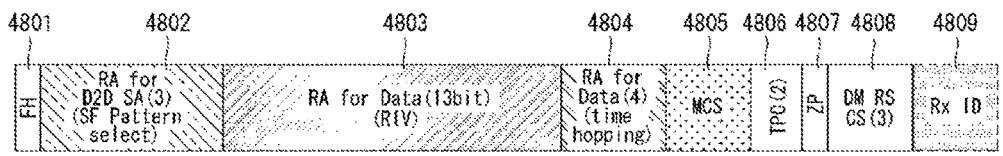
[Figure 49]
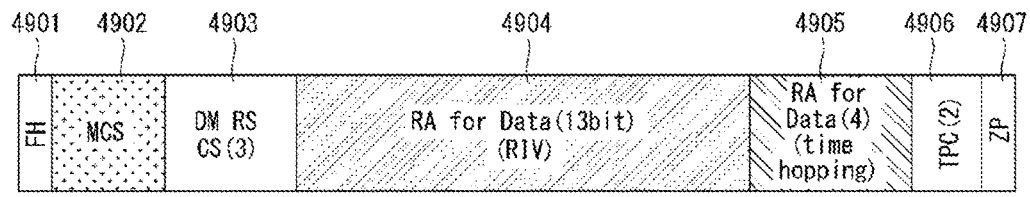
[Figure 50]
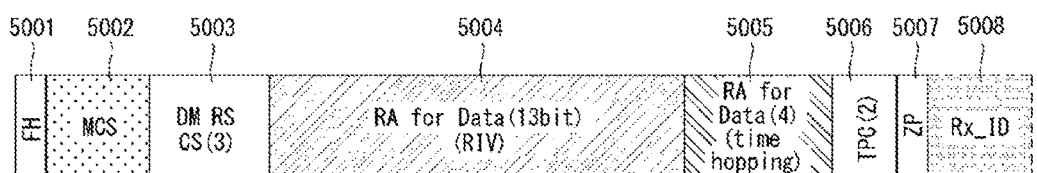
[Figure 51]
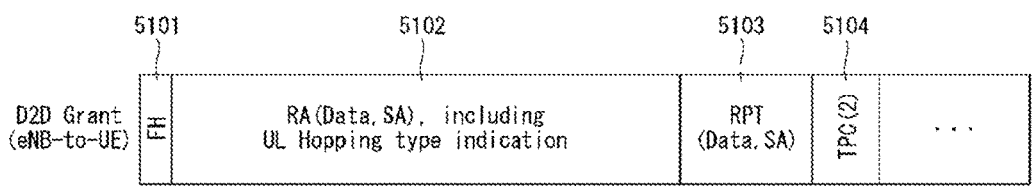

【Figure 52】
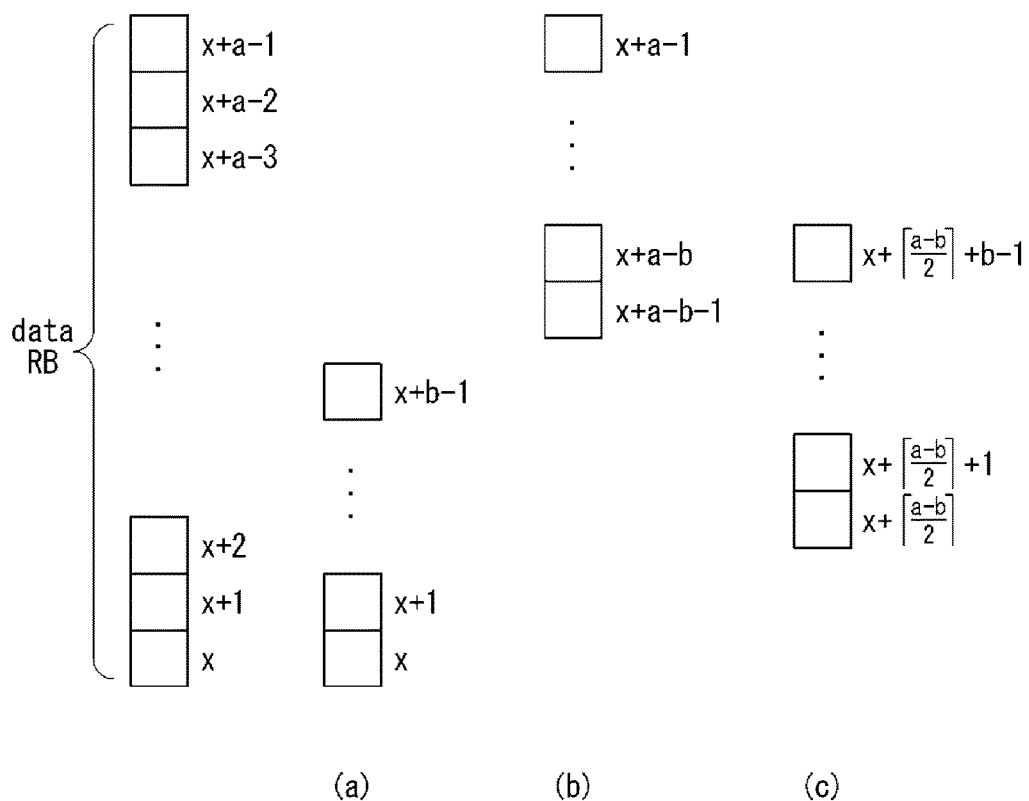

【Figure 53】
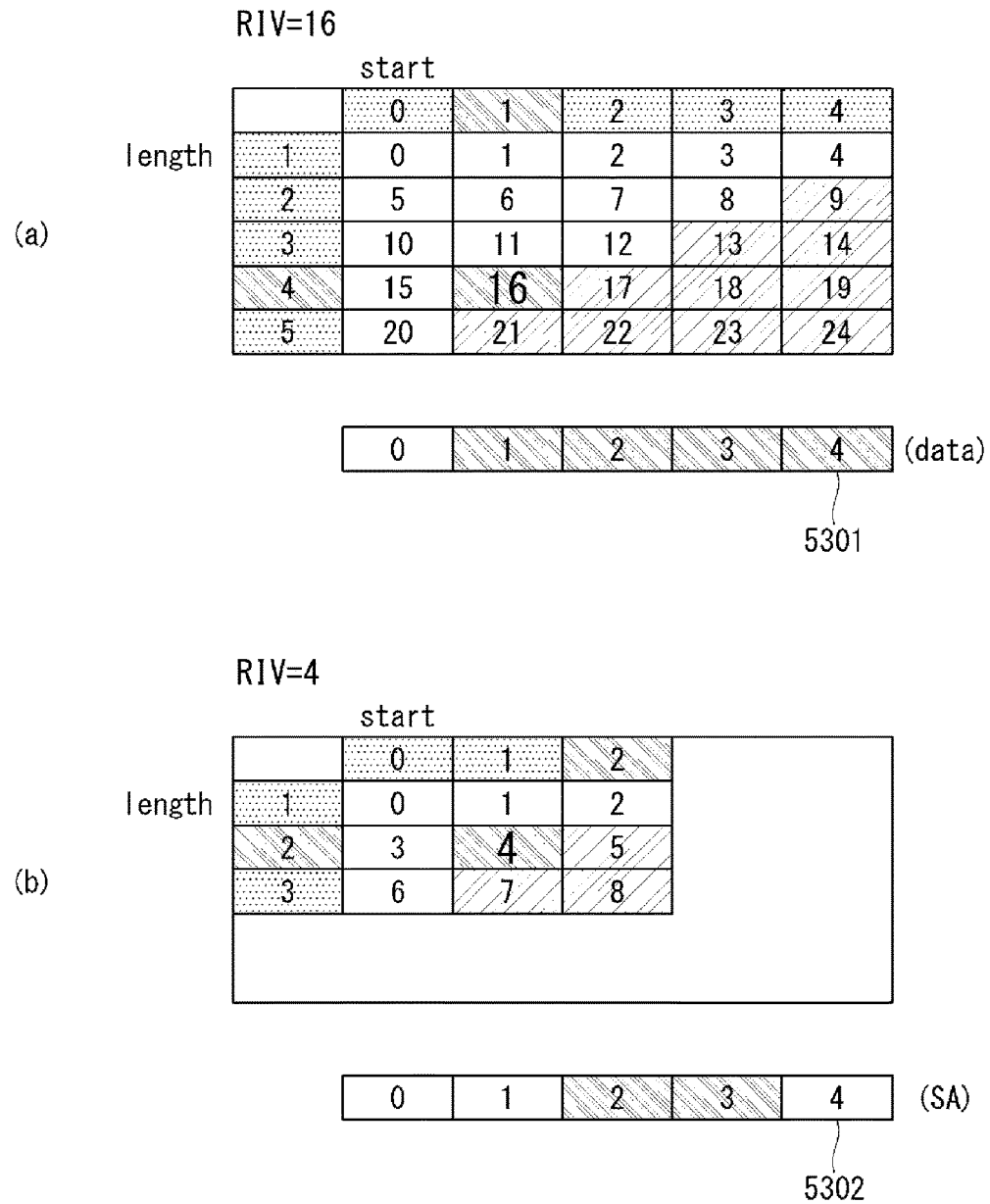

【Figure 54】
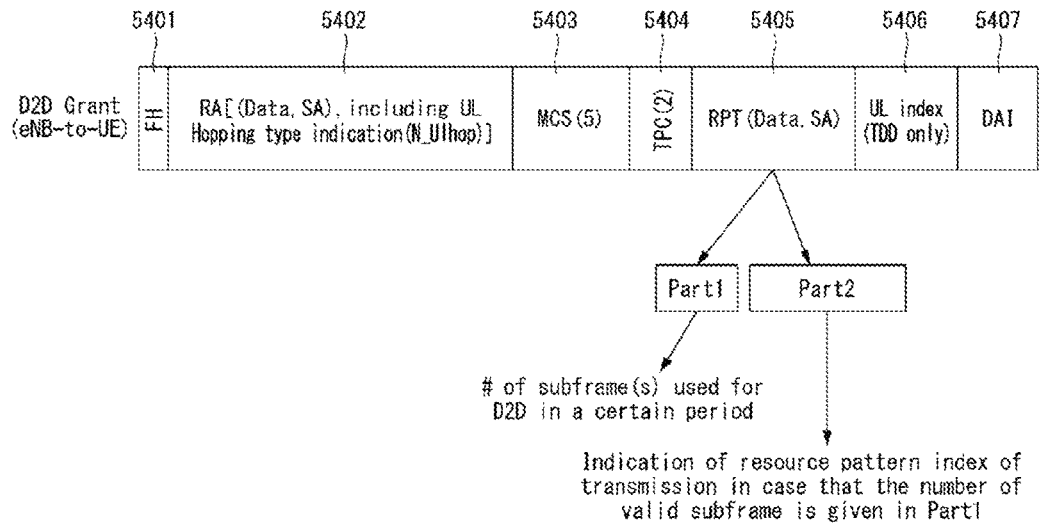
【Figure 55】
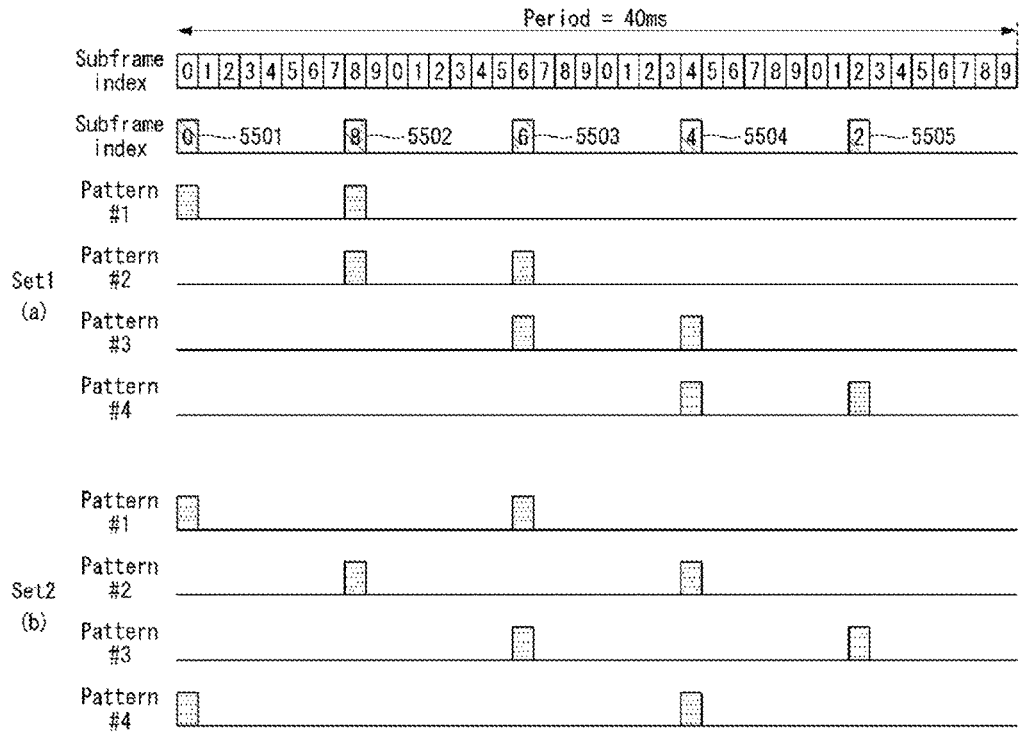

【Figure 56】
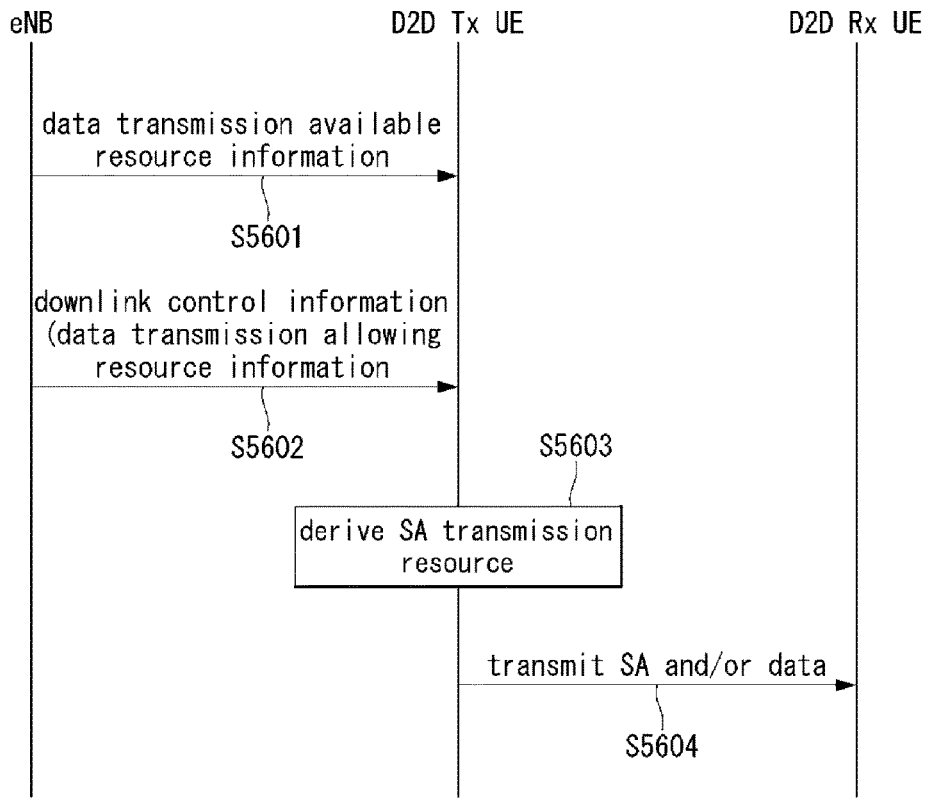
【Figure 57】
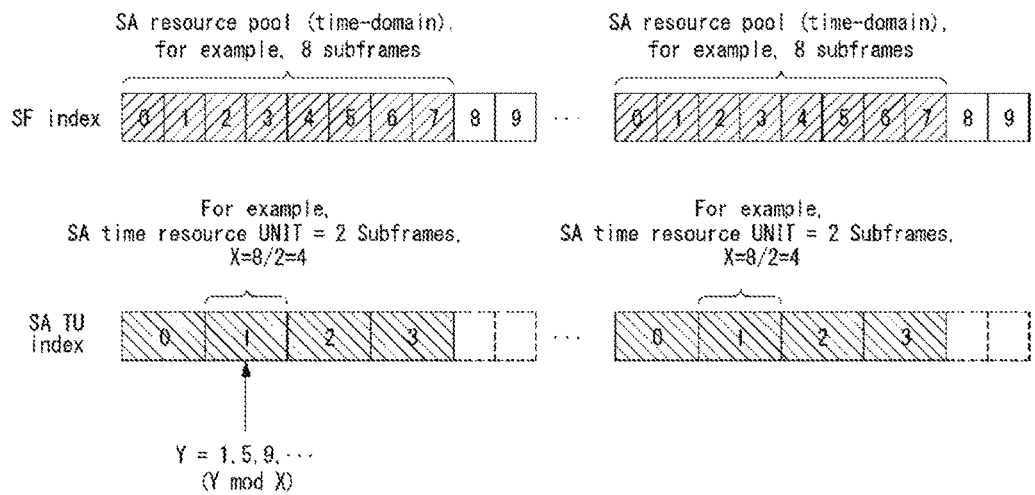

[Figure 58]
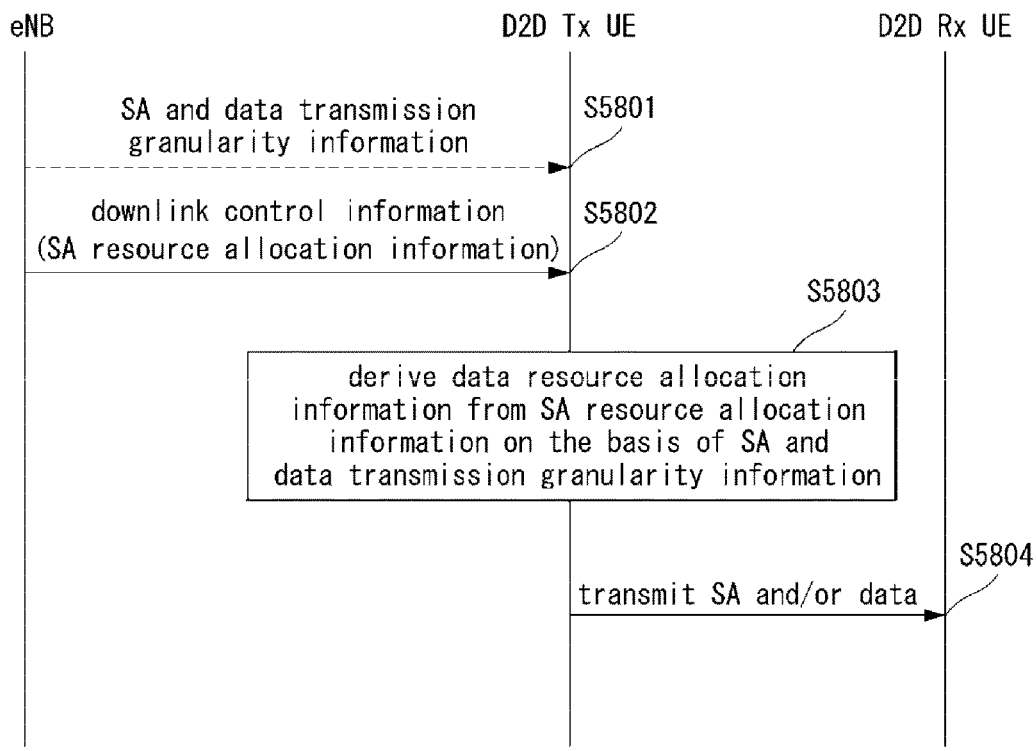

[Figure 59]
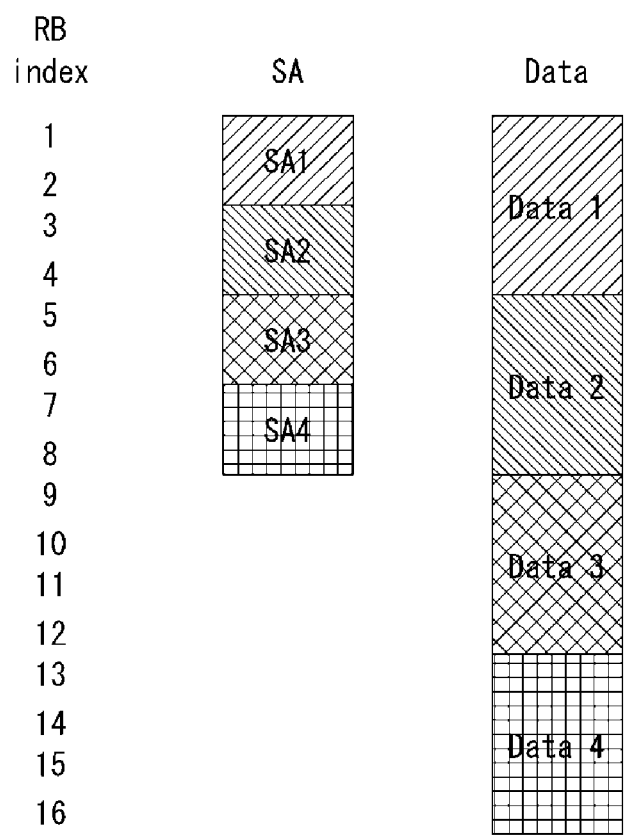

[Figure 60]
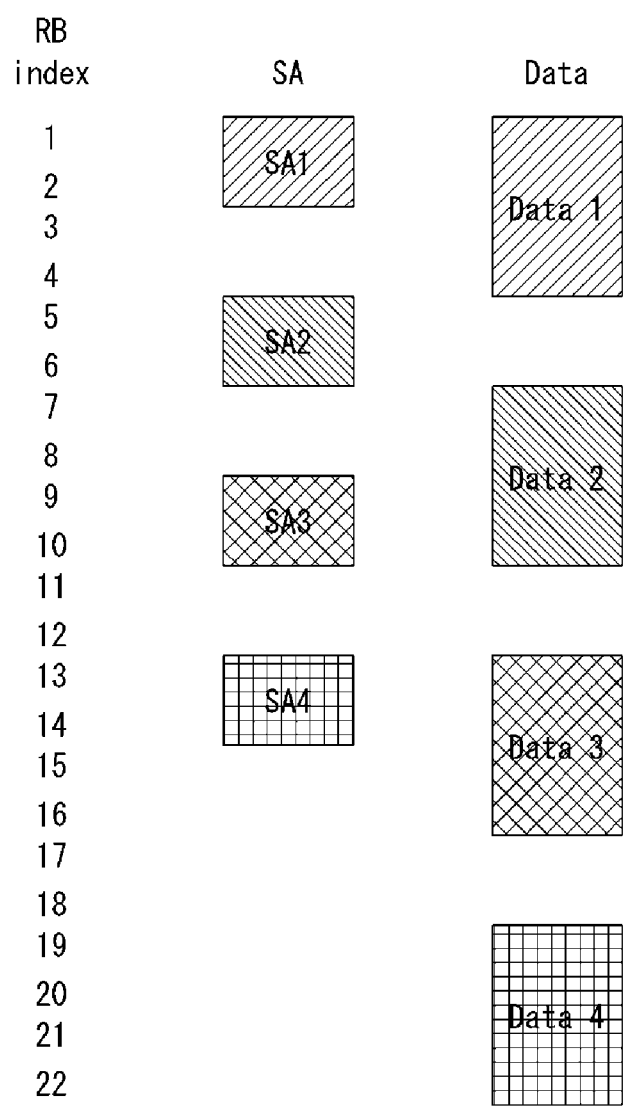

【Figure 61】
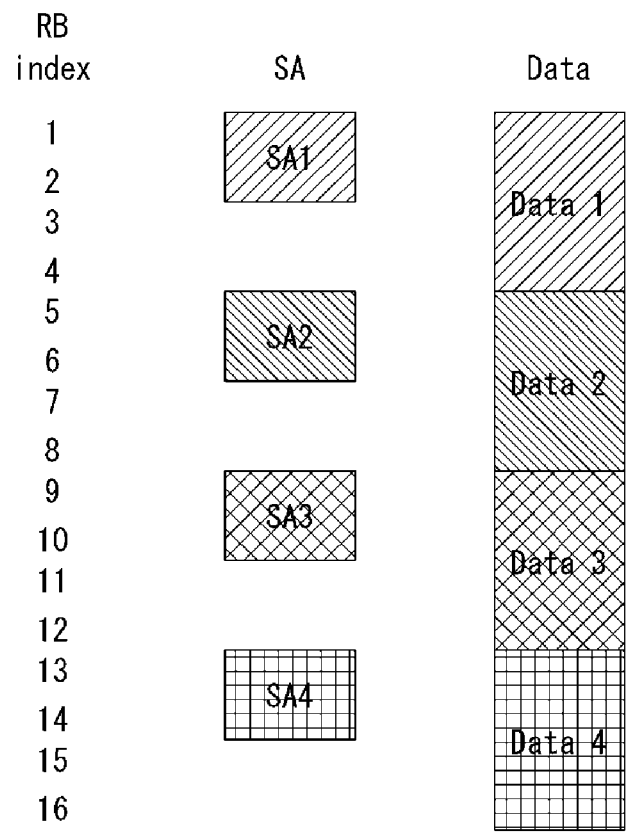
【Figure 62】
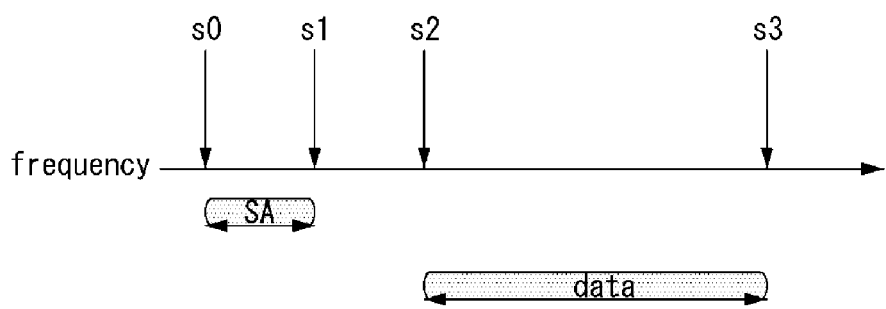

[Figure 63]
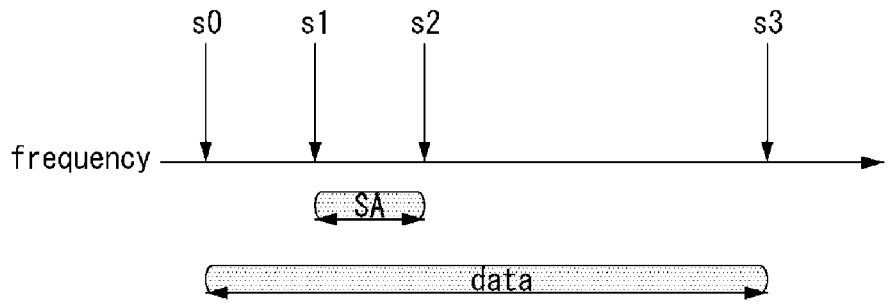
[Figure 64]
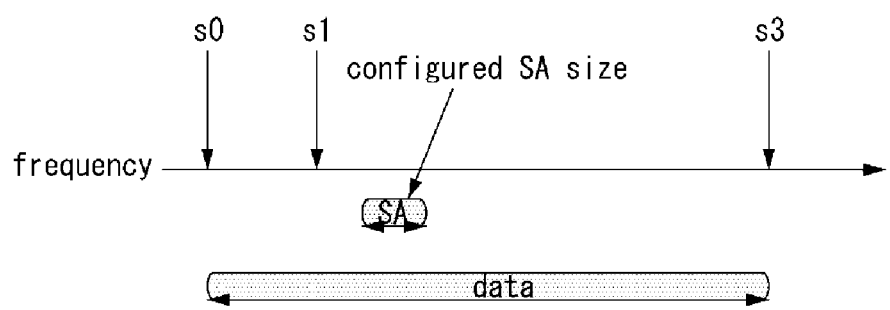
[Figure 65]
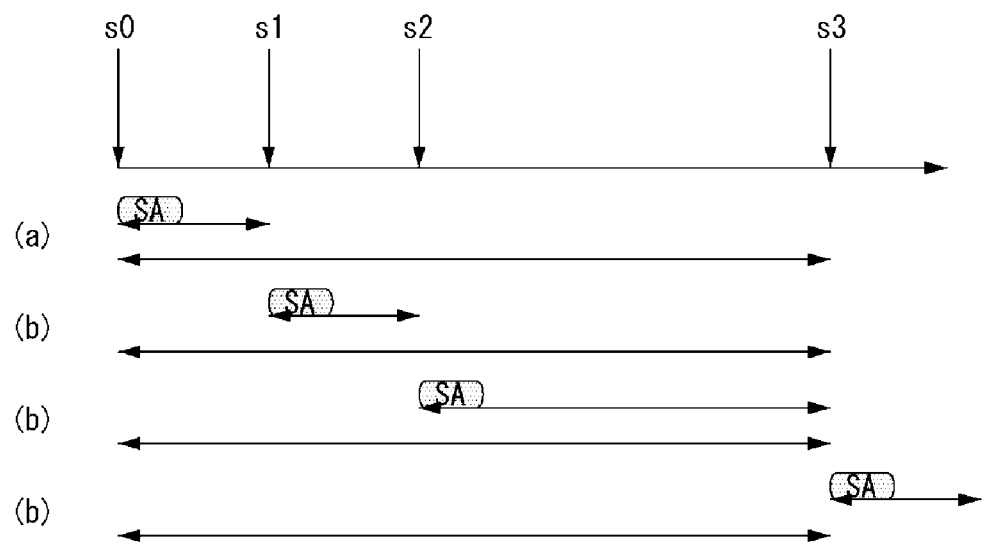

【Figure 66】
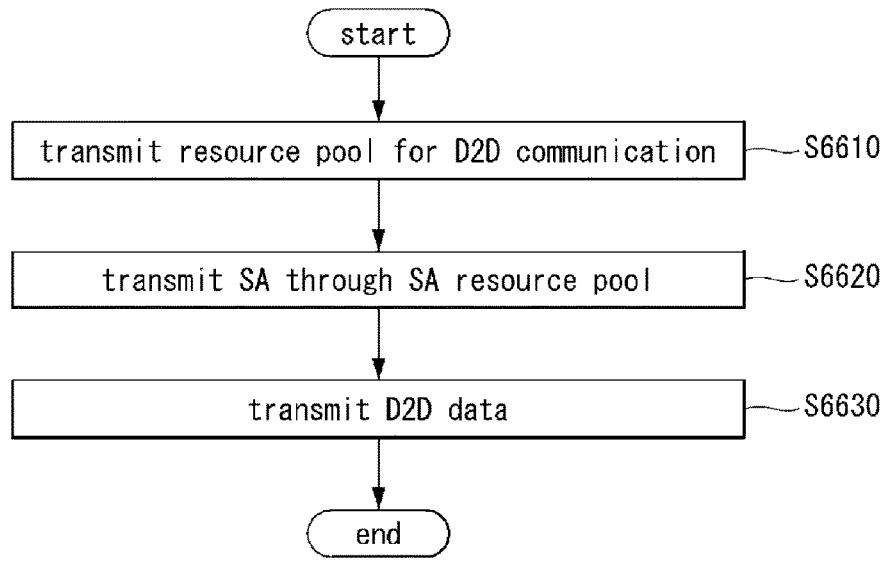
【Figure 67】
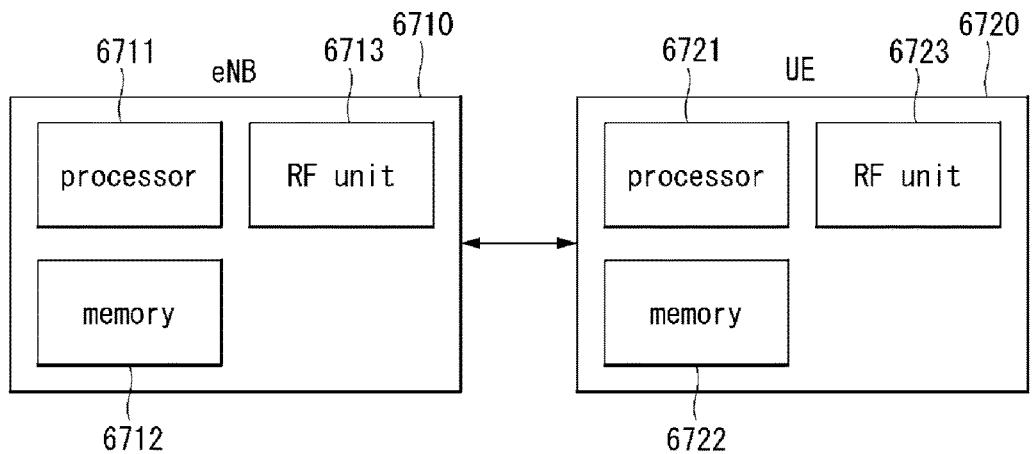

METHOD FOR DEVICE-TO-DEVICE COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/008612, filed on Aug. 18, 2015, which claims the benefit of U.S. Provisional Application No. 62/038,811, filed on Aug. 18, 2014, the contents of which are all hereby incorporated by reference herein in their entirety.

TECHNICAL FIELD

The present disclosure relates to a wireless communication system and, more particularly, to a method for performing or supporting device-to-device (D2D) communication and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

An aspect of the present invention provides a method for separately indicating positions of scheduling assignment (SA) and device-to-device (D2D) data resource domains using a D2D grant.

Another aspect of the present invention provides a method for indicating a bandwidth of SA or D2D data or a more accurate resource domain position using an extra bit of a D2D grant.

Another aspect of the present invention provides a method for maintaining a size of a downlink control information (DCI) format transmitting a D2D grant to be the same as a size of a DCI format 0.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

According to an aspect of the present invention, a method for transmitting and receiving data in a wireless communication system supporting device-to-device (D2D) communication, the method performed by a first terminal, includes: receiving a resource pool to be used for D2D communication from a base station (BS), the resource pool including at least one of a scheduling assignment (SA) resource pool indicating a resource domain in which SA is transmitted and a data resource pool indicating a resource domain in which D2D data is transmitted; transmitting SA including information related to D2D data transmission to a second terminal through the SA resource pool; and transmitting D2D data to the second terminal, wherein the resource pool is included in a downlink control information (DCI) format related to the D2D communication, the DCI format is received from the BS through a physical downlink channel (PDCH), and the DCI format includes control information related to a position of an SA and/or D2D data transmission resource.

Also, in this disclosure, the control information may indicate a combinatorial index.

Also, in this disclosure, the position of the transmission resource of the SA and/or the D2D data may be determined by M number of RB indices selected on the basis of the control information from N number of RB indices.

Also, in this disclosure, the M number of selected RB indices may be in the form of an RB index set.

Also, in this disclosure, a portion of the M number of selected RB indices may indicate a starting position of the SA and/or D2D data transmission resource, and another portion of the M number of selected RB indices may indicate an ending position of the SA and/or D2D data transmission resource.

Also, in this disclosure, a portion of the M number of selected RB indices may indicate a position of the SA transmission resource, and another portion of the M number of selected RB indices may indicate a position of the D2D data transmission resource.

Also, in this disclosure, a bandwidth (BW) of the SA and/or D2D data transmission resource may be fixed or configured through RRC signaling.

Also, in this disclosure, when a transmission resource domain of the SA and a transmission resource domain of the D2D data overlap in a specific subframe, the transmission resource domain of the D2D data may be punctured or rate-matched in the overlapping resource domain.

Also, in this disclosure, when a size of a DCI format related to the D2D communication is smaller than a size of the DCI format 0, a zero bit may be padded to the DCI format related to the D2D communication until the size of the DCI format is equal to the size of the DCI format 0.

Also, in this disclosure, a DCI format related to the D2D communication may be DCI format 5.

Also, in this disclosure, the PDCH may be a physical downlink control channel (PDCCH) or an enhanced physical downlink control channel (E-PDCCH).

Also, in this disclosure, the SA may be transmitted via a physical sidelink control channel (PSCCH), and the D2D data may be transmitted via a physical sidelink shared channel (PSSCH).

According to another aspect of the present invention, a terminal, as a first terminal, for transmitting and receiving data in a wireless communication system supporting device-to-device (D2D) communication, includes: a radio frequency (RF) unit transmitting and receiving a wireless signal; and a processor controlling the first terminal, wherein the processor controls the RF unit to receive a resource pool to be used for D2D communication from a base station (BS), the resource pool including at least one of a scheduling assignment (SA) resource pool indicating a resource domain in which SA is transmitted and a data resource pool indicating a resource domain in which D2D data is transmitted; transmit SA including information related to D2D data transmission to a second terminal through the SA resource pool; and transmit D2D data to the second terminal, wherein the resource pool is included in a downlink control information (DCI) format related to the D2D communication, the DCI format is received from the BS through a physical downlink channel (PDCH), and the DCI format includes control information related to a position of an SA and/or D2D data transmission resource.

Advantageous Effects

According to embodiments of the present invention, since positions of SA and D2D data resource domains are separately indicated using a D2D grant, performance of communication between devices may be enhanced.

Also, according to embodiments of the present invention, since a bandwidth of an SA or D2D data or a more accurate resource domain position is indicated using an extra bit of a D2D grant, efficiency of resource may be enhanced.

Also, according to embodiments of the present invention, since a size of a DCI format transmitting a D2D grant is maintained to be the same as a size of a DCI format 0, the number of times of blind decoding of a device may not be increased.

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 is a view illustrating an example of an evolved universal terrestrial radio access network (E-UTRAN) to which the present disclosure is applicable.

FIG. 2 is a view illustrating physical channels used in a 3GPP LTE/LTE-A system to which the present invention is applicable and a general signal transmitting method using the same.

FIG. 3 is a view illustrating a structure of a radio frame in a wireless communication system to which the present disclosure is applicable.

FIG. 4 is a view illustrating a resource grid regarding one downlink slot in a wireless communication system to which the present disclosure is applicable.

FIG. 5 is a view illustrating a structure of a downlink subframe in a wireless communication system to which the present disclosure is applicable.

FIG. 6 is a view illustrating a structure of an uplink subframe in a wireless communication system to which the present disclosure is applicable.

FIG. 7 is a view illustrating a structure of a DCI format 0 in a wireless communication system to which the present invention is applicable.

FIG. 8 is a view illustrating an example in which PUCCH formats are mapped to a PUCCH region of an uplink physical resource block in a wireless communication system to which the present invention is applicable.

FIG. 9 is a view illustrating a structure of a CQI channel in the case of a general CP in a wireless communication system to which the present invention is applicable.

FIG. 10 is a view illustrating a structure of an ACK/NACK channel in the case of a general CP in a wireless communication system to which the present invention is applicable.

FIG. 11 is a view illustrating an example in which five SC-FDMA symbols are generated and transmitting during one slot in a wireless communication system to which the present invention is applicable.

FIG. 12 is a view illustrating an example of component carriers and carrier aggregation in a wireless communication system to which the present invention is applicable.

FIG. 13 is a view illustrating an example of a subframe according to cross-carrier scheduling in a wireless communication system to which the present invention is applicable.

FIG. 14 is a view conceptually illustrating D2D communication in a wireless communication system to which the present invention is applicable.

FIG. 15 is a view illustrating an example of various scenarios of D2D communication to which a method proposed in the present disclosure is applicable.

FIG. 16 is a view illustrating an example of D2D control information and a D2D data transmitting/receiving method to which a method proposed in the present disclosure is applicable.

FIG. 17 is a view illustrating another example of D2D control information and a D2D data transmitting/receiving method to which a method proposed in the present disclosure is applicable.

FIG. 18 is a view illustrating another example of D2D control information and a D2D data transmitting/receiving method to which a method proposed in the present disclosure is applicable.

FIG. 19 is a view illustrating an example of a D2D control information configuring method according to a D2D transmission method to which a method proposed in the present disclosure is applicable.

FIG. 20 is a view illustrating an example of a timing relation between SG reception and SA transmission in a D2D terminal to which a method proposed in the present disclosure is applicable.

FIGS. 21 and 22 are flow charts illustrating an example of a timing relation between SG reception and SA transmission in a D2D terminal to which a method proposed in the present disclosure is applicable.

FIG. 23 is a view illustrating another example of a timing relation between SG reception and SA transmission in a D2D terminal to which a method proposed in the present disclosure is applicable.

FIG. 24 is a view illustrating another example of a timing relation between SG reception and SA transmission in a D2D terminal to which a method proposed in the present disclosure is applicable.

FIG. 25 is a view illustrating an example of a timing relation between a D2D SA transmission and a D2D data transmission to which a method proposed in the present disclosure is applicable.

FIG. 26 is a view illustrating another example of a timing relation between a D2D SA transmission and a D2D data transmission to which a method proposed in the present disclosure is applicable.

FIG. 27 is a view illustrating another example of a timing relation between a D2D SA transmission and a D2D data transmission to which a method proposed in the present disclosure is applicable.

FIG. 28 is a flow chart illustrating an example of a D2D data transmitting/receiving method to which a method proposed in the present disclosure is applicable.

FIGS. 29 to 32 are views illustrating examples of a method for indicating a position of a SA resource and/or a D2D data resource to which a method proposed in the present disclosure is applicable.

FIG. 33 is a flow chart illustrating an example of a UE scheduling method for a D2D transmission to which a method proposed in the present disclosure is applicable.

FIG. 34 is a view illustrating an example of a UE scheduling method for a D2D transmission using RRC signaling to which a method proposed in the present disclosure is applicable.

FIG. 35 is a view illustrating an example of a UE scheduling method for a D2D transmission using a physical layer channel to which a method proposed in the present disclosure is applicable.

FIG. 36 is a flow chart illustrating an example of a method for performing an HARQ procedure regarding an SG to which a method proposed in the present disclosure is applicable.

FIG. 37 is a view illustrating an example of a D2D operation procedure and a related signaling transmitting/receiving method to which a method proposed in the present disclosure is applicable.

FIGS. 38 to 41 are flow charts illustrating an example of a downlink control information transmitting method to which a method proposed in the present disclosure is applicable.

FIGS. 42 to 50 are views illustrating a downlink control information format to which a method proposed in the present disclosure is applicable.

FIG. 51 is a view illustrating a downlink control information format to which a method proposed in the present disclosure is applicable.

FIG. 52 is a view illustrating a method for deriving a resource block for a SA transmission to which a method proposed in the present disclosure is applicable.

FIG. 53 is a view illustrating a method for designating a resource block for a D2D signal transmission to which a method proposed in the present disclosure is applicable.

FIG. 54 is a view illustrating a downlink control information format to which a method proposed in the present disclosure is applicable.

FIG. 55 is a view illustrating a subframe pattern set to which a method proposed in the present disclosure is applicable.

FIG. 56 is a view illustrating a downlink control information transmitting/receiving method to which a method proposed in the present disclosure is applicable.

FIG. 57 is a view illustrating a method for indicating a time domain resource for D2D scheduling approval to which a method proposed in the present disclosure is applicable.

FIG. 58 is a view illustrating a method for performing D2D communication to which a method proposed in the present disclosure is applicable.

FIGS. 59 to 61 are views illustrating a method for indicating resource for D2D data to which a method proposed in the present disclosure is applicable.

FIGS. 62 to 65 are views illustrating examples of a method for determining a method for determining a position of SA and D2D data transmission resource proposed in this disclosure.

FIG. 66 is a flow chart illustrating an example of a data transmitting/receiving method in D2D communication proposed in this disclosure.

FIG. 67 is a block diagram of a wireless communication device according to an embodiment of the present invention.

BEST MODES

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Wireless Communication System to which Present Invention is Applicable

FIG. 1 is a view illustrating an example of an evolved universal terrestrial radio access network (E-UTRAN) to which the present disclosure is applicable.

The E-UTRAN system is an evolved version of the existing UTRAN system and may be, for example, a 3GPP LTE/LTE-A system. The E-UTRAN consists of eNBs providing a user plane and control plane protocol to a UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbor eNBs. The X2-CP performs functions such as context transfer between eNBs, control of user plane tunnels between source eNB and target eNB, transfer of handover related messages, uplink load management, and the like. An eNB is connected to a UE through a radio interface and is connected to an Evolved Packet Core (EPC) through an S1 interface. The S1 user plane interface (S1-U) is defined between the eNB and a serving gateway (S-GW). The S1 control plane interface (S1-MME) is defined between the eNB and a MME (Mobility Management Entity). The S1 interface performs functions such as EPS (Enhanced Packet System) Bearer Service Management function, NAS (Non-Access Stratum) Signaling Transport function, Network Sharing Function, MME Load balancing Function, and the like. The S1 interface supports a many-to-many relation between the eNB and the MME/S-GW.

FIG. 2 is a view illustrating physical channels used in a 3GPP LTE/LTE-A system to which the present invention is applicable and a general signal transmitting method using the same.

When a power in an OFF state is turned on again or when a UE newly enters a cell, the terminal performs an initial cell search operation such as adjusting synchronization with an eNB, or the like, in step S201. To this end, the UE receives a primary synchronization channel (P-SCH) and a secondary synchronization channel (S-SCH) from the eNB to adjust synchronization with the eNB and obtains information such as a cell ID, or the like.

Thereafter, the UE may receive a physical broadcast signal (PBCH) signal from the eNB to obtain intra-cell broadcast information. Meanwhile, the UE may receive a downlink reference signal (DL RS) in an initial cell discovery stage to check a downlink channel state.

When finishing the initial cell discovery, the UE may receive a PDCCH and a PDSCH according to the PDCCH to obtain more specific system information in step S202.

Thereafter, in order to complete connection to the eNB, the UE may perform a random access procedure as that in steps S203 to S206. To this end, the UE may transmit a preamble via a physical random access channel (PRACH) (S203) and receive a response message regarding the preamble via the PDCCH and the PDSCH corresponding thereto (S204). In the case of a contention-based random access, the UE may perform a contention resolution procedure such as transmitting an additional PRACH signal (S205) and receiving a PDCCH signal and a PDSCH signal corresponding thereto (S206).

After performing the aforementioned procedure, the UE may receive a PDCCH signal and/or a PDSCH signal (S207) and transmit a PUSCH signal and/or a PUCCH signal in a general uplink/downlink signal transmission procedure.

Control information transmitted by the UE to the eNB is generally referred to as uplink control information (UCI). The UCI includes HARQ (Hybrid Automatic Retransmit reQuest)-ACK (Acknowledge)/NACK (Non-Acknowledge), a scheduling request (SR), a Channel Quality Indicator (CQI), a precoding matrix indicator (PMI), rank indication (RI) information, and the like.

In the LTE/LTE-A system, the UCI is periodically transmitted via a PUCCH. However, in a case in which control information and traffic data are to be transmitted simultaneously, the UCI may be transmitted via a PUCCH. Also, the UCI may be aperiodically transmitted via a PUSCH according to a request/indication from/by a network.

FIG. 3 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 3(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 3(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 4 is a diagram illustrating a resource grid for one downlink slot in the wireless communication system to which the present invention can be applied.

Referring to FIG. 4, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 5 illustrates a structure of a downlink subframe in the wireless communication system to which the present invention can be applied.

Referring to FIG. 5, a maximum of three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 6 illustrates a structure of an uplink subframe in the wireless communication system to which the present invention can be applied.

Referring to FIG. 6, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

PDCCH (Physical Downlink Control Channel

Control information transmitted via a PDCCH is called downlink control indicator (DCI). A size and a purpose of control information of the PDCCH may be varied according to a DCI format, and a size of the PDCCH may also be varied according to a coding rate.

Table 2 shows DCIs according to a DCI format.

TABLE 2

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 2, the DCI format includes format 0 for PUSCH scheduling, format 1 for scheduling one PDSCH codeword, format 1A for compact scheduling of one PDSCH codeword, format 1C for very compact scheduling of DL-SCH, format 2 for PDSCH scheduling in a closed-loop spatial multiplexing mode, format 2A for PDSCH scheduling in an open loop spatial multiplexing mode, formats 3 and 3A for transmission of a transmission power control (TPC) command for an uplink channel, and format 4 for PUSCH scheduling within one uplink cell in a multi-antenna port transmission mode.

The DCI format 1A may be used for PDSCH scheduling no matter what transmission mode is set in a UE.

The DCI formats may be independently applied to each UE, and PDCCHs of several UEs may be simultaneously multiplexed in one subframe. The PDCCH includes an aggregation of one or some contiguous control channel elements (CCEs).

Such a DCI format may be independently applied by UEs, and PDCCHs of several UEs may be simultaneously multiplexed in one subframe. A PDCCH is configured as an aggregation of one or several contiguous control channel elements (CCEs). A CCE is a logical allocation granularity used to provide a coding rate in accordance with a state of a wireless channel to a PDCCH. A CCE refers to a unit corresponding to 9 sets of REG including four resource elements. An eNB may use {1, 2, 4, 8} number of CCEs to configure one PDCCH signal, and here, {1, 2, 4, 8} is called a CCE aggregation level. The number of CCEs used to transmit a specific PDCCH is determined by an eNB according to a channel state. A PDCCH configured according to each UE is interleaved and mapped to a control channel region of each subframe by a CCE-to-RE mapping rule. A position of a PDCCh may be varied according to the number of OFDM symbols for a control channel of each subframe, the number of PHICH groups, a transmission antenna, and a frequency shift.

As described above, channel coding is independently performed on a multiplexed PDCCH of each UE and a cyclic redundancy check (CRC) is applied. A UE ID is masked to a CRC to allow a UE to receive a PDCCH thereof. However, an eNB does not provide information regarding where a corresponding PDCCH is present in a control region allocated in a subframe, to a UE. Since the UE does not know in which position and in what CCE aggregation level or DCI format a PDCCH thereof is transmitted, the UE searches for a PDCCH thereof by monitoring an aggregation of PDCCH candidates in a subframe in order to receive a control channel transmitted from the eNB. This is called blind decoding (BD). Blind decoding may be called blind detection or blind search. Blind decoding refers to a method by which the UE de-masks a UE ID of the UE in a CRC portion and checks a CRC error to check whether a corresponding PDCCH is a control channel of the UE.

Hereinafter, information transmitting in a DCI format 0 will be described.

FIG. 7 is a view illustrating a structure of a DCI format 0 in a wireless communication system to which the present invention is applicable.

The DCI format 0 is used to schedule a PUSCH in one uplink cell.

Table 3 illustrates information transmitted in the DCI format 0.

TABLE 3

| Format 0 (Release 8) | Format 0 (Release 10) |
|---|---|
|  | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
|  | SRS request |
|  | Resource allocation type (RAT) |

Referring to FIG. 7 and Table 3, information transmitted via the DCI format 0 is as follows.

1) Carrier indicator—it consists of 0 or 3 bits.
2) A flag for distinguishing between DCI format 0 and format 1A—it consists of 1 bit, and value 0 indicates DCO format 0 and value 1 indicates DCI format 1A.
3) Frequency hopping flag—It consists of 1 bit. This field may be used to allocate a most significant bit (MSB) of corresponding resource allocation to a multi-cluster, if necessary.
4) Resource block assignment and hopping resource assignment—It consists of $\lceil \log_2(N_{RB}^{UL}(N_{RB}^{UL}+1)/2) \rceil$ bits.

Here, in the case of PUSCH hopping in a single-cluster allocation, $N_{UL\_hop}$ number of MSBs are used to obtain a value of $\tilde{n}_{PRB}(i)$ (i.e., hopping information ($\lceil \log_2(N_{RB}^{UL}(N_{RB}^{UL}+1)/2) \rceil - N_{UL\_hop}$) bits provide resource allocation of a first slot in an uplink subframe. Here, details of the value $\tilde{n}_{PRB}(i)$ (i.e., hopping information) will be described hereinafter.

Also, when there is no PUSCH hopping in the single-cluster allocation, ($\lceil \log_2(N_{RB}^{UL}(N_{RB}^{UL}+1)/2) \rceil$) bits provide resource allocation in an uplink subframe.

Also, when there is no PUSCH hopping in a multi-cluster allocation, resource allocation information is obtained from concatenation of a frequency hopping field and a resource block allocation and hopping resource allocation field, and $$\left\lceil \log_2\left( \binom{\lceil N_{RB}^{UL}/P+1 \rceil}{4} \right) \right\rceil$$

bits provide resource allocation in an uplink subframe. Here, the value P is determined by the number of downlink resource blocks.

5) Modulation and coding scheme (MCS) and redundancy version (RV)—it consists of 5 bits.
6) New data indicator (NDI)—It consists of 1 bit.
7) Transmit power control (TPC) command for PUSCH—It consist of 2 bits.
8) Index of cyclic shift (CS) and orthogonal cover/orthogonal cover code (OC/OCC) for demodulation reference signal (DMRS)—It consists of 3 bits.
9) Uplink index—It consists of 2 bits. This field is present only in a TDD operation according to uplink-down configuration 0.
10) Downlink assignment index (DAI)—It consists of 2. This field is present only in a TDD operation according to uplink-downlink configuration 1-6.
11) Channel state information (CSI) request—It consists of 1 or 2 bits. Here, 2-bit field is applied only when a corresponding DCI is mapped by a cell-RNTI (C-RNTI) to a UE in which one or more downlink cells are set to be UE-specific.
12) Sounding reference signal (SRS) request—It consists of 0 or 1 bit. Here, this field is present only when a scheduled PUSCH is mapped by a C-RNTI to be UE-specific.
13) (Resource allocation type—It consists of 1 bit.

In a case in which the number of information bits in the DCI format 0 is smaller than a size of payload (including an added padding bit) of the DCI format 1A, 0 is added to the DCI format 0 such that the size of payload of the DCI format 1A is the same.

Uplink Resource Allocation

Regarding a PDCCH/enhanced PDCCH (EPDCCH) transferring an uplink DCI format (e.g., DCI format 0/4), two types of uplink resource allocation schemes are supported.

An uplink DCI format supports a method of indicating one resource including contiguous resource blocks as uplink resource allocation (resource allocation type 0) and a method of indicating two resources including contiguous resource blocks as uplink resource allocation.

In a case in which a resource allocation type bit is not present in an uplink DCI format (i.e., DCI format 0), only a resource allocation type 0 is supported.

Meanwhile, in a case in which a resource allocation type bit is present in an uplink DCI format (i.e., DCI format 4), when the resource allocation type bit has a value 0, it indicates resource allocation type 0, and if not, a resource allocation type 1 is indicated. The UE interprets the resource allocation field according to the resource allocation type bit within a PDCCH/EPDCCH transferring a detected uplink DCI format.

Both of the two uplink resource allocation types indicate a virtual resource block (VRB). The VRB indicates a virtual unit resource block for transmission of a data channel or a control channel. One VRB may be mapped to one PRB or one VRB may be mapped to a plurality of PRBs.

The VRB may be divided into a localized VRB (LVBR) and a distributed VRB (DVRB). One LVRB is mapped to one PRB and PRBs to which different LVRBs are mapped are not repeated. Meanwhile, one DVRB is mapped to some REs within a plurality of PRBs.

First, resource allocation information in accordance with an uplink resource allocation type 0 indicates a VRB index (n_VRB) contiguously allocated to a scheduled UE. A resource allocation field within a scheduling grant includes a resource indication value (RIV) corresponding to a length of a start resource block (RB_START) and contiguously allocated resource blocks.

When $(L_{CRBs}-1) \leq \lfloor N_{RB}^{UL}/2 \rfloor$ is satisfied, the RIV is defined as expressed by Equation 1 below, and if not, the RIV is defined as expressed by Equation 2 below.

Here, N_RB^UL indicates the number of entire resource blocks (RBs) in an uplink bandwidth.

$RIV=N_{RB}^{UL}(L_{CRBs}-1)+RB_{START}$ [Equation 1]

$RIV=N_{RB}^{UL}(N_{RB}^{UL}-L_{CRBs}+1)+(N_{RB}^{UL}-1-RB_{START})$ [Equation 2]

Resource allocation information regarding an uplink resource allocation type 1 indicates two resource block sets to a scheduled UE. Here, each set includes one or more contiguous resource block groups (RBGs).

A size of the RGB is determined according to an uplink bandwidth as illustrated in Table 4.

TABLE 4

| System Bandwidth $N_{RB}^{UL}$ | RBG Site (P) |
|---|---|
| ≤10 | 1 |
| 11-26 | 2 |
| 27-63 | 3 |
| 64-119 | 4 |

Referring to Table 4, in the case of a smallest bandwidth (≤10), since a size of an RBG is a single resource block, resource may be allocated in units of resource blocks. Meanwhile, in the case of a largest bandwidth (64-110), four resource blocks form a group.

A resource allocation field within a scheduling grant includes a combinatorial index (r).

In a resource allocation type 1, a starting point and an ending point of two resource block sets including contiguous resource blocks are indicated by an index on each frequency.

In other words, the combinatorial index (r) for indicating resource allocation is defined as expressed by Equation 3 below to correspond to a start RBG index (s_0) and a final RBG index (s_1-1) of a resource block set 1 and a start RBG index (s_2) and a final RBG index (s_3-1) of a resource block set 2.

$$r = \sum_{i=0}^{M-1} \binom{N - s_i}{M - i}$$ [Equation 3]

In Equation 3, M=4 and N=⌈$N_{RB}^{UL}$/P⌉+1.

In a single cluster allocation, two types of PUSCH frequency hopping is supported. Meanwhile, in a multi-cluster allocation, PUSCH frequency hopping is not supported, and in this case, frequency diversity may be obtained by disposing two clusters in appropriate positions.

When a 1-bit frequency hopping (FH) field in a corresponding PDCCH/EPDCCH carrying the DCI format 0 is set to 1 and an uplink resource block assignment is type 0, the UE performs PUSCH frequency hopping. If not, PUSCH hopping is not performed.

The UE performing PUSCH frequency hopping determines a PUSCH resource allocation (RA) for a first slot (S1) of a subframe from a resource allocation field with the latest PDCCH/EPDCCH carrying the DCI format 0 for the same transport block. Here, the first slot (S1) of the subframe includes a lowest index PRB($n_{PRB}^{S1}$(n)) within a subframe n.

When the PDCCH/EPDCCH for the same transport block is not present, the UE determines a hopping type on the basis of the following.

Hopping information within the latest semi-persistent scheduling approval PDCCH/EPDCCH when a first PUSCH regarding the same transport block is semi-persistently scheduled Random access grant for the same transport block when a PUSCH is initiated by a random access response grant A resource allocation field of the DCI format 0 excludes one or two bits used for hopping information indicated in Table 5 below. Here, the number of PUSCH resource blocks is defined as expressed by Equation 4.

[Equation 4]

$$N_{RB}^{PUSCH} = \begin{cases} N_{RB}^{UL} - \tilde{N}_{RB}^{HO} - (N_{RB}^{UL} \bmod 2) & \text{Type 1 } PUSCH \text{ hopping} \\ N_{RB}^{UL} & \text{Type 2 } N_{sb} = 1 \text{ } PUSCH \text{ hopping} \\ N_{RB}^{UL} - \tilde{N}_{RB}^{HO} & \text{Type 2 } N_{sb} > 1 \text{ } PUSCH \text{ hopping} \end{cases}$$

In the PUSCH hopping type 1 and type 2, N_RB^HO is given by higher layer signaling (e.g., RRC signaling). When N_RB^HO is an odd number, $\tilde{N}_{RB}^{HO}=N_{RB}^{HO}$+1, and if not, $\tilde{N}_{RB}^{HO}=N_{RB}^{HO}$. A size of a resource allocation field within the DCI format is y=⌈$\log_2(N_{RB}^{UL}(N_{RB}^{UL}+1)/2)$⌉-$N_{UL\_hop}$, excluding one or two bits. Here, N_UL_hop=1 or 2 bits. The number of contiguous RBs that can be approved to a PUSCH hopping type 1 user is limited to ⌊$2^y/N_{RB}^{UL}$⌋. The number of contiguous RBs that can be approved to a PUSCH hopping type 2 user is limited to min(⌊$2^y/N_{RB}^{UL}$⌋, ⌊$N_{RB}^{PUSCH}/N_{sb}$⌋). Here, the number of subbands N_sb is given by higher layer signaling (e.g., RRC signaling).

The UE performs PUSCH frequency hopping using any one of two available PUSCH frequency hopping types on the basis of hopping information within uplink scheduling grant.

As described above, the UE obtains a value of (i.e., $\tilde{n}_{PRB}^{(i)}$ hopping information) using N_UL_hop number of the most significant bits (MSBs) of a resource block field within uplink scheduling grant.

Table 5 illustrates the number of hopping bits (N_UL_hop) according to a system bandwidth.

TABLE 5

| System BW $N_{RB}^{UL}$ | #Hopping bits for 2nd slot RA (N_UL_hop) |
|---|---|
| 6-49 | 1 |
| 50-110 | 2 |

Referring to Table 5, when the uplink bandwidth is 6-49, 1 bit is allocated as the number of hopping bits (N_UL_hop) for a second slot, and when the uplink band width is 50-100, 2 bits are allocated as the number of hopping bits (N_UL_hop) for a second slot.

A hopping mode is determined whether PUSCH frequency hopping is an "inter-subframe" hopping or "inter-subframe" hopping by a parameter "Hopping-mode" provided by a higher layer.

First, referring to PUSCH frequency hopping type 1, a lowest index (n_PRB^S1(i)) of a physical block in a first slot of a resource-allocated subframe i is defined as $n_{PRB}^{S1}(i)=\tilde{n}_{PRB}^{S1}+\tilde{N}_{RB}^{HO}/2$. Here, $n_{PRB}^{S1}(i)=RB_{START}$, and RB_START is obtained by uplink scheduling grant as described above.

Also, a lowest index (n_PRB(i)) of a physical block in a second slot of the resource-allocated subframe i is defined as $n_{PRB}(i)=\tilde{n}_{PRB}(i)+\tilde{N}_{RB}^{HO}/2$. Here, a hopping bit (1 or 2 bits) of a PUSCH hopping type 1 indicated in Table 5 determines a value of $\tilde{n}_{PRB}$ (i) as illustrated in Table 6 below. In Table 6, N_RB^PUSCH refers to the number of RBs allocated for PUSCH transmission.

That is, a physical resource block set used for PUSCH transmission includes L_CRBs number of contiguous resource blocks from a PRB index n_PRB^S1(i) in a first slot and includes L_CRBs number of contiguous resource blocks from n_PRB(i) from a PRB index in a second slot. Here, L_CRBs is obtained from uplink scheduling grant as described above.

Table 6 illustrates definition of hopping bits of PDCCH/EPDCCH DCI format 0.

TABLE 6

| System BW $N_{RB}^{UL}$ | Number of Hopping bits | Information in hopping bits | $\tilde{n}_{PRB}^{(i)}$ |
|---|---|---|---|
| 6-49 | 1 | 0 | (⌊$N_{RB}^{PUSCH}/2$⌋ + $\tilde{n}_{PRB}^{S1}(i)$) mod $N_{RB}^{PUSCH}$ |
|  |  | 1 | Type 2 PUSCH Hopping |
| 50-110 | 2 | 00 | (⌊$N_{RB}^{PUSCH}/4$⌋ + $\tilde{n}_{PRB}^{S1}(i)$) mod $N_{RB}^{PUSCH}$ |
|  |  | 01 | (-⌊$N_{RB}^{PUSCH}/4$⌋ + $\tilde{n}_{PRB}^{S1}(i)$) mod $N_{RB}^{PUSCH}$ |
|  |  | 10 | (⌊$N_{RB}^{PUSCH}/2$⌋ + $\tilde{n}_{PRB}^{S1}(i)$) mod $N_{RB}^{PUSCH}$ |
|  |  | 11 | Type 2 PUSCH Hopping |

Referring to Table 6, in a case in which a hopping bit consists of 1 bit, when the hopping bit has a value 1, a PUSCH frequency hopping type 2 is performed, and when the hopping bit has a value 0, frequency hopping is performed in the second slot by ½ of an uplink bandwidth.

In a case in which the hopping bit consists of 2 bits, when the hopping bits has a value "11", a PUSCH frequency hopping type 2 is performed by the UE. Hopping bits "00", "01", and "10" are frequency-hopped in a second slot by ¼, −¼, and ½ of an uplink bandwidth, respectively.

Referring to PUSCH frequency hoping type 2, a set of a physical resource blocks to be used for transmission in a slot (n_s) is determined by a predetermined pattern together with scheduling grant.

In the case of the PUSCH frequency hoping type 2, an aggregation of sub-bands including contiguous resource blocks having a predetermined size in the entire uplink bandwidth (excluding a resource block in which a PUCCH is transmitted) is defined. Here, the number of sub-bands is given by higher layer signaling (e.g., RRC signaling).

When a system frame number is not obtained by the UE, the UE does not transmit a PUSCH using the PUSCH frequency hopping type 2.

Also, VRBs allocated by uplink scheduling grant are mapped to a corresponding PRB according to a predetermined hopping pattern on the basis of sub-band. For example, when a hopping pattern value 1, the VRB is mapped to a PRB shifted by one sub-band.

Here, in the hopping pattern, different shifts may be set in each slot.

Also, a mirroring pattern in units of sub-bands may be previously set in the hopping pattern. When mirroring is turned on, VRBs are indexed in reverse order, compared with VRB indices in slots in which mirroring is turned off. As a result, PRBs are mapped in reverse order.

PUCCH (Physical Uplink Control Channel

The uplink control information (UCI) transmitted through the PUCCH may include a scheduling request (SR), HARQ ACK/NACK information, and downlink channel measurement information.

SR(Scheduling Request): It is information used for requesting an uplink UL-SCH resource. It is transmitted using an on-off keying (OOK) scheme.

HARQ ACK/NACK: It is a response signal with respect to a downlink data packet in a PDSCH. It indicates whether a downlink data packet has been successfully received. An 1-bit ACK/NACK is transmitted in response to a single downlink codeword, and 2-bit ACK/NACK is transmitted in response to two downlink codewords.

CSI (Channel State Information): It is feedback information regarding a downlink channel. A CSI may include at least one of a channel quality indicator (CQI), a rank indicator (RI), a precoding matrix indicator (PMI), and a precoding type indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 7 given below.

TABLE 7

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 8 illustrates one example of a type in which PUCCH formats are mapped to a PUCCH region of an uplink physical resource block in the wireless communication system to which the present invention can be applied.

In FIG. 8, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 8, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 9 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 10 illustrates a structure of an ACK/NACK channel in the case of a general CP in the wireless communication system to which the present invention can be applied.

In FIG. 10, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling Parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 11 illustrates one example of generating and transmitting 5 SC-FDMA symbols during one slot in the wireless communication system to which the present invention can be applied.

In FIG. 11, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 11, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 11, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell). The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 12 illustrates examples of a component carrier and carrier aggregation in the wireless communication system to which the present invention can be applied.

FIG. 12*a* illustrates a single carrier structure used in an LTE system. The component carrier includes the DL CC and the UL CC. One component carrier may have a frequency range of 20 MHz.

FIG. 12*b* illustrates a carrier aggregation structure used in the LTE system. In the case of FIG. 12*b*, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 13 illustrates one example of a subframe structure depending on cross carrier scheduling in the wireless communication system to which the present invention can be applied.

Referring to FIG. 13, a case is illustrated, in which three DL CCs are associated with a DL subframe for an LTE-A terminal and DL CC 'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 14 is a diagram for schematically describing the D2D communication in a wireless communication system to which the present invention may be applied.

FIG. 14a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 14b illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 15 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 15a illustrates an example of an out-of-coverage network scenario of the D2D communication.

The out-of-coverage network scenario means perform the D2D communication between the D2D UEs without control of the base station.

In FIG. 15a, only the UE1 and the UE2 are present and the UE1 and the UE2 may directly communicate with each other.

FIG. 15b illustrates an example of a partial-coverage network scenario of the D2D communication.

The partial-coverage network scenario means performing the D2D communication between the D2D UE positioned in the network coverage and the D2D UE positioned out of the network coverage.

In FIG. 15b, it may be illustrated that the D2D UE positioned in the network coverage and the D2D UE positioned out of the network coverage communicate with each other.

FIG. 15c illustrates an example of the in-coverage-single-cell and FIG. 15d illustrates an example of the in-coverage-multi-cell scenario.

The in-coverage network scenario means that the D2D UEs perform the D2D communication through the control of the base station in the network coverage.

In FIG. 15c, the UE1 and the UE2 are positioned in the same network coverage (alternatively, cell) under the control of the base station.

In FIG. 15d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 15, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

Hereinafter, methods for transmitting D2D control information and/or D2D data proposed in the present disclosure will be described in more detail.

Hereinafter, in describing the present invention, the D2D control information may be referred to as D2D Scheduling Assignment (SA) or simply as SA, and D2D data may also be simply referred to as Data.

As described above, D2D may be represented as a sidelink.

Furthermore, D2D control information may be represented as a Sidelink Control Information (SCI), and the D2D control information may be sent and received over a PSCCH (Physical Sidelink Control Channel).

Furthermore, D2D data may be sent and received over a PSSCH (Physical Sidelink Shared Channel), and the transmission and reception of the D2D data may be represented as PSSCH transmission and reception.

In performing D2D communication, it is necessary to define D2D control information in order for a D2D UE to demodulate D2D data.

As described above, the D2D control information may be represented as SCI, both of which may be interchangeably used hereinafter.

Here, the D2D control information may be transmitted over a different channel (or in a different signal) than a D2D communication channel for delivering the D2D data.

As described above, the D2D communication channel may be represented as PSSCH, both of which may be interchangeably used hereinafter.

Furthermore, methods to be described below may apply equally when control information required to deliver a D2D discovery message is transmitted separately.

The D2D control information may include some of or the entire information, such as a New Data Indicator (NDI), Resource Allocation (RA) (or a resource configuration), a Modulation and Coding Scheme/Set (MCS), a Redundancy Version (RV), and a Tx UE ID.

The D2D control information may have a different combination of pieces of information depending on a scenario to which the D2D communication of FIG. 15 is applied.

In general, control information (CI) may be decoded before a data channel is decoded because the data channel is used to demodulate the data channel.

Accordingly, UEs that receive the control information need to be aware the location of time and frequency resources through which the control information is transmitted and related parameters for the demodulation of the data channel.

For example, in an LTE (-A) system, in the case of a PDCCH, a UE ID-based hashing function is used by a transmission stage (e.g., an eNB) and a reception stage (e.g., UE) in common so that the UE can be aware that the PDCCH will be transmitted to a specific location among specific symbols of each subframe.

Furthermore, in an LTE (-A) system, in the case of a BCH, an eNB and UE share information, indicating that system information is delivered in a specific symbol of a specific subframe (SF) with a periodicity of 40 ms, in advance.

As described above, in order for UE to properly obtain the control information, demodulation-related information (or parameters) of the control information may need to be sufficiently delivered to the UE in advance.

Likewise, in a system supporting D2D communication, in order for a D2D UE to successfully demodulate D2D control information, parameters related to the transmission of the D2D control information may need to be shared by the D2D UE in advance.

The parameters related to the transmission of the D2D control information may include, for example, a subframe/slot index, a symbol index, or an RB index.

Furthermore, the parameters related to the transmission of the D2D control information may be the DCI of a specific format and may be obtained through a PDCCH from an eNB or another D2D UE.

The DCI of the specific format means a newly defined DCI format and may be, for example, a DCI format 5.

In an embodiment, the D2D control information may be designated to be transmitted in all of subframes designated as D2D subframes (i.e., subframes designated for D2D transmission), a series of subframes (a set of subframes or a subframe set) that belong to all the subframes and that has a specific index, or a subframe set having a specific period.

Such potential transmission subframe or subframe set of the D2D control information may be recognized by UE in advance through (higher-layer) signaling or based on UE-specific information (e.g., a UE ID) in such a manner that the UE may autonomously calculate the transmission subframe or subframe set.

Furthermore, a resource region in which a D2D data channel is delivered and a resource region in which D2D control information is delivered may be differently configured in a time domain.

That is, the D2D control information may be defined to be transmitted in a designated time unit, that is, periodically (or while hopping in a designated time-frequency domain pattern). The D2D data channel may be defined to be delivered only in a resource region indicated by the D2D control information.

In this method, unlike a method for transmitting D2D control information and D2D data together, the D2D control information and the D2D data are transmitted separately.

Specifically, if the D2D control information and the D2D data are separately transmitted, (1) parameters (e.g., scrambling, CRC, CRC masking, or demodulation sequence generation parameters) applied to the D2D control information and the D2D data are independently set, or (2) parameters applied to the D2D data are indicated through the D2D control information.

In the case of (2), a D2D UE attempts (e.g., explicit or blind decoding) to monitor and decode the D2D control information using a potential parameter in a potential resource (i.e., subframe or subframe set) in which the D2D control information is reserved to be transmitted, and does not perform decoding attempts at the D2D control information in a resource region other than the potential resource.

In this case, there is an advantage in that power consumption of UE can be reduced.

Furthermore, if UE demodulates D2D data, the UE only has to demodulate designated information at a designated point using a parameter and D2D data resource region information obtained through the D2D control information. Accordingly, there is an advantage in that power consumption of UE can be reduced.

In an embodiment for implementing the aforementioned methods, a method for UEs to perform blind search (or decoding) on a specific resource region in order to obtain D2D control information at a specific point of time and decoding D2D control information matched with each UE is described below.

In this case, it can be found out whether D2D control information is matched with each UE, based on UE-specific information or UE group-specific (UE group-common) information.

That is, only a corresponding UE may perform (blind) decoding on D2D control information by applying UE-specific scrambling or CRC masking to the D2D control information, or all of a plurality of UEs (or a group or all) may decode the D2D control information by applying UE-group common scrambling or CRC masking to the D2D control information.

Accordingly, a UE or a UE group may obtain information related to D2D data demodulation from D2D control information that has been successfully decoded.

The D2D control information (or SCI) includes parameters (in this case, including parameters obtained through blind search from a given D2D control channel set in addition to predetermined parameters) used in a D2D control channel (PSCCH) in addition to explicit information included in D2D control information.

The parameters used in the D2D control channel may include scrambling, CRC masking, use resource information, and reference signal-related parameters.

Accordingly, UE may not perform blind decoding on D2D data.

To sum up, a UE or a UE group performs blind decoding on D2D control information through a specific parameter at a specific point of time using its own unique information or based on previously (higher-layer) signaled information in order to obtain the D2D control information.

Through such blind decoding, the UE or UE group may obtain both scheduling information related to data demodulation and various parameters used to generate and transmit a D2D control channel (or control information).

Accordingly, the UE or UE group uses the parameter related to the D2D control channel and the decoded scheduling information to decode and demodulate a D2D data channel.

In this case, the D2D data channel may be represented as a physical sidelink shared channel (PSSCH).

The scheduling information may refer to explicit information, such as resource allocation information, an NDI, an MCS, or a Tx UE ID required to demodulate D2 data.

Furthermore, as described above, the scheduling information may be represented as Sidelink Control Information (SCI).

UE is not required to perform parameter blind search, such as that performed on a D2D control channel (or a PSCCH) with respect to a D2D data channel (PSSCH), because it uses a parameter through blind search with respect to the D2D control channel without any change or uses a new parameter generated based on the parameter to generate the D2D data channel.

In another embodiment, a D2D control channel and a D2D data channel may be transmitted in the same subframe (from the standpoint of a UE or a UE group) or may be implemented to have different periodicities in time.

That is, such a method is a method for UE to perform blind decoding on a D2D control channel in a specific subframe and demodulating the D2D data of the same subframe based on corresponding information.

In this case, it is assumed that the UE will not perform blind decoding on the D2D data.

Instead, the UE may perform blind decoding only on the D2D control channel so that blind decoding complexity is dependent only on a D2D control channel in a corresponding subframe.

That is, the UE performs blind decoding only on D2D control information in the corresponding subframe.

If the UE has to perform blind decoding on D2D data, when D2D control information and D2D data are transmitted in the same subframe, the UE's trials of blind decoding may increase suddenly.

In this case, the number of UEs capable of detecting D2D control information through blind decoding in a specific subframe may be limited.

That is, if the transmission periods of D2D control information and D2D data are fixed, there may be a case where the D2D control information and the D2D data are transmitted in the same subframe in some situations depending on their periodicity.

In this case, if there is a limit to blind decoding trials in a corresponding subframe, the blind decoding trials of a D2D control information channel and/or a D2D data channel may have to be reduced.

In order to reduce such a problem, the blind decoding of UE may be introduced only in a D2D control channel so as to prevent a limitation to blind decoding trials caused by a variation of blind decoding complexity.

Furthermore, there is an advantage that the degree of freedom of scheduling for a D2D data channel may be increased by introducing blind decoding only in a D2D control channel.

That is, although D2D control information and D2D data are placed in the same subframe, if blind decoding is applied to a D2D control channel only, there is no limitation to blind decoding complexity.

Accordingly, although a D2D control channel is periodically transmitted in a specific subframe, a subframe for transmitting a D2D data channel may be determined and allocated even without avoiding a subframe in which the D2D control channel is transmitted.

Assuming that a D2D control channel is detected once and then transmitted in a specific subframe after D2D data associated with the D2D control channel is transmitted, D2D control information does not need to be transmitted again in the transmission opportunity subframe (i.e., a D2D control channel transmission period or PSCCH period) of the D2D control channel during an interval of time until a subframe in which the D2D data will be transmitted.

Likewise, from the standpoint of UE, blind decoding (or monitoring) may not be performed on a D2D control channel until a D2D data subframe indicated by D2D control information after blind decoding is performed on the D2D control channel.

In this case, the power consumption of the UE can be reduced. This may be differently configured for each UE.

If the period in which a D2D control channel is transmitted (or a PSCCH period) and a subframe offset are differently configured in each UE, each UE may be aware of a subframe in which monitoring for D2D control information needs not to be performed.

That is, when each UE performs blind decoding on D2D control information in a specific subframe, it may be aware how long it may perform discontinuous reception (DRX) or discontinuous transmission (DTX) by taking into consideration the monitoring subframe period and offset of its own D2D control information.

After receiving and demodulating D2D control information (i.e. scheduling assignment), UE may calculate how long it does not need to monitor D2D control information, that is, how long it may perform DTX, by properly using a specific bit value and D2D control information subframe period (i.e., PSCCH period) information carried on corresponding subframe index, UE ID, or D2D control information.

FIG. 16 is a diagram showing an example of a method for transmitting and receiving D2D control information and D2D data, which is proposed according to the present disclosure.

In FIG. 16, C1 represents a resource that belongs to D2D resources allocated to UE 1 (or a UE-group 1) and that is used to transmit D2D control information.

The C1 1601 may be obtained through an (E-)PDCCH, an SIB, "preconfigured", or "relaying by UE."

For example, UE may obtain the C1 (or the SCI format 0) through the DCI format 5 transmitted through a PDCCH.

Furthermore, the period of the C1 corresponds to a period #1.

C2 1602 represents a resource that belongs to D2D resources allocated to UE 2 (or a UE-group 2) and that is used to transmit D2D control information.

The period of the C2 corresponds to a period #2.

The periods of the C1 and C2 may be represented as a PSCCH period #1 and a PSCCH period #2, respectively.

In FIG. 16, first C1 information indicates parameters related to the transmission of D2D data #1 1603 and indicates various types of information (e.g., scheduling information, such as a DM RS sequence, an MCS, and RA) for reception UE in order to demodulate the D2D data #1.

Furthermore, the first C2 information indicates parameters related to the transmission of D2D data #2 1604 and indicates various types of information (e.g., scheduling information) for reception UE in order to demodulate the D2D data #2.

In FIG. 16, second C1 information 1605 and second C2 information 1606 indicate parameters (e.g., scheduling information) following the first D2D data #1 1603 and the first D2D data #2 1604, that is, parameters associated with second Data #1 and Data #2 1607.

Each UE performs blind decoding on D2D control information, corresponding to each UE, with respect to a corresponding subframe because it is aware in advance of the location of a subframe for D2D control information where the UE may perform monitoring.

FIG. 17 is a diagram showing another example of a method for transmitting and receiving D2D control information and D2D data, which is proposed according to the present disclosure.

In FIG. 17, UE may be aware that D2D data (D2D data #1) related to a C1 1701 is delivered in a D2D data #1 subframe 1702 by performing blind decoding on the C1 1701.

Furthermore, if the UE is aware in advance that there is no C1 in a subframe 1703 periodically reserved (or allocated) for the purpose of transmitting D2D control information after the C1, the UE may skip the reserved subframe 1703 without performing monitoring or blind decoding.

That is, FIG. 17 shows that UE does not perform additional monitoring and blind decoding on D2D control information in a periodically reserved subframe present between the C1 and the data #1.

In this case, it may be considered that the UE performs a DTX operation in a specific subframe in order to reduce power consumption because it may be aware in advance that it does not need to perform monitoring and blind decoding on D2D control information in the specific subframe.

FIG. 18 is a diagram showing yet another example of a method for transmitting and receiving D2D control information and D2D data, which is proposed according to the present disclosure.

In the example of FIG. 17, UE has skipped blind decoding for all of subframes periodically reserved between the C1 and the data #1.

In contrast, FIG. 18 shows a method for UE to skip a reserved D2D control information subframe from a monitoring subframe only when a previously agreed condition is satisfied, rather than skipping blind decoding for all of reserved D2D control information subframes, if a D2D control information subframe reserved to transmit D2D control information is present between the D2D control information and a D2D data subframe indicated by the D2D control information.

From FIG. 18, it may be seen that UE performs blind decoding in a C11 1801 and a C13 1803 and skips blind decoding in a C12 1802.

That is, all of the monitoring subframes C11, C12, and C13 of candidate D2D control information between the C11 1801 and data #11 1804 are not skipped.

For example, the UE performs monitoring on the last subframe C13 1803 of the candidate subframes present between the C11 1801 and the data #11 1804 for blind decoding.

In some embodiments, if N D2D control information candidate subframes are present between a D2D control information (or scheduling information) subframe and a D2D data transmission subframe, blind decoding for K candidate subframes placed at the last portion may be skipped.

In this case, the value k may be configured depending on system operation.

In some embodiments, if a D2D control information subframe is divided into a subframe used for D2D transmission and a subframe used for D2D reception (i.e., if two types of subframes are present because they cannot be transmitted and received at the same time due to a half-duplex constraint), the blind decoding skip rule may apply only to the subframe used for D2D transmission.

If there is no distinction between a subframe used for D2D transmission and a subframe used for D2D reception, the blind decoding skip rule may apply by taking into consideration both the two types (D2D transmission and D2D reception) of subframes.

In some embodiments, if the valid period of D2D control information is present, the UE may assume that additional D2D control information does not arrive during the valid period, and neglect D2D control information that arrives between a D2D control information subframe and a D2D data subframe—that is, the blind decoding skip rule may apply.

Furthermore, assuming that D2D control information subframes are used by a plurality of UEs, each UE may calculate a subframe that the UE has to monitor, among the D2D control information subframes, by using its own ID or another parameter, such as a D2D subframe index.

In this case, a method for each UE to calculate its own D2D control information subframe may be performed in a similar way to a method for calculating a paging subframe that the UE has to calculate using a UE ID and another parameter—that is, a method for calculating the index of a subframe that the UE has to receive after waking up from sleep mode.

FIG. 19 is a diagram showing an example of a method for configuring D2D control information depending on D2D transmission mode, which is proposed according to the present disclosure.

FIG. 19 shows that some of resources allocated using each of two D2D resource allocation methods, that is, two types of transmission mode (transmission mode 1 and transmission mode 2), are configured as common resources if the two D2D resource allocation methods are used.

FIG. 19a shows the resource allocation of D2D control information in an in-coverage scenario, that is, transmission mode 1, and FIG. 19b shows the resource allocation of D2D control information in a partial or out-coverage scenario, that is, transmission mode 2.

The resource of control information in transmission mode 1 is indicated by C1 or C2, and the resource of control information in transmission mode 2 is indicated by P or S.

From FIG. 19, it may be seen that the resources C1 and P have been configured to be aligned in the same time resource and/or the same frequency resource.

That is, FIG. 19 shows that the resources C1 and P have been configured as common resources (e.g., cell-specific or UE group-specific).

In the resource configurations of FIG. 19, if UE changes a resource allocation method, it may use the common resource subframe as a fallback subframe in which a D2D control channel may be monitored.

That is, common resources configured using different resource allocation methods may mean candidate subframes in which UE is obliged to monitor D2D control information when mode of a resource allocation method switches.

Accordingly, UEs to which resources have been allocated according to transmission mode 1 or UEs to which resources have been allocated according to transmission mode 2 may need to perform blind decoding on the resource P or C1 corresponding to common resources.

In this case, UEs within a cell may have different resource allocation methods, that is, different types of transmission mode. Resources may be configured in such a way that a single UE has the two types of transmission mode.

Transmission mode 1 and transmission mode 2 do not only mean a resource allocation method for D2D communication, but also mean concepts indicative of a resource allocation method for D2D discovery.

That is, from the standpoint of a single UE, a D2D discovery resource may be set as transmission mode 1 and a D2D communication resource may be set as transmission mode 2, or vice versa.

From the standpoint of a plurality of UEs, transmission mode 1, transmission mode 2, D2D discovery, and D2D communication combinations may be configured in various ways.

In this case, pre-designated UE (e.g., a UE group, all UEs within a cell, or all D2D-enabled UEs) may be defined to monitor a common resource set by defining the concept of a default resource set or common resource set in transmission mode 1 or transmission mode 2.

Timing relations between a Scheduling Grant (SG) (or DCI), Scheduling Assignment (SA), and D2D data transmission in D2D communication, which is proposed according to the present disclosure, are described in detail below.

A Scheduling Grant (SG) used hereinafter is indicative of Downlink Control Information (DCI) transmitted from an eNB to D2D UE, and may mean a parameter related to D2D communication.

The scheduling grant may be transmitted in a PDCCH/EPDCCH and may be represented as a DCI format 5.

Furthermore, the Scheduling Assignment (SA) may be indicative of D2D control information, and may mean control information transmitted and received between D2D UEs, including resource allocation information for the transmission and reception of D2D data.

The Scheduling Assignment (SA) may be transmitted through a PSCCH and may be represented as an SCI format 0.

First, details relating to a method for notifying UE of a resource used for D2D data transmission and a resource used for Scheduling Assignment (SA) transmission for transmitting D2D data transmission-related scheduling information are described with reference to Table 3 below.

Furthermore, a method described with reference to Table 8 is only an example, and D2D data transmission and SA transmission may be performed using other methods than the method of Table 8.

TABLE 8

| Signaling methods | Being transmitted Scenarios | Resource (or Resource Pool) indication methods (to be used for the following transmission) | |
|---|---|---|---|
| | | For Scheduling Assignment | For Data communication |
| Mode 1 (eNB schedules) | In-coverage | SIB (or (E)PDCCH) (This can be triggered by D2D scheduling request (D-SR)) | SIB (or (E)PDCCH) (This can be triggered by D2D scheduling request (D-SR)) |
| | Edge-of-coverage | Via other forwarding UE(s) SIB or other sig. forwarding | Via other forwarding UE(s) SIB or other sig. forwarding |

TABLE 8-continued

| Signaling methods | Being transmitted Scenarios | Resource (or Resource Pool) indication methods (to be used for the following transmission) | |
|---|---|---|---|
| | | For Scheduling Assignment | For Data communication |
| Resource Allocation | Out-coverage | Pre-configured or other | Pre-configured or other |
| | | Semi-static resource pool restricting the available resources for data and/or control may be needed D2D communication capable UE shall support at least Mode 1 for in-coverage | |
| Mode 2 (UE selects) | In-coverage Edge-of-coverage | SIB (or (E)PDCCH) Via other forwarding UE(s) SIB or other sig. forwarding | SIB (or (E)PDCCH) Via other forwarding UE(s) SIB or other sig. forwarding |
| | Out-coverage | Pre-configured or other | Pre-configured or other |
| | | The resource pools for data and control may be the same Semi-static and/or pre-configured resource pool restricting the available resources for data and/or control may be needed D2D communication capable UE shall support Mode 2 for at least edge-of-coverage and/or out-of-coverage | |

In Table 8, Mode 1 and Mode 2 in a D2D resource allocation method may be divided as follows.

From a transmission UE perspective, UE may operate in the two types of mode for resource allocation:

Mode 1: eNodeB or rel-10 relay node schedules the exact resources used by UE to transmit direct data and direct control information Mode 2: a UE on its own selects resources from resource pools to transmit direct data and direct control information Referring to Table 8, resource allocation used for SA transmission and D2D data transmission in Mode 1 and Mode 2 may be implemented through an SIB in the case of the in-coverage scenario. That is, an eNB may notify UE of resource allocation for SA transmission and D2D data transmission through an SIB.

In some embodiments, scheduling assignment may be performed and data resources may be allocated using the dynamic control signal (e.g., a PDCCH, an EPDCCH, or a MAC CE) of an eNB.

In some embodiments, resource pools may be allocated in advance through an SIB, and UE may be notified of (time-frequency resources) detailed resource allocation information (SA resources and D2D data resources) through a dynamic control signal within the allocated resource range.

In this case, the SA for direct communication may deliver the detailed resource allocation information (e.g., using relative location information or offset information) used in direct data communication.

That is, UE may receive SA and data resource pools through an SIB and may receive detailed SA and data transmission resources through the SA.

If a plurality of resource pools has been allocated to UE in advance, SA may be used to indicate one or some of the allocated resource pools.

In Table 8, in the case of the out-coverage scenario, UE may be aware of SA resource pools and data resource pools based on resource configuration information that has been pre-configured or received from coverage UE.

In this case, if the UE has to determine detailed resources for SA transmission and D2D data transmission, it may autonomously select SA resources.

Thereafter, the UE may include resources allocated in relation to D2D data transmission in SA contents and transmit the SA contents to D2D reception UE so that the D2D reception UE is aware of a resource region in which D2D data is received.

In this case, in order to reduce information included in the SA contents, resource region information (e.g., time and frequency indices) in which SA has been detected may be used as part of D2D data resource allocation information.

That is, the final resource region is calculated using both the SA resource-related information and the SA contents information.

For example, an SA (transmission) resource-related parameter may be used to obtain only time domain information (e.g., a time domain parameter and a subframe index) of a D2D data resource region, and information delivered in SA may be used to provide notification of frequency domain information (e.g., a frequency domain parameter and an RB index).

In some embodiments, the SA resource-related parameter may be used to designate the absolute locations (e.g., time and frequency indices) of D2D data resources, and resource allocation information included in SA contents may be used to provide notification of the relative locations of D2D data resources.

In some embodiments, the SA (transmission) resource-related parameter may be used to provide notification of a random back-off or transmission probability value.

Furthermore, signaling contents transmitted from an eNB to D2D transmission UE may include a resource configuration, an MCS, etc. for direct scheduling assignment.

The signaling contents may be represented as Downlink Control Information (DCI) or a Scheduling Grant (SG).

The timing relation between an eNB-dynamic control signal and an SA transmission time is described in detail below.

If a D2D resource pool is allocated through a System Information Block (SIB) and UE autonomously determines SA resources and resources for D2D data transmission based on the allocated D2D resource pool, an eNB-dynamic control signal, such as a PDCCH/EPDCCH, may not be required.

In a situation in which all resources are managed by an eNB as in the in-coverage scenario, however, if an eNB controls D2D SA and resource allocation for direct data in real time, the utilization of the resources may become further efficient. In this case, an eNB-dynamic control signal is necessary.

Accordingly, a method using an eNB-dynamic control signal (e.g., a scheduling grant or an MAC CE using DCI) and when D2D transmission UE that has received an eNB-dynamic control signal (i.e., an eNB scheduling grant for SA and/or data for D2D) will transmit SA to D2D reception UE need to be clearly defined.

As described above, an eNB may transmit an SG to D2D UE for (1) scheduling regarding SA transmission and (2) scheduling regarding data transmission.

In this case, the scheduling may mean scheduling related to D2D transmission, and scheduling information may include resource allocation information, an MCS, an RV, and an NDI.

In some embodiments, an eNB may transmit a single SG to D2D UE in order to indicate whether it is scheduling regarding SA transmission or scheduling regarding D2D data transmission.

In this case, an implicit association may be formed between SA and data so that D2D UE is capable of estimating scheduled information for SA and data each.

For example, D2D UE may receive an SG related to SA transmission from an eNB and check the location or approximate location of D2D data transmission resources having linkage to the SA (or the same is true of scheduling information).

In some embodiments, D2D UE may receive an SG related to data transmission from an eNB and check a resource location and relation information related to SA transmission having linkage to data.

Methods 1 through 4 below show timing relations between a dynamic control signal transmitted from an eNB to D2D transmission UE and SA transmitted from D2D transmission UE to D2D reception UE.

That is, the timing relation between the reception of a Scheduling Grant (DCI) from an eNB and the transmission of Scheduling Assignment (SA) and/or data from D2D transmission UE to D2D reception UE is described in detail below in connection with the methods 1 through 4.

Method 1

FIG. 20 is a diagram showing an example of the timing relation between SG reception and SA transmission in D2D UE, which is proposed according the present disclosure.

FIG. 20 shows an example in which, if a D2D Scheduling Assignment (SA) subframe (SF) has been periodically configured, when D2D transmission UE receives a Scheduling Grant (SG) from an eNB in a D2D SA SF period (or a PSCCH period) 2001 at step S2010, the D2D transmission UE transmits a scheduling assignment in a D2D SA SF 2002 that first arrives after the received SG SF at step S2020.

Method 2

FIG. 21 and FIG. 22 are a flowchart illustrating an example of the timing relation between SG reception and SA transmission in D2D UE, which is proposed according to the present disclosure.

FIG. 21 shows a method for transmitting SA from D2D transmission UE to D2D reception UE in consideration of the processing time of UE (or a system) after receiving an SG from an eNB.

That is, the D2D transmission UE receives SG from the eNB, configures an SA based on the received SG, and transmits the SA to the D2D reception UE in consideration of the time taken to transmit the SA, that is, processing delay.

In this case, if the processing delay is taken into consideration, the SA transmission of the D2D transmission UE may be performed in a fourth subframe #n+4 after an SG subframe (subframe #n) received from the eNB.

That is, when D2D transmission UE receives an SG in a subframe #n at step S2101, it may transmit SA to D2D reception UE in a fourth subframe #n+4 2101 at step S2102.

In this case, if the fourth subframe #n+4 2201 is not a D2D SA subframe, the D2D transmission UE may transmit the SG in a D2D SA subframe 2202 that first arrives after the fourth subframe #n+4.

In contrast, if the D2D transmission UE receives the SG from the eNB in the subframe #n and a D2D SA SF that first arrives subsequently is present in the fourth subframe #n+4, the D2D transmission UE determines that the D2D SA SF is not valid or available.

Accordingly, the D2D transmission UE transmits the D2D SA in a subsequent (or next period) available D2D SA SF.

The n+4 is an example, and may be generalized as "n+k"—that is, D2D SA is transmitted in a k-th SA SF after the SG is received.

The value k may be configured by taking into consideration the development of the future technology, performance of UE, and so on.

Furthermore, the value k may be differently configured for each UE depending on the capability of the UE.

FIG. 21 shows an example of a method for transmitting SA in a subframe #n+k, and FIG. 22 shows an example of a method for transmitting SA in an SA SF that is first reaches after a subframe #n+k.

Regarding the configuration of the value k, the difference with an LTE (-A) system is that resources are not explicitly allocated, but a D2D resource pool is determined. In this case, resources are selected and transmitted, and different values are configured for each UE if a collision between resources is permitted.

The method of FIG. 21 and FIG. 22 may apply equally to D2D data transmission.

That is, when D2D UE receives control information (or scheduling information) related to D2D data transmission from an eNB in a subframe n, the D2D UE may transmit D2D data in a subframe n+k' by taking into consideration the processing time of the D2D UE.

The control information related to the D2D data transmission may be an SG or SA related to the resource allocation of the D2D data transmission.

The value k' may be configured differently from the value k at an SA transmission timing.

In general, the k'> (or =) k relation may be established by taking into consideration a probability that D2D data transmission may occur a bit later.

Method 3

Next, an operation in which SA SFs are configured as a group, that is, a plurality of SFs are allocated for SA and operated, is described below.

FIG. 23 is a diagram showing another example of the timing relation between SG reception and SA transmission in D2D UE, which is proposed according to the present disclosure.

FIG. 23 shows a method for transmitting SA from D2D transmission UE to D2D reception UE in the first SA SF after a subframe n+4 when the D2D transmission UE receives an SG (or resource allocation DCI) from an eNB in a subframe SF #n.

In this case, if the first SA SF after the subframe n+4 is a group of M consecutive SA SFs, when the D2D transmission UE receives the SG in the subframe SF #n at step S2310, it transmits the SA in the SA SF group that is first met after the subframe n+4 at step S2330.

In which of M SFs in the SA SF group the SA will be transmitted may be finally indicated through the SG at step S2320.

Furthermore, if an SA or data transmission subframe (SF) includes a plurality of subframes, a specific bit (or specific field) of a DCI format may be used to determine the location of the SA or data transmission subframe.

For example, a bit for differentiating between the DCI formats 0 and 1, a hopping bit, or some or all of RA bits may be used to determine the location of the SA or data transmission subframe.

Furthermore, the SG may be divided into one for SA and one for data, and may be further divided for special purposes if necessary.

Accordingly, a bit for differentiating between the DCI formats 0 and 1, a hopping bit, or some or all of RA bits may be used to distinguish the purpose of the SG.

Method 4

A method for providing notification of the location of an SA SF through Radio Resource Control (RRC) is described below.

FIG. 24 is a diagram showing yet another example of the timing relation between SG reception and SA transmission in D2D UE, which is proposed according to the present disclosure.

FIG. 24 shows a method in which the location of an SA SF is notified through RRC in advance at step S2410 and an SG (e.g., PDCCH DCI) is used merely for an activation purpose to enable the use of the SA SF at step S2520.

In this case, a special index may be defined to find out an association between RRC signaling and activation DCI.

That is, a DCI indicative of the activation of an SA SF may be defined to indicate the RRC of a certain index.

A DCI, that is, an SG, accurately indicates the activation of an SA SF or SF set transmitted through RRC. In this case, an RRC set including a series of indices mapped to the DCI may be designated in advance.

Furthermore, D2D transmission UE transmits SA to D2D reception UE through the SA SF whose activation has been indicated by the SG at step S2530.

A method for providing notification of the time location of SA resources and/or D2D data resources through the RRC signaling of FIG. 24 is described in detail later.

The timing relation between SA transmission and D2D data transmission in D2D UE, which is proposed according to the present disclosure, is described in detail below.

FIG. 25 is a diagram showing an example of the timing relation between D2D SA transmission and D2D data transmission, which is proposed according to the present disclosure.

Regarding the timing between a D2D SA SF and a D2D data SF, D2D data may be implicitly transmitted and received according to a predetermined rule.

FIG. 25 shows a method for transmitting SA from D2D transmission UE to D2D reception UE in a subframe #n at step S2510 and transmitting D2D data to the D2D reception UE in an available D2D data SF 2501 that first arrives after a subframe n+k at step S2520, as in the timing relation between SG transmission and SA transmission.

Likewise, the value k is configurable, and may be configured to vary for each UE.

Furthermore, as in the timing relation between SG transmission and SA transmission, UE may be notified of an available D2D data SF group, and a specific SF (e.g., a subframe #m) within the D2D data SF group may be separately indicated.

In this case, a parameter (k) indicative of the specific SF may be included in SA contents.

The value of the indication parameter k may be differently interpreted depending on the following conditions.

That is, the value of the indication parameter k may be differently interpreted depending on each UE, the location of a resource pool, the UE group, or the scenario (i.e., in-coverage, out-coverage, and edge-of-coverage).

FIG. 26 is a diagram showing another example of the timing relation between D2D SA transmission and D2D data transmission, which is proposed according to the present disclosure.

Unlike the method of FIG. 25, FIG. 26 shows a method for transmitting a D2D data SF within "n+k" (2601) at step S2620 when a D2D SA SF is determined (a subframe #n) at step S2610.

In this case, although D2D data is transmitted in a subframe right after the D2D SA SF, there is no problem if UE is notified of this in advance.

In this case, D2D reception UE may decode the D2D data by preparing to buffer both the SA SF and the data SF, which is received subsequent to the SA SF, by taking into consideration the processing time (or processing delay).

In this case, the value k is configurable, and may be configured to vary for each UE.

FIG. 27 is a diagram showing yet another example of the timing relation between D2D SA transmission and D2D data transmission, which is proposed according to the present disclosure.

That is, FIG. 27 shows a method for directly indicating a D2D data SF explicitly through SA.

Assuming that D2D reception UE receives SA in a subframe #n at step S2710, D2D transmission UE may calculate a value k based on some of SA contents or an SA transmission resource parameter and explicitly notify the D2D reception UE of the calculated value k in a subframe #n+k in which D2D data is received at step S2720.

A method for transmitting D2D data related to the valid period of SA contents is described below.

SA contents may indicate SA information for which an MCS value, whether frequency hopping is used or not, and frequency hopping-related resource allocation are applied or configured in a resource region for SA transmission.

FIG. 28 is a flowchart illustrating an example of a method for transmitting and receiving D2D data, which is proposed according to the present disclosure.

In the method of FIG. 28, if a D2D SA SF is periodically configured, it is assumed that D2D data between SA SF transmission periods is transmitted using the same SA value.

In this case, D2D reception UE that receives D2D data may receive multiple pieces of D2D data through the SA value that has been received once from D2D transmission UE.

That is, the D2D reception UE may determine that the same one SA value is applied to multiple data subframes.

Referring to FIG. 28, the D2D reception UE receives SA from the D2D transmission UE through a periodically configured SA subframe at step S2810.

Afterwards, the D2D reception UE receives at least one D2D data from the D2D transmission UE using the received SA for a specific interval of time at step S2820.

The specific interval of time may be an SA period or SA contents valid time interval in which the SA has been received.

The SA contents valid time interval may be determined in advance, may be simply defined as an SF index, or may be defined as a multiple of an SA SF period.

Furthermore, the SA contents valid time interval may be defined as a combination of an SA SF and a normal SF, or may be defined as a D2D data SF period or a multiple of the D2D data SF period.

In this case, the SF may mean a normal SF index or a D2D SF index.

In this case, if there are multiple pieces of D2D data for the specific interval of time, the SA includes resource allocation information related to the multiple pieces of D2D data.

That is, the D2D reception UE may receive multiple pieces of D2D data based on the SA received at step S2810, without receiving an additional SA for the specific interval of time.

In another embodiment, D2D control information may be transmitted as control information transmitted through SA and control information embedded (or included) in D2D data, separately.

That is, (1) control information, such as RA or an MCS, and (2) control information, such as an NDI, may be transmitted separately through direct SA and direct data, respectively, based on the attributes of the control information.

FIGS. 29 to 32 are diagrams showing examples of methods for providing notification of the locations of SA resources and/or D2D data resources, which is proposed according to the present disclosure.

FIGS. 29 and 30 show methods for transmitting and receiving SA and/or D2D data using a subframe pattern in which SA resources and/or D2D data resources may be transmitted and received.

A subframe pattern in which the SA resources and/or the D2D data resources may be transmitted and received may be represented as a Resource Pattern for Transmission (RPT).

The RPT means time resources and/or frequency resources for guaranteeing a plurality of transmission opportunities for D2D data Transport Blocks (TBs).

Accordingly, the RPT may be divided into a Time-RPT (T-RPT) and a Frequency RPT (F-RPT).

Specifically, FIG. 29 shows a method for explicitly notifying D2D UE of a subframe pattern related to SA resources and/or D2D data resources. FIG. 30 shows a method for implicitly transmitting a subframe pattern related to SA resources and/or D2D data resources to D2D UE.

UE uses some of all UL subframes as D2D subframes.

That is, the UE performs communication with an eNB in the remaining UL subframes, other than the D2D subframes, among all the UL subframes.

Accordingly, eNB-to-UE transmission and D2D Tx UE-D2D Rx UE transmission do not occur at the same time.

If UE transmits a D2D signal to another UE in a D2D subframe, it may not receive a D2D signal from the another UE in the same band of the D2D subframe. The reason for this is that the D2D signal transmitted by the UE interferes strongly with the reception of a D2D signal from the another UE.

In order to solve such a problem, a subframe pattern (or configuration) between a D2D transmission subframe in which a D2D signal is transmitted and a D2D reception subframe in which a D2D signal is received may be differently configured.

Furthermore, in order to solve the problem of interference caused by the transmission and reception of D2D signals by a single UE and to reduce interference between two adjacent UEs by decreasing the probability of use of redundant time resources by the two UEs, the patterns of subframes in which the two UEs transmit D2D signals may be differently configured.

Specifically, an eNB can solve the interference problem which may occur between UEs by configuring a subframe pattern used for D2D transmission by each UE by taking into consideration the distance between the UEs (by checking the degree of mutual interference).

In this case, the eNB explicitly notifies D2D UE of D2D transmission subframe patterns 3010 through high layer signaling, such as RRC signaling.

In this case, the eNB may dynamically configure the D2D transmission subframe pattern in the D2D UE through an EPDCCH or a PDCCH. That is, if a D2D transmission subframe pattern is transmitted to D2D UE through an EPDCCH or PDCCH, there is an advantage in that the D2D transmission subframe pattern can be configured by rapidly handling a change of the location of UE.

According to another method, in order to reduce a signaling burden of an eNB, the eNB may not determine a D2D (transmission) subframe pattern and notify UE of the D2D (transmission) subframe, but instead the UE may autonomously select a required D2D (transmission) subframe pattern.

That is, such a method is a method for D2D UE to implicitly obtain a D2D subframe pattern.

In this case, the D2D UE may select the D2D subframe pattern using a similar random method based on its own UE ID (or a UE-specific parameter having a similar characteristic).

In some embodiments, D2D UE may receive minimum signaling information from an eNB and select a subframe pattern using a similar random method using the minimum signaling information as a factor for determining a similar random value.

If such an implicit subframe pattern selection method is used, the aforementioned interference between UEs can be reduced because proper subframe patterns (or subframe sets) are given and a subframe pattern is randomly selected from the proper subframe patterns (or subframe sets).

As shown in FIG. 29, an eNB may deliver the candidate group 2910 of subframe patterns related to D2D transmission, which may be potentially used by specific UE, through high layer signaling, such as RRC signaling, and transmit (or designate) one or more subframe patterns 2920 to be actually used for D2D transmission at a specific point of time through an EPDCCH or a PDCCH.

Specifically, the eNB transmits predefined N subframe patterns, that is, a candidate group of N subframe patterns (e.g., a subframe pattern #0, a subframe pattern #1, a subframe pattern #2, . . . ,), to D2D UE through high layer signaling, such as RRC signaling.

Thereafter, the eNB specifies one or more of the N subframe patterns 2910 as a D2D transmission subframe pattern 3020 and transmits the D2D transmission subframe pattern 2920 to the D2D UE through a PDCCH or an EPDCCH.

In this case, in the process for transmitting the predefined N subframe patterns to the D2D UE, the eNB may render the actual subframe pattern #k (k=0, 1, 2, . . . ,) in a bitmap of subframes (SF pattern #0 (10001010), SF pattern #1 (00111001), . . . ) repeating with a given periodicity.

Furthermore, as shown in FIG. 30, the eNB may transmit the candidate group 3010 of subframe patterns related to D2D transmission, which may be potentially used, to specific UE through high layer signaling, such as RRC signaling. D2D UE that has received the candidate group 3010 may select the subframe pattern 3020 used for actual transmission at a specific point of time using a UE identification parameter (e.g., a UE ID 3030).

In this case, the UE identification parameter (or seed) 3010 may be allocated in advance by the eNB.

Thereafter, the D2D UE may perform D2D transmission and reception through the selected subframe pattern.

FIGS. 31 and 32 are diagrams showing examples of methods for changing a subframe pattern related to SA resources and/or D2D data resources, which is proposed according to the present disclosure.

FIG. 31 shows a method for explicitly providing notification of a changed subframe pattern, and FIG. 33 shows a method for implicitly providing notification of a changed subframe pattern.

FIGS. 31 and 32 show operations for D2D UE to change a subframe pattern allocated thereto using the methods of FIGS. 29 and 30.

FIGS. 31 and 32 show a subframe pattern repeating with a periodicity of 8 ms (i.e., 8 subframes). An eNB may transmit a subframe pattern #0{10001010} 3110 and a subframe pattern #1{00111001} 3110 in advance to D2D UE through high layer signaling.

In this case, the value "1" is a subframe related to D2D transmission, and it means that a signal related to D2D transmission may be transmitted and received in a corresponding subframe.

Furthermore, the value "0" is a subframe not related to D2D transmission, and this means that a signal related to D2D transmission may not be transmitted and received in a corresponding subframe.

The meanings of the value "0" and the value "1" may be reversed.

Thereafter, the eNB designates a D2D subframe pattern (e.g., an SF pattern #0 3120) that will be actually used by D2D UE through a PDCCH. The D2D UE operates based on the designated D2D subframe pattern.

Thereafter, the eNB transmits D2D subframe pattern change information 3130, providing notification of a changed D2D subframe pattern, to the D2D UE through a PDCCH (or through different control information or different message or through RRC signaling) if the D2D subframe pattern has been changed.

The D2D subframe pattern change information may designate a changed subframe pattern using some fields within a PDCCH or EPDCCH.

If existing DCI for an UL grant is reused for DCI for D2D, it may be used as subframe pattern change information to designate a changed subframe pattern using one of the DCI fields that is not used.

Some DCI fields that are not used may include an indicator to determine the DCI formats 0/1A, a CQI request field, and an NDI field.

Part of a DM RS cyclic shift field or MCS/RV field using a plurality of bits may be used.

If resources for scheduling assignment transmission and resources for D2D data transmission are designated to UE through a single PDCCH or EPDCCH at the same time, a subframe pattern for scheduling assignment and a subframe pattern for D2D data may be allocated to respective states designated by the fields within the DCI.

In the method of FIG. 32, UE may randomly select a D2D subframe pattern (e.g., an SF pattern #0 3220) that belongs to the candidate group of D2D subframe patterns and that will be actually used by using a UE ID, and the UE operate based on the selected D2D subframe pattern.

In this case, an eNB may transmit a D2D subframe pattern (change) indicator, indicating that a D2D subframe pattern has been changed, to the D2D UE through a PDCCH (or different control information or different message or through RRC signaling).

In this case, the D2D UE may randomly reselect a D2D subframe pattern (e.g., an SF pattern #1 3230) using a pseudo-random selection parameter (seed, a D2D UE identification parameter) using a UE ID.

In this case, the eNB may notify the D2D UE of the UE ID in advance through RRC signaling.

That is, if the D2D UE selects or reselects a subframe pattern using a similar random method, the eNB may previously deliver a parameter or seed value for determining a similar random value to the D2D UE.

Furthermore, the D2D UE may determine the index of a D2D transmission subframe using a similar random value without a pattern.

In this case, the eNB may deliver a parameter or seed value to determine the similar random value to the D2D UE.

Furthermore, the D2D UE may determine a subframe pattern or the index of a subframe based only on signaling information for determining such a similar random value. A unique value of the D2D UE may be included in the signaling information, based on which the subframe pattern or the index of the subframe may be determined.

In another example, a method for D2D reception UE to obtain the transmission bandwidth of SA in order to detect the SA transmitted by D2D transmission UE is described below.

In this case, the transmission bandwidth of the SA may be pre-fixed so that the D2D reception UE is aware of the transmission bandwidth of the SA.

In this case, a portion that belongs to a resource allocation field included in an SG and that corresponds to the number of allocated RBs may be fixed as a predetermined value, such as "0", or may be defined as the pre-fixed transmission bandwidth of SA.

A field (or bits) included in the SG related to the transmission bandwidth of the SA may be used for other purposes (e.g., for the purpose of designating the actual location of an SA SF within an SA SF group) in addition to the transmission bandwidth of the SA.

The UE scheduling of eNB-to-D2D transmission (Tx) (and/or D2D reception (Rx)) for D2D transmission is described below.

FIG. 33 is a flowchart illustrating an example of a UE scheduling method for D2D transmission to which a method proposed in the present disclosure may be applied.

First, the eNB performs a Scheduling Grant (SG) procedure along with D2D transmission (Tx) UE or D2D reception (Rx) UE (Step#1, S3310).

That is, the eNB transmits an SG related to D2D transmission to the D2D Tx UE or the D2D Rx UE.

The SG procedure (Step#1) may be divided into the following two methods.

(1) The first method Method#1 is a method for allocating D2D transmission-related resources through RRC signaling and then dynamically controlling detailed operations, such as the activation/release of the allocated resource, through a physical/MAC control channel (e.g., a PDCCH).

(2) The second method Method#2 is a method for controlling a D2D operation by transmitting resource allocation and/or scheduling information related to D2D transmission through a physical/MAC control channel.

In the methods (1) and (2), the D2D UE may receive scheduling information (e.g., an MCS, an RV, or a DM RS parameter) related to D2D communication from the eNB and determine D2D transmission-related resources based on the scheduling information, or the D2D UE may autonomously determine D2D transmission-related resources.

Resource allocation information may be included in the scheduling information, and the scheduling information and the resource allocation information may be separately interpreted.

If the D2D UE receives scheduling information related to D2D transmission from the eNB according to the method (1), it may receive the scheduling information through an RRC signal and/or a control channel, such as a PDCCH.

In this case, if the D2D UE receives the scheduling information from the eNB through RRC signaling, the DCI format of the PDCCH may not include fields, such as an MCS, RV, and DM RS parameter related to D2D transmission.

Accordingly, if fields related to D2D transmission are defined to be included in the DCI format of a PDCCH, the total length of the DCI format may be reduced by eliminating the unnecessary fields, or the DCI format may be made to be the same length and transmitted by zero padding or the like.

Likewise, if the D2D UE itself determines scheduling information, such as an MCS or an RV, contents fields related to scheduling information, such as an MCS and an RV, are not required in a PDCCH transmitted in the method (1) or (2).

Accordingly, the unnecessary fields may be eliminated, or zero-padding may be applied.

The method (1) is described in more detail later with reference to FIG. 34, and the method (2) is described in more detail later with reference to FIG. 35.

Thereafter, the D2D transmission UE performs a scheduling procedure related to D2D data transmission for the transmission and reception of D2D data to and from the D2D reception UE (Step#2, S3320). That is, the D2D transmission UE performs an SA transmission procedure.

Step#2 may be used along with the methods used in Step#1.

In this case, information which may be included in SA may be as follows. In particular, information related to resources for D2D data reception may be included in the SA.

Scheduling information (including resource allocation information) related to SA transmission may be construed as being transmitted from the eNB to the D2D transmission UE (through an SG). The SA transmission may be construed as being transmitted from the D2D transmission UE to the D2D reception UE.

Information related to resources for data reception: information related to resources for D2D data reception
   RB assignment: RB assignment information
   Number and pattern of retransmissions: information about the number and pattern of retransmissions
   Frequency hopping pattern: information about a frequency hopping pattern
   SPS (incl. periodicity) of data: information about data periodicity
   Target ID: ID information of D2D reception UE
   MCS/RV of data
   Timing advance of data Next, a method for D2D transmission UE to receive an SG from an eNB and determine a point of time at which the D2D transmission (Tx) UE transmits SA to D2D reception (Rx) UE is described below.

The received SG may include scheduling information (including resource allocation information) related to the SA.

First, it is assumed that the eNB is aware of a D2D transmission subframe in which the D2D transmission UE may transmit the SA.

The eNB transmits the SG to the D2D transmission UE in an n−k1 (k1 is an integer) subframe of an SA transmission subframe(n), so the D2D transmission UE may transmit the SA to the D2D reception UE.

The value "k1" may be about 4 when the receive processing capability of UE is taken into consideration in an LTE (-A) system.

The value "k1" may be 2 or 3 according to the evolution of the technology.

The D2D transmission UE that has received the SG may also check the location of a D2D data transmission subframe through the received SG.

That is, the SG may be used for D2D data transmission timing (subframe) and frequency resource allocation, in relation to D2D data transmission, as well as for SA scheduling.

Next, a method for D2D transmission UE to receive an SG from an eNB and transmitting SA to D2D reception UE in a SA transmission-valid resource after a certain time is described below.

The received SG may include scheduling information related to SA transmission

The eNB transmits the SG to the D2D transmission UE based on a point of time at which D2D transmission resources were requested from the D2D transmission UE without checking an SA transmission valid subframe in detail.

That is, when the D2D transmission UE receives the SG from the eNB, it generates SA based on the received SG.

Thereafter, the D2D transmission UE checks an SA-available subframe in which the generated SA may be transmitted and transmits the generated SA to the D2D reception UE in an available or valid D2D subframe (i.e., a valid subframe in terms of SA transmission).

In this case, the D2D transmission UE receives the SG from the eNB, but may not immediately transmit the SA to the D2D reception UE even though the next subframe is available.

The reason for this is that time corresponding to "n+k2" is required in order for the D2D transmission UE to receive the SG, perform reception processing, generate SA using the SG, that is, information related to the received SA, and prepare for D2D data transmission.

In this case, k2 has an integer value. The value "k2" may be 2 or 3 according to the evolution of the technology. That is, the value "k2" may have various values, such as 1, 2, 3, or 4 depending on the reception capability of the UE.

If k2=4, the D2D transmission UE receives an SG from the eNB and transmits SA to the D2D reception UE after 4 subframes.

If there is no available subframe for the SA transmission immediately after the 4 subframes, the D2D transmission UE transmits the SA to the D2D reception UE in the next subframe.

If the next available subframe is not present, the D2D transmission UE may transmit the SA to the D2D reception UE in the next subframe.

That is, it may be interpreted that the SA is transmitted in the earliest SA-available subframe after the subframe n+4.

In this case, all subframes not designated as D2D transmission may correspond to subframes in which SA transmission is impossible.

In some embodiments, subframes in which a synchronization signal is transmitted, such as subframes 0 and 5, may be excluded from the SA-available subframes.

In some embodiments, subframes in which a paging subframe is transmitted, such as subframes 0, 4, 5, and 9, may also be excluded from the SA-available subframes.

In this case, if a channel for delivering D2D-essential information is determined in a specific D2D subframe, the specific D2D subframe may be excluded from the SA-available subframe even if the specific D2D subframe (e.g., a WAN synchronization signal and a channel similar to a BCH) is designated as a D2D subframe.

In some embodiments, a dedicated subframe for SA transmission may be configured, and SA may be transmitted only in the SA-dedicated subframe.

That is, the D2D transmission UE receives the SG from the eNB (in a subframe n) and may transmit the SA to the D2D reception UE in an SA (transmission)—available subframe after the subframe n+k3.

In this case, the D2D UE which has received the SG may also check the location of a data transmission subframe. That is, the SG may also be used for data transmission timing and frequency resource allocation, in relation to data transmission, as well as for SA scheduling.

Thereafter, the D2D transmission UE transmits D2D data to the D2D reception UE based on the SA (Step#3, S3330).

In this case, the D2D transmission UE may transmit required control information along with the D2D data.

The control information may be transmitted in a piggyback fashion along with the D2D data.

Next, the validity of SG is described below.

If D2D UE receives an SG1 from an eNB and then receives an SG2 from the eNB, the D2D UE may determine that the received SG1 is no longer valid.

A point of time at which the validity of SG is determined may apply after the n+k4 subframe after a subsequent transmitted SG, that is, a SG2, is received (in a subframe n).

In this case, the value "k4" is an integer, and the value "k4" may have a value of 2, 3, or 4 by taking into consideration the point of time at which the SG2 may be actually applied, Furthermore, the eNB may transmit the SG1 and the SG2 to the D2D UE at the same time.

In this case, the SG1 and the SG2 may be merged into a single DCI format and transmitted.

If separate channel coding is performed on each SG, the probability that the D2D UE may successfully receive each SG may be increased.

As described above, the D2D UE may provide feedback on the results of the reception of each SG to the eNB and use a PUCCH as a channel for providing feedback on the results of the reception of each SG.

Furthermore, the transmission power control for the D2D UE may be implemented through the SG.

In this case, the eNB may control the transmission power of the D2D UE by transmitting a TPC command to the D2D UE using a TPC field or the DCI formats 3/3A.

If the DCI formats 3/3A are used, the eNB may reserve and use a specific field of the corresponding format for D2D power control.

This field may be partitioned in advance to indicate whether it is for D2D power control or for LTE (-A) power control through RRC signaling.

Furthermore, a valid time when the SG is available may be determined.

That is, after a lapse of a specific time (or a specific number of subframes) or a specific number of D2D subframes since the D2D UE receives the SG from the eNB, the D2D UE may automatically discard the received SG.

In some embodiments, an SG timer may be newly defined so that the sG may be considered invalid when the SG timer is expired.

In some embodiments, the preceding SG may be defined as valid until the D2D UE receives the next SG.

In some embodiments, after receiving an SG, the D2D UE discards the received SG after a specific time or a specific number of subframes. If another SG has been previously received from the eNB, the D2D UE may discard the previously received SG without the lapse of the specific time.

FIG. 34 is a diagram showing an example of a UE scheduling method for D2D transmission using RRC signaling, to which a method proposed in the present disclosure may be applied.

That is, FIG. 34 shows a method by which the step S3410 of FIG. 34 is embodied.

The steps S3420 and S3430 of FIG. 34 are the same as the steps S3320 and S3330 of FIG. 33, and thus only differences between them are described below.

First, an eNB performs a Scheduling Grant (SG) procedure along with D2D Tx UE or D2D Rx UE (Step#1, S3410).

As described above with reference to FIG. 33, the step S3410 may be implemented through two methods.

(1) The first method Method#1 is a method for allocating D2D transmission-related resources through RRC signaling and additionally controlling detailed dynamic operations for the allocated resources, such as activation/release, through a physical/MAC control channel (e.g., a PDCCH).

(2) The second method Method#2 is a method for controlling a D2D operation by transmitting resource allocation and/or scheduling information related to D2D transmission through a physical/MAC control channel.

The method Method#1 of (1), that is, RRC signal and dynamic control signal (e.g. (E)PDCCH, PHICH) based scheduling (e.g. semi-static scheduling) for SA (and data, is described in more detail below.

The method (1) may be divided into 1) RRC signaling transmission for overall resource configuration/allocation for SA (and/or data) transmission S3411 and 2) a dynamic control information transmission (S3412) method for the activation/release of SA (and data) resources allocated through 1).

First, RRC signaling transmission is described.

RRC Signaling: Overall Resource Configuration/Allocation for SA (and Data)

As in an LTE Semi-Persistent Scheduling (SPS) scheduling method, an eNB allocates a specific resource pool (or a specific resource set/group) related to D2D transmission to D2D UE through RRC signaling.

Similarly, the eNB may allocate a monitoring resource for D2D reception to the D2D UE.

The specific resource region may be a subframe(s) or a set of resource blocks.

Accordingly, the D2D UE may perform blind demodulation (or blind decoding) on D2D data or SA by monitoring the specific resource region.

The monitoring resource may mean a resource that provides notification of monitoring so that the D2D UE performs blind decoding on SA and/or D2D data (Tx-to-Rx for D2D).

The phrase "A and/or B", as used herein, may be construed as having the same meaning as at least either A or B (A, B, and A&B).

The method (1) may be used to provide notification of a data resource region, that is, for D2D data scheduling, as well as for SA scheduling.

That is, the method (1) means an operation for allocating resources related to D2D transmission through RRC and dynamically activating or releasing the resources using a physical layer and an MAC layer control channel, similarly to Semi-Persistent Scheduling (SPS).

For more details of the operation, reference may be made to FIGS. 30 to 33.

Thereafter, the steps S3420 and S3430 are performed.

FIG. 35 is a diagram showing an example of a UE scheduling method for D2D transmission using a physical layer channel, to which a method proposed in the present disclosure may be applied.

That is, FIG. 35 shows a method by which the step S3310 of FIG. 33 is embodied.

The steps S3520 and S3530 of FIG. 35 are the same as steps S3320 and S3330 of FIG. 33, and thus only differences between them are described below.

First, an eNB performs a scheduling grant procedure along with D2D Tx UE or D2D Rx UE (Step#1, S3510).

As described above, Step#1 may be implemented through two methods.

(1) The first method Method#1 is a method for allocating D2D transmission-related resources through RRC signaling and additionally controlling a detailed dynamic operation for the allocated resources, such as activation/release, through a physical/MAC control channel (e.g., a PDCCH).

(2) The second method Method#2 is a method for controlling a D2D operation by transmitting resource allocation and/or scheduling information related to D2D transmission through a physical/MAC control channel.

The phrase "A and/or B", as used herein, may be construed as having the same meaning as at least either A or B.

The method (2), that is, an (Enhanced) PDCCH transmission method based on dynamic scheduling, is described below with reference to FIG. 35.

The method (2) refers to a method for notifying the D2D Tx UE (and/or the D2D Rx UE) of an MCS, an RV, an NDI, power control, a PMI, etc. for D2D data demodulation, in addition to resource allocation using a channel (e.g., an EPDCCH, PDCCH, PHICH, or new channel) for delivering control information in a physical layer (or including an MAC layer), instead of transmitting scheduling information (including resource allocation) related to D2D transmission through RRC (S3511).

The resource allocation, MCS, RV, NDI, power control, PMI, etc. may be called scheduling information related to D2D transmission.

The purpose of use of SG may be variously defined, apart from the aforementioned purposes of use.

For example, the SG may be used to notify of the fact that the contents of scheduling information related to D2D transmission have been changed.

The meaning of the change includes a modification, deletion, and addition.

In this case, the same signaling format as the SG may be used, or a different signaling format from that of the SG may be used.

The scheduling information included in the SG may mean a change of D2D transmission-related resource regions in which RC signaling has been designated, a change of resources that need to be used by the D2D Tx UE (and/or the D2D Rx UE) in a corresponding resource region, a change of resource regions substantially allocated by the SG, a change of resource region groups, or a change of some or all of SA contents.

The SA contents include a variety of types of scheduling information, in addition to RA. The D2D Tx UE (and/or the D2D Rx UE) is notified of a change of the contents of one or more of the variety of types of scheduling information, including the RA, through the SG.

The eNB may generate a new, compact SG by reducing the bit field of the SG and use the new SG.

Furthermore, when implementing SG/SA update, like resource re-allocation related to D2D transmission, a PHICH, as well as a PDCCH and an EPDCCH, may be used.

That is, the eNB may use PHICH resources to notify the D2D UE whether there is a change of SG/SA.

The D2D UE may monitor a PHICH including information indicative of a change of SG/SA and receive the changed SG/SA.

The D2D UE receives a modified SG/SA after a time previously designated by the eNB or in a previously designated interval of time through an SG/SA modification notification.

In this case, the modification notification may have two meanings.

The first meaning is that the D2D UE is notified that SA will be changed and the D2D UE needs to receive the changed SA through SG monitoring in order to be aware of the changed SA.

The second meaning is that the D2D UE is notified that SG has been changed or will be changed at a specified point of time and thus the D2D UE needs to receive the SG that has been changed or will be changed.

As described above, the SG may be used for data scheduling, as well as for SA scheduling.

Thereafter, the steps S3520 and S3530 are performed.

FIG. 36 is a flowchart illustrating an example of a method for performing an HARQ procedure for an SG, to which the present disclosure may be applied.

The steps S3610, S3630, and S3640 of FIG. 36 are the same as the steps S3310 to S3330 of FIG. 33, and thus only differences between them are described below.

After the step S3610, D2D UE and an eNB perform an SG Hybrid Automatic Retransmission reQuest (HARQ) procedure at the step S3620.

That is, the D2D UE may transmit a response to a received SG to the eNB between a point of time at which the D2D UE receives the SG from the eNB and a point of time at which the D2D UE transmits SA to another D2D UE. The response may be ACK or NACK.

As described above, the SG may be control information or resource allocation information related to the SA and/or the D2D data transmission, as in the activation/deactivation of allocated resources in SPS.

The control information or resource allocation information related to the SA and/or the D2D data transmission may be represented as scheduling information related to D2D transmission.

The SG HARQ procedure in the step S3620 can prevent performance deterioration or any situation in which communication is impossible, which may occur when the D2D UE does not receive the SG from the eNB and therefore continues to transmit the same SA since the D2D UE cannot transmit SA to another D2D UE or apply any change in the SA contents that have already been transmitted.

Accordingly, there is a need for confirmation regarding whether an SG has been received. In this case, an UL ACK/NACK mechanism may be used.

That is, the D2D UE may transmit a response (i.e., ACK or NACK) to the SG to the eNB using an existing PUCCH structure or in an existing embedded PUCCH to PUSCH form (i.e., in an UCI piggyback form).

In this case, if the SG complies with a mechanism, such as a PDCCH or EPDCCH format, a response to the SG may be easily used using a PUCCH resource connected to each DCI index of the PDCCH or EPDCCH.

In this case, if information included in the SG is separated into information for SA scheduling and information for D2D data scheduling and received by the D2D UE, the D2D UE may provide a feedback response about whether each SG has been received.

Furthermore, since there are up to four types of response to the SG, the size of the response may be represented as 1 bit to 2 bits.

In this case, the response to the SG may be fed back through a PUCCH.

Hereinafter, methods for sending and receiving SA and/or D2D data will be discussed in detail with reference to FIGS. 37 to 41.

FIG. 37 is a diagram showing an example of a D2D operation procedure and its associated signaling transmission and reception method, to which a method proposed in the present disclosure may be applied.

FIG. 37 shows a D2D operation procedure in D2D communication Mode 1 by control from an eNB and a method of performing D2D communication by sending and receiving information associated with this procedure.

As illustrated in FIG. 37, an SA (Scheduling Assignment) resource pool 3710 and/or data resource pool 3720 related to D2D communication may be pre-configured, and the pre-configured resource pool may be transmitted from an eNB to D2D UEs through high layer signaling.

The high layer signaling may be RRC signaling.

The phrase "A and/or B", as used herein, may be construed as having the same meaning as at least either A or B (A, B, and A&B).

The SA resource pool and/or data resource pool refers to resources reserved for a UE-to-UE (D2D) link or D2D communication.

The UE-to-UE link may be represented as a sidelink.

Specifically, the SA resource pool refers to a resource region for transmitting an SA, and the data resource pool refers to a resource region for transmitting D2D data.

The SA may be transmitted in an SA period 3730, and the D2D data may be transmitted in a data transmission period 3740.

The SA period and/or the data transmission period may be transmitted from an eNB to D2D UE through a D2D grant.

Alternatively, the SA period may be transmitted through a D2D grant, and the data transmission period may be transmitted through an SA.

The D2D grant represents control information for transmitting an SA (Scheduling Assignment) required for D2D communication from an eNB to D2D UE.

The D2D grant may be represented as a DCI format 5 and transmitted over a physical layer channel, such as PDCCH or EPDCCH, or a MAC layer channel.

The D2D grant may include information related to data transmission as well as information related to SA transmission.

In an example, the SA may include RA (Resource Allocation), MCS, NDI (New Data Indicator), Redundancy Version(RV), etc.

As discussed previously, an SA resource pool for the SA transmission may be transmitted through RRC signaling.

The SA may be transmitted over a PSCCH (Physical Sidelink Control Channel), and the D2D data may be transmitted over a PSSCH (Physical Sidelink Shared Channel).

D2D transmission UE may receive SA information, especially resource allocation (RA) information (hereinafter, "SA RA") for transmitting an SA, from an eNB through a D2D grant.

In this case, the D2D transmission UE may transmit the SA RA information received from the eNB directly to D2D reception UE, or may generate new SA RA information based on the received SA RA information and then transmit the newly generated SA RA information to the D2D reception UE.

Here, if the D2D transmission UE generates a new SA RA, the D2D transmission UE has to perform a SA resource allocation only within a resource region (resource pool) indicated by the D2D grant RA.

That is, this indicates that only some resource region SA RA among the resource regions D2D grant RAs permitted for use by the eNB may be selected for SA transmission.

On the contrary, the D2D transmission UE may use the D2D grant RA allocated by the eNB as it is.

In this case, however, the D2D transmission UE transmits dummy data even if there is no D2D data to transmit or only occupies a D2D SF subframe without D2D data transmission, which may lead to a waste of D2D SF.

The following relation may be established among resource pools related to D2D communication.

1. RRC configured D2D resource pool (A)
2. D2D grant RA indicating resource pool (B)
3. SA RA indicating resource pool (C)

If the resource pools satisfy the relation A>=B>=C, this prevents random occupation of D2D SF for D2D transmission and results in protecting resources for WAN data transmission.

FIG. 38 shows an example of a flowchart related to the method of FIG. 37.

First of all, an SA resource pool and/or D2D data resource pool related to D2D communication is configured by a high layer (S3810).

Afterwards, an eNB transmits the SA resource pool and/or D2D data resource pool to D2D UE through high layer signaling (S3820).

Afterwards, the eNB transmits SA-related control information and/or D2D data-related control information either individually or collectively to D2D transmission UE through a D2D grant (S3830).

The control information may include RA, MCS, NDI, RV, etc.

Afterwards, the D2D transmission UE transmits an SA and/or D2D data to D2D reception UE based on the information received in the step S3830 (S3840).

The SA transmission and the D2D transmission may performed simultaneously, or the D2D data transmission may be performed after the SA transmission.

Next, allocation of D2D-related resources by semi-persistent scheduling (SPS) will be discussed.

In this case, D2D UE may have D2D communication-related resources (SA resource pool and/or data resource pool) reserved and allocated in advance through RRC signaling, as shown in FIGS. 38 and 39.

Afterwards, the D2D UE may receive information on the availability of the reserved and allocated D2D communication-related resources from the eNB through a D2D grant.

That is, the eNB may instruct the D2D UE to activate the use of the reserve and allocated resources or to stop or release the use of the resources through an (E)PDCCH or the like.

Here, the eNB may indicate the release of use of D2D communication-related resources allocated to the D2D UE by setting all SA RAs to 0 and transmitting them to the D2D UE.

In another method, the eNB may set TPC and MCS fields to a specific value (e.g., "0") and, if a specific condition is met by a combination of various fields, may indicate the release of use of D2D communication-related resources.

In yet another method, MCS may be "1000 . . . 0000", with the MSB (Most Significant Bit) set to 1 and the remaining bits set to 0, so as to indicate the release of use of D2D communication-related resources.

Next, a method of activating/release the use of each resource when transmitting SA resource information and D2D data resource information separately will be discussed.

In an example, if an s resource-related portion and a data resource-related portion are separated within a specific field, the eNB may instruct the D2D UE to activate and release the use of each resource.

The specific field may be a TPC field, and the TPC filed may be described by way of example.

Moreover, the eNB may indicate the release of resource use at different locations by taking an SA transmission period and a data transmission period into consideration.

The above method may be implemented by transmitting different information (SA resource information and data resource information) to different TPCs, or by allocating different bit sequences to two TPCs, respectively.

Alternatively, the release of resource use may be indicated by notifying of from which numbered data resource will be released since the point of time of SA resource release.

Next, a method of updating an SA RA will be discussed.

In a case where D2D UE receives SA RA information from an eNB through a D2D grant, the actual point of time at which the D2D UE delivers an SA is consistent with an SA periodicty for SA transmission.

Here, the eNB transmits SA RA information to the D2D UE through a D2D grant at the point of time of SA transmission, so the update time of the SA RA information is consistent with an SA transmission period.

Specifically, a minimum period for the update of SA RA information may be the same as the SA period.

That is, if an SA is transmitted even when there is no update of SA RA information, the SA RA information update periodicity and the SA periodicity may be construed as the same.

On the contrary, the update of TPC information corresponding to transmission power control information may be designed differently from the SA RA information.

If the eNB transmits TPC information to the D2D transmission UE through a D2D grant with each SA periodicity, the TPC information may be updated with each SA periodicity.

However, if the D2D UE is considered capable of transmitting multiple SAs or data between SA periods, the TPC information update periodicity may be set shorter than the SA periodicity in order to perform the power control for the SA or data transmission more optimally or efficiently.

To this end, a DCI format for separately transmitting TPC information only may be newly defined, and the newly defined DCI format may be transmitted between SA periods.

The newly defined DCI format includes TPC information.

For example, for an SA (transmission) periodicity of 100 ms, the TPC information periodicity may be set to 10 ms so that the TPC information is updated in accordance with the channel status.

In this method, however, the efficient use of resources may not be possible if only TPC information is transmitted, so the eNB may also transmit control information (e.g., HARQ information) reflecting the channel status, such as TPC information, to the D2D UE.

That is, the TPC, HARQ, MCS, RV, and PMI, which reflect the channel status, may be set to a periodicity shorter than the SA periodicity and transmitted more often to properly reflect the channel status and update the corresponding information.

Here, the above-described methods may be interpreted differently.

For example, while the SA periodicity is 10 ms, the actual transmission (or update) periodicity of SA RA information may be 100 ms and control information (TPC, HARQ information, etc.) reflecting the channel status may be generated with a periodicity (unit) of 10 ms.

That is, when the SA periodicity is set, the SA RA update periodicity, the TPC update periodicity, and the HARQ update periodicity may be set to integral multiples of the SA periodicity, individually.

Here, the SA RA update periodicity occurs more often than the TPC and HARQ update periodicities.

Accordingly, the SA RA update periodicity, the TPC update periodicity, and the HARQ update periodicity may be predetermined, and transmitted to the D2D UE through RRC signaling.

Alternatively, information related to SA RA update periodicity, the TPC update periodicity, and the HARQ update periodicity may be transmitted explicitly or implicitly transmitted to the D2D UE.

Here, the SA periodicity may be configured by RRC signaling, and the TPC periodicity and/or HARQ periodicity may be configured by a D2D grant.

Alternatively, the SA periodicity, TPC periodicity, and HARQ periodicity may be set to default values. That is, all these periodicities may have the same default value.

As discussed above, TPC information refers to information for controlling the transmission power of D2D transmission UE.

Here, the D2D transmission UE may control the transmission power for SA and data based on one piece of TPC information.

Alternatively, the D2D transmission UE may control transmission power depending on the characteristics of each signal by taking the characteristics of SA and data into consideration.

In this case, the eNB may include TPC information for SA and TPC information for data separately in a D2D grant and transmit them, or may transmit D2D grants for the respective types of TPC to the D2D UE.

That is, the D2D grant may allocate the TPC information for SA and the TPC information for data to separate regions.

The TPC information for SA may be used to indicate the transmission power control for SA, and the TPC information for data may be used to indicate the transmission power control for data.

Here, each type of TPC information may indicate the absolute Tx power or the delta Tx power compared to the previous transmission power.

In another method, when two TPC fields (an SA TPC field and a data TPC field) are used to control SA transmission power and data transmission power separately, an offset value to the value of one TPC field may be used to indicate the value of the other TPC field.

For example, if the first TPC field indicates the (absolute) transmission power for SA and the second TPC field indicates the (absolute) transmission power for data, the value of the second TPC field is not transmitted separately, but may be obtained using an offset value to the absolute transmission power of the first TPC field.

That is, the first TPC field may represent the absolute value of transmission power for SA or data, and the second TPC field may be represented as an offset value to the value of the first TPC field.

That is, this method corresponds to a method of indicating a relative difference in power between SA and data.

In this method, it is highly likely that the transmission power for SA and data may change in almost the same direction. Thus, when the power is set using an offset, the transmission power for SA and data may be controlled by using a small number of bits.

In general, an SA power control parameter set and a data power control parameter set may be set independently.

That is, transmission power information of SA and D2D data is set with different parameters, and therefore may be transmitted with different power values.

In particular, since SA is more important information that D2D data, the SA transmission power may be set higher than the data transmission power or may use more resources.

Also, D2D data needs to be transmitted in consideration of HARQ operation as well as channel coding, so it may be desirable that D2D data is controlled at a different transmission power than SA.

However, even if the calculated SA and D2D data transmission power values (initial value, etc.) are different, one TPC value transmitted through a D2D grant may be used to control the transmission power for SA and data.

In this case, even if D2D UE receives the same TPC information from the eNB, the D2D UE may interpret it differently according to a set criterion so that the actual calculated transmission power is different for SA and data.

In this case, the criterion for the D2D UE to interpret the transmission power for SA and data with respect to one TPC may be set in advance.

For example, if the SA transmission power may be adjusted in a range from X_SA (dB) to Y_SA (dB) in a 2-bit TPC table, the D2D data transmission power may be interpreted as being adjusted in a range from X_data to Y_data.

While only the power transmit adjustment range indicated by a TPC bit field value has been described by way of example, the final transmission power for different power control parameters may be calculated by using different definitions, different initial values, and different default values.

Next, the configuration of D2D grant RA information and SA RA information may be described in more detail.

Here, the D2D grant RA may refer to information, especially resource allocation information, related to an SA to be used for D2D communication, and may be represented as an SG (Scheduling Grant) or a DCI format 5.

Also, the SA RA information may refer to resource allocation information related to actual SA transmission, and may be represented as a PSCCH.

Specifically, the configuration of SA RA information represents a method in which D2D transmission UE configures RA information transmitted through a D2D grant (related to D2D) and transmits an SA based on the D2D grant RA.

As described above, when it is assumed that there is an RRC configured resource pool, the eNB selects a restricted set from the original RRC configured resource pool and transmits an RA to the D2D UE through a D2D grant.

The D2D transmission UE may receive the selected D2D grant RA set from the eNB, transmit it to D2D reception UE as it is or re-select (or create) a resource of the selected D2D grant RA set, and transmit information about this resource to the D2D reception UE.

Hereinafter, a method in which D2D transmission UE selects a resource from an RA set received from an eNB through a D2D grant and transmits an SA to D2D reception UE through the selected resource will be described in detail with reference to FIG. 39.

FIG. 39 is a flowchart illustrating an example of an SA transmission method, to which a method proposed in the present disclosure may be applied.

That is, FIG. 39 illustrates a method in which D2D transmission UE transmits a D2D-related packet to D2D reception UE in a resource selected by itself and likewise receives a D2D-related packet from the D2D reception UE in the resource selected by itself.

First of all, D2D transmission UE receives reserved and allocated resources related to D2D communication from an eNB (S3910).

The reserved and allocated resources related to D2D communication may be an SA resource pool and/or data resource pool, and transmitted through RRC signaling.

Afterwards, the D2D transmission UE selects or determines a resource to use for actual transmission among the received, reserved and allocated resources related to D2D communication (S3920).

Since D2D UE usually transmits and receives a small amount of D2D packets, it uses less than the resources (or D2D grant RA) reserved and allocated to it and received from the eNB.

Thereafter, the D2D transmission UE transmits an SA and/or D2D data to the D2D reception UE through the determined resource (S3930).

As described above, the SA and the D2D may be transmitted simultaneously, or the D2D data may be transmitted after the SA transmission.

Here, the D2D UE may operate in Rx mode (listening to other signals) in the remaining resource blocks not used for D2D communication or enter into DTX (Discontinuous Transmission) state to perform energy saving or power saving operation.

Through this operation, the D2D transmission UE operating in half-duplex may expand the resource region for reception, thereby receiving resources from more D2D UEs.

Moreover, the D2D reception UE may receive resources by monitoring D2D-related resources (D2D SFs) only in a specific (or restricted) SF (subframe).

In addition, the D2D reception UE may likewise perform energy saving by performing DRX (Discontinuous Reception) without monitoring.

Similarly, the D2D reception UE may acquire more resources that can be transmitted to other D2D UEs, and this increases the opportunities for D2D transmission and enables transmission of more D2D-related packets.

As shown in FIG. 39, in the method of using as many resources as needed for D2D-related packets D2D UE will actually transmit, D2D transmission UE and D2D reception UE may adjust the size of transmission resources and the size of reception resources as required through a negotiation process of transmitting and receiving signals to each other.

By this, the efficiency of D2D packet transmission in a full-mesh D2D network may be increased.

Here, in the process for adjusting the sizes of transmission resources and reception resources, the signals transmitted and received between D2D UEs may be implemented using high layer signals as well as physical layer signals.

Next, a method for D2D transmission UE to transmit an SA to D2D reception UE through an SA RA will be described in detail with reference to FIG. 41.

FIG. 40 is a flowchart illustrating an example of another SA transmission method, to which a method proposed in the present disclosure may be applied FIG. 40 shows a method in which, when there are multiple D2D data transmission resources (or opportunities) between SA periods, D2D transmission UE notifies D2D reception UE of how many D2D data transmission resources can be used between the SA periods.

As described above, D2D transmission UE receives resource allocation information related to SA and/or data transmission from an eNB through a D2D grant RA (S4010).

Afterwards, the D2D transmission UE configuration information related to D2D data transmission resources to D2D reception UE through an SA (S4020).

Hereinafter, the configuration information related to D2D data transmission resources will be described in more detail.

The configuration information related to D2D data transmission resources includes indication information for indicating a D2D SF (or D2D data SF) in which D2D data can be transmitted.

The indication information may indicate the number of consecutive D2D SFs in which D2D data is transmitted or integral multiples of the number of D2D SFs.

If the indication information indicates continuous D2D SFs, the D2D transmission UE transmits D2D data to the D2D reception UE in the next K consecutive SFs immediately after an SA period (S4030).

Afterwards, the D2D transmission UE stops the transmission of D2D in SFs subsequent to the K consecutive SFs (S4040).

In another method of transmitting D2D data, offset information may be used.

That is, the D2D transmission UE may transmit D2D data to the D2D reception UE in the K consecutive D2D SFs starting from an SF spaced apart by the offset from an SA period, rather than starting from an SF immediately after the SA period, based on offset information related to D2D data transmission, and then stop the transmission of D2D data in the subsequent SFs.

If the consecutive D2D SFs cannot be occupied within the SA period because the offset value is too large, the D2D data transmission in the unoccupied SFs may be ignored or invalidated.

Alternatively, regarding D2D data transmission in unoccupied SFs, as many SFs as the unoccupied SFs may be designated as SFs for D2D data transmission, starting from the first SF in the next SA period.

Here, it is desirable that indication information (or indication bits) for indicating D2D SFs for D2D data transmission may be set in consideration of SA and data allocation periods.

For example, for a maximum SA period of 100 ms and a data transmission period of 10 ms, there are 10 data transmission opportunities between SA periods.

The number of cases (combinations) of consecutive SFs among 10 SFs needs to be taken into consideration, and the indication information requires a field with as many bits as needed to support all the combinations.

In an example, when an indication is required for 8 cases, the size of the indication information may be 3 bits, and when an indication is required for 10 cases, the size of the indication information may be 4 bits.

In another method of indicating D2D data SFs, the starting position and length of SFs related to D2D data transmission may be indicated. This method may be implemented by an LTE (-A) UL RA method.

As seen above, the method of indicating the starting position and length of D2D data SFs may increase the efficiency of resource use in terms of reduction of the number of bits of indication information.

Next, the use of indication information for indicating the position of a D2D data SF in the case of an increase in the SA period will be described.

Specifically, an increase in the SA period may be solved by repeatedly transmitting indication information for indicating the position of a D2D data SF.

For example, if the SA period increases to 400 ms, the indication information of 4 bits, which is used for an SA period of 100 ms and a data transmission period of 10 ms, may be repeatedly re-used four times.

Here, an eNB may notify D2D UE of the position of the D2D data SF by adjusting the number of repetitions of the indication information.

Signals used for adjusting the number of repetitions and the number of repetitions of the indication information for indicating the position of a D2D data SF may be predetermined.

In this case, the predetermined value may be transmitted through RRC signaling.

A bitmap pattern may be used as indication information for indicating the position of a D2D data SF.

If the indication information has a bitmap pattern, the D2D data SF may be designated very flexibly.

For example, assuming that the SA period is 100 ms and the data transmission period is 10 ms, 10-bit indication information is required as described above, in order to indicate all combinations for 10 data transmission opportunities.

For an SA period of 400 ms and a data transmission period of 40 ms, bitmap-type indication information of 10 bits is required, and for a data transmission period of 10 ms, bitmap-type indication information of 40 bits is required.

However, it is difficult to vary the length of indication information depending on the SA and/or data transmission period in terms of control information design.

Accordingly, it is desirable that the size of indication information, that is, the length of a bitmap, is fixed.

To this end, a reference SA period and a reference data transmission period are selected, and the size of indication information, that is, the bitmap length, is determined depending on the selected SA period and data transmission period.

Here, if the number of cases for indicating the position of a D2D data SF increases due to a change in the SA period and data transmission period, reference bitmap-type indication information (reference bitmap) may be repeatedly used.

On the contrary, if the number of cases for indicating the position of a D2D data SF decreases, some combinations may be truncated.

For example, for an SA period of 400 ms and a data transmission period of 10 ms, the position of a D2D data SF may be indicated in accordance with the SA period of 400 ms by repeatedly using bitmap-type indication information used for the SA period of 400 ms and the data transmission period of 10 ms four times.

The bitmap-type indication information used for the SA period of 400 ms and the data transmission period of 10 ms may be called reference indication information or a reference bitmap.

For an SA period of 400 ms and a data transmission period of 20 ms, there are 20 data transmission opportunities for 400 ms, and therefore the position of a D2D data SF may be indicated by repeatedly using 10 bits of the reference bitmap two times.

In contrast, if the SA period decreases to 50 ms and the data transmission period is 10 ms, the most significant 5 bits of a 10-bit D2D data SF indicating bitmap are used as valid information, and the least significant 5 bits may be ignored or invalidated.

Reversely, the least significant 5 bits of a 10-bit D2D data SF indicating bitmap may be used as valid information, and the most significant 5 bits may be ignored or invalidated.

Next, a method of reducing the number of bits of indication information (or D2D data SF indicating bitmap) indicating the position of a D2D data SF will be described in detail with reference to FIG. 38.

FIG. 41 is a flowchart illustrating an example of a D2D data transmission method, to which a method according to the present disclosure may be applied.

An eNB transmits a predefined (D2D) subframe pattern set to D2D transmission UE through a D2D grant RA (S4110).

Afterwards, the D2D transmission UE selects one or more subframe patterns from the received subframe pattern set (S4120).

Specifically, if an eNB transmits 8 resource patterns (or subframe patterns) from an RRC configured D2D resource pool to D2D transmission UE through a D2D grant RA, the D2D transmission UE selects one or more from the received 8 resource patterns and transmits an SA and/or data through the selected resources.

Here, a 3-bit field or indication information is defined in order to represent the 8 resource patterns.

That is, the eNB may notify the D2D transmission UE of information about resource patterns by transmitting 3-bit indication information.

Here, the number of SFS in which data is transmitted between SA periods may be variously selected and used by configuring the subframe pattern in various ways (e.g. initial K consecutive subframes, an offset, an interlaced SF pattern, etc.).

Afterwards, the D2D transmission UE transmits an SA and/or data to D2D reception UE through the selected subframe pattern (S4130).

In another embodiment, D2D-related resource pattern (or subframe pattern) may be configured hierarchically and transmitted to D2D UE.

For example, resource patterns may be configured hierarchically such that an RRC configured resource pool exists at the top layer, a plurality of resource patterns exist in a tree structure at the next layer under the top layer, and more resource patterns exist in a tree structure at the next layer.

In this case, the eNB selects one or more from 2nd layer resource patterns by using RRC configured 1st layer information and transmits the selected resource pattern to D2D transmission UE through a D2D grant.

Afterwards, the D2D transmission UE selects one or more from 3rd layer resource patterns under the received 2nd layer resource pattern and transmits an SA and/or data to D2D reception UE through the selected resource pattern.

Such a hierarchical tree structure for D2D resources and a method of interpreting the same may need to be shared in advance among the eNB and D2D UEs.

Next, the update time of SA may be discussed.

As described above, upon receiving a D2D grant from an eNB, D2D transmission UE transmits an SA to D2D reception UE in accordance with an SA period with reference to the received D2D grant.

If the D2D reception UE receives new SA-related information from the eNB between SA periods, the existing SA information is valid until the next SA period arrives.

That is, the D2D transmission UE updates the SA in the next SA transmission period. Then, the D2D transmission UE transmits the updated SA to the D2D reception UE in the corresponding SA transmission period.

Such a method of updating new control information in the next period may apply equally to TPC information, etc.

The above-mentioned update method is related to the activation of D2D resources.

However, the release of D2D resources may be set different from the above-described D2D resource activation.

That is, the D2D transmission UE releases D2D resources immediate after receiving release-related information from the eNB.

Accordingly, the D2D transmission UE stops the transmission of SA and/or data in the resources for which release is indicated.

Specifically, if the D2D transmission UE receives information indicating the release of D2D resources between SA periods from the eNB, the D2D transmission UE releases the D2D resources immediately without waiting until the next SA period.

Alternatively, if the SA period is set and the SA update periodicity is configured longer than the set SA period, the following D2D operation may apply.

That is, if the SA update periodicity and the SA periodicity are set differently and the SA update periodicity is longer, the activation of D2D resources may be set for each SA update periodicity and the release of D2D resources may be set for each SA transmission time, i.e., each SA period.

DCI Format for D2D Scheduling

Hereinafter, the present disclosure proposes a method for configuring a DCI format of a D2D grant (or a sidelink grant).

In other words, the present disclosure proposes a method for configuring a DCI format of a D2D grant when mode 1 (i.e., a mode for scheduling resource used by the eNB to transmit data or control information for D2D direct communication to a UE) is used in the resource allocation method for D2D direct communication described above.

Regarding the mode 1 scheme, an eNB sets a resource pool required for D2D direct communication. Here, the resource pool required for D2D communication may be divided into a control information pool and a D2D data pool. When the eNB schedules control information and D2D data transmission resource within a set resource pool to a D2D Tx UE using a PDCCH or an ePDCCH, the D2D Tx UE transmits control information and D2D data using the allocated resource.

The D2D Tx UE requests transmission resource for D2D data from the eNB, and the eNB schedules resource for transmission of the control information and D2D direct communication data. A transmission UE transmits a scheduling request (SR) to the eNB, and thereafter, a buffer status report (BSR) procedure allowing the eNB to determine an amount of resource requested by the transmission UE is performed.

D2D Rx UEs monitor control information pool, and when control information related to the D2D Tx UEs is decoded, the D2D Tx UEs may selectively decode D2D data transmission related to corresponding control information.

As described above, a D2D grant serves to transfer resource allocation required for SA and data transmission and control information such as an MCS, or the like, i.e., scheduling information.

As described above, D2D control information transmitted by the D2D Tx UE to the D2D Rx UE may be expressed as sidelink control information (SCI). Also, the SCI may be transmitted and received via a PSCCH. Thus, in this disclosure, scheduling assignment (SA) may be used mixedly with an SCI and/or PSCCH.

Similarly, D2D data may be transmitted or received via a physical sidelink shared channel (PSSCH). Thus, in this disclosure, D2D data may be used mixedly with the PSSCH.

A DCI format for a D2D grant proposed in the present invention may be used for scheduling of the PSCCH and scheduling of the PSSCH.

Also, since an SCI is used for scheduling the PSSCH in terms of the D2D Tx UE and the D2D Rx UE, the DCI format for D2D grant proposed in the present invention may be used for scheduling the PSCCH and include field information of the SCI.

In this manner, since both SA transmission (i.e., the PSCCH) and data transmission (i.e., the PSSCH) should be scheduled in the DCI format for D2D grant, an amount of control information is too much to be configured to one DCI format.

However, inversely, configuring two DCI formats causes a large signaling burden. In other words, in order to transmit both scheduling information regarding the SA and data, two DCI formats as illustrated in FIG. 7 may be required. That is, each DCI format for carrying the SA and data scheduling information may be required.

Thus, the present invention proposes a method for scheduling both the SA and data by one DCI format (e.g., a DCI format 5) by appropriately configuring a field as a compromise.

In order to integrate them, features of D2D transmission may be observed and fields correlated in a process of controlling SA transmission and data transmission may be replaced by a single integrated field and unrelated portions may be configured as separate fields.

Hereinafter, it is assumed that, in a DCI format for D2D grant illustrated in the drawings of this disclosure, an uplink band (or a carrier, cell) in which D2D SA and data are transmitted is 20 MHz in a bit size of each field. Thus, when a bandwidth of an uplink band is different thereto, a bit size of each field of a DCI format for D2D grant may be determined to be different.

Also, a bit size of each field illustrated in the drawings of this disclosure is merely illustrative and the present invention is not limited thereto. Thus, a bit size of each field may be defined to be different as necessary.

A DCI format for D2D grant (or sidelink grant) includes both scheduling information for SA and data, but a resource allocation (RA) field (or information) for SA and an RA field (or information) for data may be distinguished from each other. This will be described with reference to FIGS. 42 and 43.

FIG. 42 is a view illustrating a downlink control information format according to an embodiment of the present invention.

Referring to FIG. 42, a DCI format for D2D grant may include a frequency hopping flag (FH) field 4201, a resource allocation (RA) field 4202 for D2D SA, a first RA field 4203 for D2D data, a second RA field 4204 for D2D data, a TPC field 4205, and zero padding (ZP) bit(s) (when present) 4206.

The FH field 4201 indicates whether frequency hopping is applied when SA and data are transmitted. The FH field 4201 is commonly applied to SA transmission and data transmission, and thus, it may be configured as one field.

For example, when the FH field 4201 value is "1", a D2D Tx UE performs frequency hopping transmission in transmitting SA and data, and when the FH field 4201 value is "0", the D2D Tx UE does not perform frequency hopping transmission in transmitting SA and data.

The SA RA field 4202 (or PSCCH RA field, a resource field for PSCCH) indicates resource information for SA transmission. That is, the SA RA field 4202 indicates scheduling information (i.e., resource information0 for PSCCH transmission. Thus, the D2D Tx UE transmits an SA (i.e., PSCCH) in a resource indicated by the SA RA field 4202.

Here, the SA RA field 4202 may include information (or index) for deriving a position of a time and/or frequency resource domain for SA transmission.

For example, the SA RA field 4202 may indicate a start position (i.e., index) of resource for SA transmission. In other words, the SA RA field 4202 may indicate a start index of a subframe and/or resource block in which the SA is transmitted.

Also, the SA RA field 4202 may indicate a start position (i.e., index0 of resource for SA transmission. In other words, the SA RA field 4202 may indicate a start index of a subframe and/or resource block in which the SA is transmitted.

Also, the D2D Tx UE may derive a time resource (e.g., a subframe index) and/or a frequency resource (e.g., a block index0 for SA transmission using a predetermined function (formula) on the basis of information included in the SA RA field 4202.

Resource allocation information for D2D data transmission may include a D2D data first RA field 4202 (or a first PSSCH RA field, a resource block assignment and hopping resource allocation field, and a D2D data second RA field 4204 (or a second PSSCH RA field, a time resource pattern field).

The D2D data first RA field 4203 indicates resource information (e.g., a resource block) for D2D data transmission in a frequency domain. That is, it indicates scheduling information in a frequency domain for PSSCH transmission. Thus, the D2D Tx UE transmits D2D data (e.g., PSSCH) in a frequency resource indicated by the first RA field 4203.

For example, like the UL RA scheme, the D2D data first RA field 4203 may indicate a start position (i.e., a start resource block index) of a resource block for D2D data transmission and a length of an allocated resource block using one RIV value.

Also, the D2D data first RA field 4203 may indicate a start position (i.e., start resource block index) of a resource block for D2D data transmission and an end position (i.e., a final resource block index) distinguishably by a separate field (or information). In this case, an additional bit (e.g., 1 bit) may be further required.

The D2D data second RA field 4204 indicates resource information (e.g., a subframe) used for D2D data transmission in a time domain. That is, it indicates scheduling information in the time domain for PSSCH transmission. Thus, the D2D Tx UE transmits D2D data (i.e., PSSCH) in the time domain indicated by the D2D data second RA field 4204.

For example, the D2D data second RA field 4204 may indicate a subframe pattern (i.e., time resource pattern) to be used for D2D data transmission. That is, the D2D data second RA field 4204 may include information indicating a time resource pattern used for PSCCH transmission.

Here, the D2D data second RA field 4204 may indicate any one of a plurality of predetermined time resource patterns. For example, n number of subframe patterns (expressed by a bitmap) such as SF pattern #0(10001010), SF pattern #1(00111001), . . . , SF pattern #n(10011001) may be previously defined and the D2D data second RA field 4204 may indicate any one of the n number of defined subframe patterns. Here, a value "1" of a bitmap may indicate that D2D data is transmitted in a corresponding subframe, and a value "0" may indicate that D2D data is not transmitted in a corresponding subframe, or vice versa.

The TPC field 4205 indicates transmission power for SA and data transmission in the D2D Tx UE. That is, it indicates transmission power information of the PSCCH and the PSSCH.

As illustrated in FIG. 42, the TPC field 4205 may be configured as one field. When the TPC field 4205 is configured as one field, the TPC field 4205 value is commonly applied to transmission power for SA and data transmission.

The ZP 4206 may be filled with control information, may not be used, or may not be present, as necessary. That is, the ZP 4206 may be omitted if not necessary.

The order of the fields or the number of bits of the fields of the DCI format described above may be merely illustrative for the purposes of description and may be modified.

Meanwhile, compared with the DCI format 0 of FIG. 7, the DCI format for D2D grant illustrated in FIG. 39 does not include a MCS field.

In a case in which the eNB informs the D2D Tx UE about the MCS value, an MCS field should be present in the DCI format for D2D grant. Here, however, the MCS value may be determined by the D2D Tx UE itself, may be transferred through higher layer signaling (e.g., RRC signaling), or may be previously determined as a fixed value. Thus, the MCS field may not be included as illustrated in FIG. 42.

Also, the DCI format for D2D grant illustrated in FIG. 42 may not include an NDI field and an RV field. Like the above case, the NDI and RV values may be determined by the D2D Tx UE itself, may be transferred through higher layer signaling (e.g., RRC signaling), or may be previously determined as a fixed value.

Meanwhile, the TPC field for SA and data transmission may be separately configured. This will be described with reference to FIG. 43.

FIG. 43 is a view illustrating a downlink control information format according to an embodiment of the present disclosure.

Referring to FIG. 43, a DCI format for D2D grant may include a frequency hopping flag (FH) field 4301, a resource assignment (RA) field 4302 for D2D SA, a first RA field 4303 for D2D data, a second RA field 4304 for D2D data, TPC fields 4305 and 4306, and a zero padding (ZP) bit(s) (when present) 4307.

Compared with the example of the DCI format of FIG. 42, in the DCI format for D2D grant according to FIG. 43, only the TPC fields 4305 and 4306 are different and other fields may be defined to be the same. Hereinafter, only the portion different from the example of FIG. 42 will be described.

In the case of the TPC, it may be preferred to be differently applied to SA and data, and thus, as illustrated in FIG. 43, two TPC fields 4305 and 4306 may be configured. That is, a first TPC field (TPC 1) 4305 indicating transmission power of a PSCCH and a second TPC field (TPC 2) 4306 indicating transmission power of a PSSCH may be configured.

Here, referring to order of the TPD field indicating transmission power regarding SA transmission and the TPC field indicating transmission power regarding data transmission, any of the fields may be positioned first. That is, the TPC field 4305 positioned ahead may indicate transmission power regarding SA transmission and the TPC field 4306 positioned behind may indicate transmission power regarding data transmission, or the order may also be reversed.

Here, the TPC fields 4305 and 4306 may include TPC information, and any one of the TPC fields 4305 and 4306 may include TPC information and the other TPC field may include corresponding offset TPC information.

The field order and the number of bits of each field of the DCI format described above are merely illustrative for the purposes of description and may be modified.

Meanwhile, in the DCI format for D2D grant, information such as a D2D Rx UE ID may be added in terms of D2D characteristics. This will be described with reference to FIG. 44.

FIG. 44 is a view illustrating a format of downlink control information according to an embodiment of the present invention.

Referring to FIG. 44, the DCI format for D2D grant may include a frequency hopping flag (FH) field 4401, an RA field 4402 for D2D SA, a first RA field 4403 for D2D data, a second RA field 4404 for D2D data, a TPC field 4405, a ZP bit(s) (when present) 4406, and a reception UE ID (Rx_ID) field 4407.

Compared with the example of the DCI format of FIG. 42, in the DCI format for D2D grant according to FIG. 44, only the Rx_ID field 4407 is further added and the other fields may be defined to be the same. Hereinafter, only the portion different from the example of FIG. 42 will be described.

The D2D Tx UE may transmit D2D data in a unicast or multicast manner. In this case, information for identifying a target UE or a target UE group is required.

Thus, the Rx_ID field 4407 is used to designate a target UE or a target UE group. That is, the Rx_ID field 4407 includes identification information (i.e., a target UE ID) for identifying a target UE or identification information (i.e., a target group ID) for identifying a target UE group.

The field order and the number of bits of each field of the DCI format described above are merely illustrative for the purposes of description and may be modified.

Meanwhile, the DCI format for D2D grant may further include MCS information. This will be described with reference to FIG. 45.

FIG. 45 is a view illustrating a format of downlink control information according to an embodiment of the present invention.

Referring to FIG. 45, the DCI format for D2D grant may include a frequency hopping flag (FH) field 4501, an RA field 4502 for D2D SA, a first RA field 4503 for D2D data, a second RA field 4504 for D2D data, a TPC field 4505, a ZP bit(s) (when present) 4506, an MCS field 4507, and a reception UE ID (Rx_ID) field 4508.

Compared with the example of the DCI format of FIG. 42, in the DCI format for D2D grant according to FIG. 45, only the MCS field 4507 and the Rx_ID field 4508 are further added and the other fields may be defined to be the same. Hereinafter, only the portion different from the example of FIG. 42 will be described.

The MCS field 4507 includes MCS information (or an index indicating an MCS value) for D2D SA and/or data transmission. That is, it indicates MCS information for PSCCH and/or PSSCH transmission.

On the assumption that the eNB knows a D2D link (i.e., sidelink) better than the D2D Tx UE, MCS information determined by the eNB may be included in the DCI formation. For example, the eNB may estimate a channel situation of a D2D link on the basis of a buffer state report (BSR)

received from the D2D Tx UE, and determine an MCS of SA and/or data to be transmitted by the D2D Tx UE.

The MCS field 4507 information may be used when the D2D Tx UE transmits SA and/or data to the D2D Rx UE. For example, the MCS field 4507 information may be used both in transmitting SA and in transmitting data. Also, the MCS for SA transmission may be previously fixed and determined and the MCS for data transmission may be determined by information indicated by the MCS field 4507.

The Rx_ID field 4508 is used to designate a target UE or a target UE group. That is, the Rx_ID field 4508 includes identification information (i.e., a target UE ID) for identifying a target UE or identification information (i.e., a target group ID) for identifying a target UE group.

Also, in FIG. 45, a case in which the TPC field 4505 is configured as a single field, but as in the example of FIG. 43, a TPC field for SA and TPC field for data may be distinguishably included in the DCI format.

The field order and the number of bits of each field of the DCI format described above are merely illustrative for the purposes of description and may be modified.

Meanwhile, the DCI format for D2D grant may indicate an SA resource domain in a different manner. This will be described with reference to FIG. 46.

FIG. 46 is a view illustrating a format of downlink control information according to an embodiment of the present invention.

Referring to FIG. 46, the DCI format for D2D grant may include a frequency hopping flag (FH) field 4601, an RA field 4602 for D2D SA, a first RA field 4603 for D2D data, a second RA field 4604 for D2D data, a reception UE ID (Rx_ID) field 4605, a TPC field 4606, and a ZP bit(s) (when present) 4607.

Compared with the example of the DCI format of FIG. 42, in the DCI format for D2D grant according to FIG. 46, the Rx_ID field 4605 is further added, a length of the RA field 4602 for SA is adjusted to be shorter, and other fields may be defined the same. Hereinafter, only the portion different from the example of FIG. 42 will be described.

The RA field 4602 for SA may include an indicator selecting one of previously designated subframe pattern sets and indicating the selected subframe pattern, rather than directly designating an SA resource domain. That is, it may include a time resource (e.g., subframe) pattern used for PSCCH transmission.

For example, n number of subframe patterns (expressed by a bitmap) such as SF pattern #0(10001010), SF pattern #1(00111001), . . . , SF pattern #n(10011001) may be previously defined, and any one of the n number of defined subframe patterns may be indicated. Here, a value "1: of the bitmap may indicate that SA is transmitted in a corresponding subframe, and a value "0" may indicate that SA is not transmitted in a corresponding subframe, or vice versa.

FIG. 46 illustrates a case in which one of a maximum of eight subframe patterns is selected, and in this case, the RA field 4602 for SA may be consist of 3 bits. However, the present invention is not limited thereto and the number of bits of the resource RA field 4602 for SA may be determined according to the number of total subframe patterns.

In this case, the D2D Tx UE determines a frequency resource (e.g., a resource block) for transmitting SA arbitrarily or according to a predetermined rule in a subframe corresponding to a subframe pattern indicated by the RA field 4602 for SA. Also, the D2D Tx UE transmits SA in the determined frequency resource (e.g., resource block).

The D2D Rx UE may receive the SA by monitoring all the resource blocks belonging to the subframe corresponding to the subframe pattern indicated by the RA field 4602, or may receive the SA by monitoring a frequency resource (e.g., a resource block) determined by a predetermined rule.

The Rx_ID field 4605 is used to designate a target UE or a target UE group. That is, the Rx_ID field 4605 includes identification information (i.e., a target UE ID) for identifying a target UE or identification information (i.e., a target group ID) for identifying a target UE group.

The field order and the number of bits of each field of the DCI format described above are merely illustrative for the purposes of description and may be modified.

meanwhile, an MCS field may be further added to the DCI format illustrated in FIG. 46. This will be described with reference to FIG. 47.

FIG. 47 is a view illustrating a format of downlink control information according to an embodiment of the present invention.

Referring to FIG. 47, the DCI format for D2D grant may include a frequency hopping flag (FH) field 4701, an RA field 4702 for D2D SA, a first RA field 4703 for D2D data, a second RA field 4704 for D2D data, an MCS field 4075, a TPC field 4706, a ZP bit(s) (when present) 4707, and a reception UE ID (Rx_ID) field 4708.

Compared with the example of the DCI format of FIG. 46, in the DCI format for D2D grant according to FIG. 47, only the MCS field 4705 is further added and other fields may be defined to be the same. Hereinafter, only the portion different from the example of FIG. 42 will be described.

As described above, the eNB may estimate a channel situation of a D2D link on the basis of a BSR, or the like, and determine an MCS of SA and/or data to be transmitted by the D2D Tx UE.

The MCS field 4705 information may be used when the D2D Tx UE transmits SA and/or data to the D2D Rx UE. For example, the MCS for SA transmission may be previously fixed and determined and the MCS for data transmission may be determined by information indicated by the MCS field 4705.

The field order and the number of bits of each field of the DCI format described above are merely illustrative for the purposes of description and may be modified.

Meanwhile, the DCI format for D2D grant may further include DMRS (demodulation reference signal) CS (cyclic shift) information. This will be described with reference to FIG. 48.

FIG. 48 is a view illustrating a format of downlink control information according to an embodiment of the present invention.

Referring to FIG. 48, the DCI format for D2D grant may include a frequency hopping flag (FH) field 4801, an RA field 4802 for D2D SA, a first RA field 4803 for D2D data, a second RA field 4804 for D2D data, an MCS field 4805, a TPC field 4806, a ZP bit(s) (when present) 4807, a DMRS CS field 4808, and a reception UE ID (Rx_ID) field 4809.

Compared with the example of the DCI format of FIG. 47, in the DCI format for D2D grant according to FIG. 48, only the DMRS CS field 4808 is added and the other fields may be defined to be the same. Hereinafter, only the portion different from the example of FIG. 42 will be described.

The DMRS CS field 4808 includes CS information of a DMRS for SA and/or data demodulation. That is, the DMRS CS field 4808 may include a CS value (or an index indicating the CS value) for distinguishing a DMRS. Also, the DMRS CS field 4808 may include orthogonal cover code (OCC) information together with a CS value or include an index indicating the same.

The DMRS refers to a signal for demodulating SA and/or data transmitted by the D2D Tx UE. A cyclic-shifted DMRS sequence may be generated by cyclic-shifting a CS value indicated by the DMRS CS field 4808 in a basic sequence. Also, the DMRS may be mapped to the same resource domain (e.g., resource block) in which the SA and/or data is transmitted, so as to be transmitted.

The field order and the number of bits of each field of the DCI format described above are merely illustrative for the purposes of description and may be modified.

Meanwhile, in the above, the case in which the RA field for SA and the RA field for data are distinguishably configured and information included in each of the RA fields indicates resource for SA and resource for data has been described.

However, the RA information for SA transmission and the RA information for data may be set to be correlated.

When it is assumed that an RA field for SA is "RA1" and an RA field for data (the first RA field for D2D data and the second RA field for D2D data in FIGS. 42 to 48) is "RA 2", transmission may be made in such a manner that RA1 indicates a position of SA resource domain and information obtained by a combination of RA 1 and RA 2 indicates a position of data resource domain.

That is, there may be a correlation between resource domains of SA and data, this is utilized in configuring an RA field and the correlation between RA field information is included to configure an indication bit.

In this case, the D2D Tx UE may determine an SA resource domain on the basis of information included in the RA 1 field and a data resource domain may be determined on the basis of information obtained by combining the RA 1 field and the RA 2 field.

Also, conversely, transmission may be made in such a manner that a position of the data resource domain may be indicated on the basis of information of RA 2 and information obtained by combining RA 2 and RA 1 indicates a position of the SA resource domain.

In this case, the D2D Tx UE may determine a data resource domain on the basis of information included in the RA 2 field and determine a SA resource domain on the basis of information obtained by combining the RA 1 field and the RA 2 field.

In detail, for example, the RA 2 field may indicate substantially transmitted resource domain (time frequency resource position for data transmission) and the RA 1 field may indicate a position away from a time/frequency resource position of the RA 2 field, that is, a resource position for SA transmission, by offset information. Or, conversely, the RA 1 field may indicate resource domain position information for SA transmission and the RA 2 field may indicate a resource position for data transmission by offset information from the resource position of the RA 1 field.

Meanwhile, in the DCI format for D2D grant, the RA field for D2D SA transmission may be omitted. This will be described with reference to FIG. 49.

FIG. 49 is a view illustrating a format of downlink control information according to an embodiment of the present invention.

Referring to FIG. 49, the DCI format for D2D grant may include a frequency hopping flag (FH) field 4901, an MCS field 4902, a DMRS CS field 4903, a first RA field 4904 for D2D data, a second RA field 4905 for D2D data, a TPC field 4906, and a ZP bit(s) (when present) 4907.

The FH field 4901 indicates whether frequency hopping is applied when SA and data is transmitted. Since the FH field 4901 is commonly applied to SA transmission and data transmission, the FH field 4901 may be configured as a single field.

The MCS field 4902 includes a MCS value (or an index indicating an MCS value) for D2D SA and/or data transmission.

The MCS field 4902 information may be used when the D2D Tx UE transmits SA and/or data to the D2D Rx UE. For example, the MCS field 4902 information may be used both in transmitting SA and in transmitting data. Also, the MCS for SA transmission may be previously fixed and determined and the MCS for data transmission may be determined by information indicated by the MCS field 4902.

The DMRS CS field 4903 may include a CS value (or an index indicating the CS value) for distinguishing a DMRS. Also, the DMRS CS field 4903 may include orthogonal cover code (OCC) information together with a CS value or include an index indicating the same.

A cyclic-shifted DMRS sequence may be generated by cyclic-shifting a CS value indicated by the DMRS CS field 4903 in a basic sequence. Also, the DMRS may be mapped to the same resource domain (e.g., resource block) in which the SA and/or data is transmitted, so as to be transmitted.

Resource allocation information for D2D data transmission may include a D2D data first RA field 4904 (or first PSSCH RA field, resource block assignment and hoping resource allocation field and a D2D data second RA field 4905 (or second PSSCH RA field, time resource pattern field).

The D2D data first RA field 4904 indicates resource information (e.g., resource block) for D2D data transmission in a frequency domain. That is, it indicates scheduling information in the frequency domain for PSSCH transmission. Thus, the D2D Tx UE transmits D2D data (i.e., PSSCH) in the frequency domain indicated by the D2D data first RA field 4904.

For example, like the UL RA scheme, the D2D data first RA field 4904 may indicate a start position (i.e., start resource block index) of a resource block for D2D data transmission and a length of an allocated resource block using one RIV value.

Also, the D2D data first RA field 4904 may indicate a start position (i.e., start resource block index) of a resource block for D2D data transmission and an end position (i.e., a final resource block index) distinguishably by a separate field (or information).

The D2D data second RA field 4905 indicates resource information (e.g., a subframe) used for D2D data transmission in a time domain. That is, it indicates scheduling information in the time domain for PSSCH transmission. Thus, the D2D Tx UE transmits D2D data (i.e., PSSCH) in the time domain indicated by the D2D data second RA field 4905.

For example, the D2D data second RA field 4905 may indicate a subframe pattern (i.e., time resource pattern) to be used for D2D data transmission. That is, it may indicate any one of a plurality of predetermined time resource patterns.

A time/frequency resource domain for SA transmission may not be set. That is, the D2D Tx UE may select a certain resource from a SA resource pool set through higher layer signaling (e.g., RRC signaling) to transmit SA. In this case, the D2D Rx UE may receive the SA from the D2D Tx UE by entirely monitoring the SA resource pool.

Also, a position of the time/frequency resource domain for SA transmission may be derived from a time/frequency resource for data transmission. For example, a position of the time/frequency resource domain for SA transmission may be derived from a time/frequency resource for data transmission using a predetermined rule or predetermined offset values.

The TPC field 4906 indicates transmission power for SA and data transmission in the D2D Tx UE.

The ZP 4907 may be filled with control information, may not be used, or may not be present, as necessary. That is, the ZP 4206 may be omitted if not necessary.

The field order and the number of bits of each field of the DCI format described above are merely illustrative for the purposes of description and may be modified.

FIG. 50 is a view illustrating a format of downlink control information according to an embodiment of the present invention.

Referring to FIG. 50, the DCI format for D2D grant may include a frequency hopping flag (FH) field 5001, an MCD field 5002, a DMRS CS field 5003, a first RA field 5004 for D2D data, a second RA field 5005 for D2D data, a TPC field 5006, a ZP bit(s) (when present) 5007, and a reception UE ID (Rx_ID) field 5008.

Compared with the example of the DCI format of FIG. 49, in the DCI format for D2D grant according to FIG. 50, only the Rx_ID field 5008 is further added and the other fields may be defined to be the same. Hereinafter, only the portion different from the example of FIG. 49 will be described.

The Rx_ID field 5008 is used to designate a target UE or a target UE group. That is, the Rx_ID field 5008 identification information (i.e., a target UE ID) for identifying a target UE or identification information (i.e., a target group ID) for identifying a target UE group.

The field order and the number of bits of each field of the DCI format described above are merely illustrative for the purposes of description and may be modified.

Meanwhile, an RPT (Resource Pattern for Transmission) field for SA and data transmission may be configured as a single field in the DCI.

The eNB may transmit D2D grant (or sidelink grant) so that the D2D Tx UE may transmit D2D by utilizing a value indicated in Table 9 below to the D2D Rx UE.

Table 9 illustrates a DCI format according to an embodiment of the present invention.

Table 9 may be an example for the purposes of description and specific field name, length, and usage may be varied.

TABLE 9

| Field Name | Length | Use in D2D-Data-grant |
|---|---|---|
| Flag for format0/format1A differentiation | 1 | RPT index |
| Hopping flag | 1 | Use as is |
| NUL_hop | 1 (1.4 MHz) | Use as is |
| | 1 (3 MHz) | |
| | 1 (5 MHz) | |
| | 2 (10 MHz) | |
| | 2 (15 MHz) | |
| | 2 (20 MHz) | |
| Resource block assignment | 5 (1.4 MHz) | Use as is for resource of data. Resource of SA is derived from this field. |
| | 7 (3 MHz) | |
| | 7 (5 MHz) | |
| | 11 (10 MHz) | |
| | 12 (15 MHz) | |
| | 13 (20 MHz) | |
| MCS and RV | 5 | Use as is for data |
| NDI (New Data Indicator) | 1 | RPT index |
| CQI request (1 bit) | 1 | RPT index |
| TPC | 2 | Use as is |

TABLE 9-continued

| Field Name | Length | Use in D2D-Data-grant |
|---|---|---|
| Cyclic shift for DMRS | 3 | Use as is (or 1~2 bit can be used for other purpose like RPT or target ID) |
| UL index (TDD only) | 2 | Reserved |
| Downlink Assignment Index (DAI) | 2 | Reserved |

Referring to Table 9, a flag for DCI format0/format1A differentiation field, a new data indicator (NDI) field, and a CQI (or CSI) request field may be replaced with a time resource pattern (or subframe pattern) (i.e., RTP) field for D2D data and SA.

As a result, the DCI format for D2D grant may include the frequency hopping flag (FH) field, the RA field for D2D data (including frequency hopping type indication bit (N_UL_hop), the MCS and RV field, the TPC field, the transmission resource pattern (RTP) field for D2D data and SA, the DMRS CS field, the UL index field (present only in TDD), the downlink allocation index (DAI) field (present only in TDD).

Here, although the field indicating SA resource is not included in the DCI format, a position of the SA resource may be derived on the basis of a predetermined rule (or function), or the like, from the RA field for D2D data.

For example, like the UL RA scheme, the RA field for D2D data may indicate a start position (i.e., start resource block index) of a resource block for D2D data transmission and a length of an allocated resource block using one RIV value.

Also, the RA field may indicate a start position (i.e., start resource block index) of a resource block for D2D data transmission and an end position (i.e., a final resource block index) distinguishably by a separate field (or information).

The RA field for D2D data may include a bit (N_UL_hop) indicating a frequency hopping type. In this case, in bits constituting the RA field for D2D data, the MSB 1 bit or 2 bits may be used as bits (N_UL_hop) indicating a frequency hopping type and the other remaining bits may be used to indicate RA for D2D data.

As mentioned above, the bit (N_UL_hop) indicating a frequency hopping type may consist of 1 bit or 2 bits according to an uplink bandwidth, and indicates a frequency hoping type 1 or 2 (please refer to Table 5 and Table 6).

The MCS and RV field includes MCS information (or index indicating an MCS value0 for D2D data transmission) and a redundancy version (RV). That is, it indicates MCS information and RV value for PSSCH transmission.

The TPC field indicates transmission power for SA and data transmission in the D2D Tx UE. That is, it indicates transmission power information of the PSCCH and PSSCH.

The DMRS CS field includes CS information of a DMRS for SA and/or data demodulation. That is, the DMRS CS field may include a CS value (or an index indicating the CS value0 for distinguishing a DMRS. Also, the DMRS CS field 4808 may include orthogonal cover code (OCC) information together with a CS value or include an index indicating the same.

Here, 1 bit or 2 bits of the DMRS CS field may be used for a resource pattern for transmission (RPT) field for D2D data and SA or a target ID field (separately configured when present) for indicating a target ID.

The UL index field and the downlink allocation index (DAI) field may be included in the DCI format only under a TDD operation. For example, the UL index field may be present only in TDD operation in accordance with an uplink-downlink configuration 0 and the DAI field may be present only in a TDD operation in accordance with uplink-downlink configurations 1-6.

Also, the resource pattern for transmission (RPT) field for D2D data and SA indicates resource information (e.g., a subframe0 used for SA and/or D2D data transmission in a time domain. That is, it indicates scheduling information in a time domain for PSCCH and/or PSSCH transmission.

Details of the resource pattern for transmission (RPT) field for D2D data and SA will be described in detail hereinafter.

Also, the structure described above with reference to Table 9 may be slightly modified to be used such that DMRS-related information is deleted and all the bits of the corresponding field is used to designate an RPT.

TABLE 10

| Field Name | Length | Use in D2D-Data-grant |
| --- | --- | --- |
| Hopping flag | 1 | Use as is |
| NUL_hop | 1 (1.4 MHz) | Use as is |
| | 1 (3 MHz) | |
| | 1 (5 MHz) | |
| | 2 (10 MHz) | |
| | 2 (15 MHz) | |
| | 2 (20 MHz) | |
| Resource block assignment | 5 (1.4 MHz) | Use as is for resource of data. Resource of SA is derived from this field |
| | 7 (3 MHz) | |
| | 7 (5 MHz) | |
| | 11 (10 MHz) | |
| | 12 (15 MHz) | |
| | 13 (20 MHz) | |
| MCS and RV | 5 | Use as is for data |
| TPC for PUSCH | 2 | Use as is |
| RPT indication | 6 | New |
| UL index (TDD only) | 2 | Reserved |
| Downlink Assignment Index (DAI) | 2 | Reserved |

Referring to Table 10, it is different in that 3 bits of the cyclic shift field for DMRS is used as the RPT field, compared with Table 9. In this case, the DCI format structure as illustrated in Table 10 may be generated, and a total of 6 bits may be used for the resource pattern for transmission (RPT) field for D2D data and SA.

This may be simplified as illustrated in FIG. 51. This will be described with reference to FIG. 51.

FIG. 51 is a view illustrating a format of downlink control information according to an embodiment of the present invention.

Referring to FIG. 51, the DCI format for D2D grant may include a frequency hopping flag (FH) field 5101, an RA field 5102 for D2D data and SA (including frequency hopping type indication bit (N_UL_hop), an RPT field 5103 for D2D data and SA, and a TPC field 5104 for SA and data transmission.

In FIG. 51, only the essential fields are simply illustrated and any other field may also be included. For example, the DCI format may include an MCS field, a DMRS CS field, and the like, and in the case of TDD, a UL index field and a downlink allocation index (DAI) field may be further included.

Descriptions of the frequency hopping flag (FH) field 5101 and the TPC field 5104 are the same as those of Table 9, and thus, the redundant descriptions thereof will be omitted.

First, the RA field 5102 for D2D data and SA will be described.

The RA field 5102 for D2D data and SA requires a large amount of bits to express all of a SA transmission position (i.e., resource block position) and a data transmission position. In fact, the SA transmission position and the data transmission position are important for D2D transmission/reception, but since the number of bits required for transmitting them is not a few, and thus, a reduction in the number of bits significantly affects control channel performance. Thus, in order to incorporate two types of RA into a single RA form, a method for inferring (deriving) another RA information from one RA information is proposed. This will be described with reference to FIG. 52.

FIG. 52 is a view illustrating a method for deriving a resource block for SA transmission according to an embodiment of the present invention.

Referring to FIG. 52, it is assumed that the D2D Tx UE is allocated RB x, RB x+1, . . . , RB x+a−1 as resource blocks for D2D data transmission from the RA field 5102 of FIG. 51.

Here, an RB used for SA transmission may be expressed as follows.

Hereinafter, for the purposes of description, it is assumed that the number of resource blocks (RB0 used for D2D data transmission is a and the number of RBs used for SA transmission is b.

Here, the number (b) of RBs used for SA transmission may be previously fixed to be determined or may be determined by higher layer signaling such as RRC signaling or system information 9 e.g., an SIB or MIB0. Also, the number of (b) of RBs used for SA transmission may be derived using a predetermined rule (or formula0 from the number (a) of RBs used for data transmission.

First, when RBs (i.e., data RA) for data transmission is allocated from the RA field 5102 as illustrated in (a) of FIG. 52, a start position of RBs for SA transmission may be the same as a start position of a data RA and b number of RBs may be occupied. Thus, an SA RB index may be expressed as x, x+1, . . . , x+b−1.

Here, actual transmission of SA may be the same subframe as that of data or may be a different subframe.

Also, similarly, as illustrated in (b) of FIG. 52, b RBs may be occupied from a final position of RBs for data transmission (i.e., data RA). Thus, the SA is transmitted in the b RB band, starting from a position of RB index (x+a−1)−b. That is, the SA RB index may be expressed as x+a−b−1, x+a−b, x+a−1.

Meanwhile, as illustrated in (c) of FIG. 52, it may be positioned in the middle of the data RA, and in this case, an SA RB index may be expressed as $$x + \left\lceil \frac{a-b}{2} \right\rceil,$$

$$x + \left\lceil \frac{a-b}{2} \right\rceil + 1, \ldots, x + \left\lceil \frac{a-b}{2} \right\rceil + b - 1.$$

Here, a center of the SA RBs may not be a center of data RBs, and may deviate by 1 or 2 RBs from the center of the data RBs according to circumstances. Such a phenomenon occurs because, when the number of data RBs is an even number and the number of SA RBs is an odd number, the SA RB may not be positioned at the center of the data RB position and an index position which is smaller or greater with respect to the center of the data RBs may be a center position of the SA RBs. When the number of data RBs is an odd number and the number of SA RBs is an odd number, the two resource domains may have the same center. However, when the number of data RBs is an odd number and the number of SA RBs is an even number, the center deviates by 1 RB To sum up, when the number of data RBs and the number of SA RBs are the same even numbers or odd numbers, the centers of the two allocation resource domains are the same and the SA RB may be positioned at the center of the data RBs. However, when any one of the number of the data RBs and the SA RBs is an even number and the other is an odd number (or vice versa), the centers of the two allocation resource domains are not the same and the SA RB may not be positioned at the center of the data RBs.

Thus, in this case, a special rule is required. In other words, when an RB positioned at the center of the data RBs is "RB x_c", it should be determined whether "RB x_c−1" having a smaller index is to be set as a center of the SA RBs or whether "RB x_c+1" having a greater index is to be set as a center of the SA RBs.

It may be defined as a fixed value in accordance with a rule in advance. Also, since it is varied according to a size of a bandwidth used for D2D signal (i.e., SA and/or data) transmission, a size of resource allocated for D2D signal (i.e., SA and/or data) transmission or a ratio of resource allocated for SA and data transmission, a transmission mode, an operation mode, and the like, it may be set through higher layer signaling. Also, blind decoding may be performed to detect where an SA is positioned on the basis of the center of data RBs and it may be used for the purpose of determining a transmission and/or operation mode on the basis of information obtained from position information of the center of the detected SA RBs.

Meanwhile, there may be a restriction in which SA resource allocation is not possible in every RB index and, for example, C should be positioned only in the RB index as a multiple. That is, SA resource may be allocated only when an RB index is a multiple of C. In this manner, when there is a restriction in a starting point (position) of the SA RB (that is, when a start of the RB index is a multiple of C), an index of the SA RB starting point may be defined as $$C \left\lfloor \frac{a - x + \left\lceil \frac{a-b}{2} \right\rceil}{c} \right\rfloor.$$

In a transmission scheme in which an RB in which an SA is transmitted is included in an RB in which data is transmitted, when the SA and the data are transmitted in the same subframe, the SA may be punctured or rate-matched to data.

Meanwhile, in the above descriptions, the method for determining a position of resource allocated for SA transmission on the basis of the position of resource allocated for D2D data transmission has been described, but the present invention is not limited thereto and the method may be performed reversely. That is, when a resource allocation position for SA transmission is determined and a receiver knows that, a resource position (i.e., RA) for D2D data transmission may be induced on the basis of the information. For example, like the method as described above, a start position of SA resource may be determined as a start position of D2D data resource.

Hereinafter, resource allocation information transferred in the RA field 5102 will be described in detail.

As described above, the LTE/LTE-A system supports a method for informing a resource indication value (RIV) in a scheme of allocating resource including contiguous resource blocks (i.e., a downlink resource allocation type 2 or an uplink resource allocation type 0), among resource allocation schemes.

Here, the RIV indicates a start RB (RB_start0 and a length of RB (RB_length0 by a previous formula (i.e., conversion table). Thus, a parameter used in this case may be applied as is to the formula.

That is, the D2D Tx UE may drive a start RB (RB_start) indicated by the RIV value on the basis of a predetermined conversion table and a length of the RB (RB_length). In the example of FIG. 52, the start RB (RB_start) index corresponds to "x" and the length of the RB (RB_length) corresponds to "1".

Thus, the D2D Tx UE may identify an RB for data transmission using the RIV transferred from the RA field 5102, and may derive an RB for SA transmission from the RB used for data transmission on the basis of a rule described above, and the like.

Also, when a fact that a position of an RB in which SA is transmitted is included in an RB band in which data is transmitted is considered, it may also be possible to indicate an RB used for SA transmission by utilizing a subset of RIV.

That is, a position of the SA RB is not determined by the aforementioned rule and an RIV for data and an RIV for SA may be transferred in each RA field 5102. This will be described with reference to FIG. 53.

FIG. 53 is a view illustrating a method for designating a resource block for D2D signal transmission according to an embodiment of the present invention.

FIG. 53(a) illustrates an RIV table for determining an RB for data transmission and FIG. 53(b) illustrates an RIV table for determining an RB for SA transmission.

Referring to FIG. 53(a), when an RIV value (RIV data=16) for data regarding a 5RB bandwidth (BW) is indicated in the RA field 5102, a start position (RB_start) of RBs for data transmission is 1 (i.e., RB index 1) and a length of the RBs (RB_length) is 4. That is, the RB 5301 used for data transmission is a total of four RBs, starting from the RB index 1.

Since the data transmission band is 4 RBs and SA is transmitted in this band, a 4RB-based RIV_SA table may be created as illustrated in FIG. 53 (b0 and an RIV_SA fitting the table may be indicated as a method for indicating the SA. That is, when a data transmission band is determined, an RIV table appropriate for the bandwidth is created, and here, the eNB determines an RIV for SA and transmits the same. For example, the eNB determines the number (bandwidth) of D2D data transmission RBs allocated to the D2D Tx UE and creates an RIV_SA table according to the number (bandwidth) of the corresponding transmission RBs. Also, the eNB transmits an SA RIV value for indicating SA transmission resource to the corresponding D2D Tx UE.

The D2D Tx UE may reversely receive the data RIV and recognize a start position and length of the data RBs, and may receive the SA RIV and recognize a start position and length of the SA RBs.

referring to FIG. 53(b), since a data RB transmission band is 4 RBs (RB 1, RB 2, RB 3, RB 4), the SA should be transmitted within the data RBs (RB 1, RB 2, RB 3, RB 4).

FIG. 53(b) illustrates a table for interpreting RIV=4 as SA resource domain information, and the table is obtained from a table for interpreting RIV=16 as data domain information.

Here, the RIV table for SA may be variably determined. For example, in a case in which a length of SA RBs is a maximum of 3, RB start indices may be 0, 1, and 2 as illustrated in FIG. 53(b). Meanwhile, when the length of the SA RBs is a maximum of 2, RB star indices may be 0, 1, 2, and 3. Also, conversely, a maximum value of the RB length may be determined according to an RB start index. That is, the RB start index of the RIV table and the RB length may be relatively determined.

Here, the RB start index of the RIV table for SA may indicate an actual RB index value. For example, in the RIV table for SA of FIG. 53(b), the RB start index 0 may indicate an RB index 0.

Alternatively, a start index value of SA RBs of the RIV table for SA may be a relative value with respect to a data RB index. For example, in the RIV table for SA of FIG. 53(b), the RB start index 0 may indicate 1, a first RB index of the RB 5301 used for data transmission.

When the RIV value for SA is indicated as 4 (RIV_SA=4), a start position of RBs (RB_start) of RBs for SA transmission is 1 and a length of the RBs (RB_length) is 2. That is, the RB 5302 used for SA transmission is a total of two RBs, starting from the RB index 2.

In this manner, in order for the RBs for SA transmission to be determined in the SA RIV table, an RIV value regarding SA should be transmitted to the D2D Tx UE. To this end, the RA field 5102 of FIG. 51 may include all of an RIV regarding data and an RIV regarding SA. for example, in the RA field 5102, some higher bits may indicate an RIV regarding SA and the other remaining bits may indicate an RIV regarding data. Also, the RIV regarding SA may be expressed as the RIV value as is, or may be expressed as an offset with the RIV value regarding data.

Since the RIV table for SA (RIV_SA table0 is determined on the basis of the RIV (RIV_data) value for data, a length thereof can be known although the RIV_SA value is varied, and thus, there is no problem in decoding. If some bits by a variable length are not used, a predetermined specific bit value may be filled so as to be utilized to enhance a coding gain.

Hereinafter, a resource pattern of transmission (RPT) field 5103 for D2D data and SA will be described.

As for an RPT indicating a time domain resource allocation pattern of an SA subframe and a data subframe, as well as RA, an SA and data RPT may be derived from a single RPT field. That is, like the DCI format illustrated in FIG. 51, it is preferred for the RPT (data, SA) field 5103 to simultaneously indicate an SA RPT.

It is assumed that there is an SA transmission subframe pattern (i.e., SA RPT pattern) set and a plurality of RPTs are present in the corresponding set. Similarly, it is assumed that there is a data transmission subframe pattern (i.e., data RPT pattern) set and a plurality of RPTs are present in the corresponding set). This may be expressed as follows.

SA RPT set={SA_pattern-1, SA_pattern-2, . . . , SA_pattern-N}

Data RPT set={Data_pattern-1, Data_pattern-2, . . . , Data_pattern-M}

For example, when the RPT=0010 value is indicated in the RPT field 5103 of the D2D grant DCI format, the D2D Tx UE recognizes the value as "2", selects SA_pattern-2 from the SA RPT set, and selects Data_pattern-2 from the data RPT set.

However, the SA_pattern-2 and Data_pattern-2 do not mean to have the same pattern. That is, since the SA_pattern-2 and Data_pattern-2 are patterns selected from the independent subframe patterns defined according to respective purposes, although the same value is indicated in the RPT field 5103, the RPT patterns applied to SA and data are designated to be different.

Here, information regarding the SA_pattern set and the data pattern set may be fixedly determined in advance so that the UE and the eNB may know the information. Also, the eNB may provide information regarding the SA_pattern set and the data pattern set to the UE through higher layer signaling such as RRC signaling or system information (e.g., an SIB or an MIB) in advance.

Meanwhile, the number of SA transmission subframe pattern (i.e., SA RPT pattern) candidates is highly likely to be smaller than the number of data transmission subframe pattern (i.e., data RPT patterns) candidates.

In this manner, when the number of the former candidates is smaller, an RPT value of the DCI format may be modulo-operated using the maximum number (N) of the SA RPT pattern candidates and used as an SA RPT value.

For example, when it is assumed that the number of SA RPT pattern candidates is 4 and the number of RPT pattern candidates of data is 8 and RPT index="6" is indicated by a D2D grant, the reception terminal (i.e., D2D Tx UE) uses a value obtained by modulo-operating 6 by the total number of the SA_pattern candidates (i.e., mod(6,4)=2) as an RPT pattern index, and in the case of data, the value 6 may be used as a data RPT pattern index as is.

That is, since a field of the DCI format and a signaling format are determined according to the number of data RPT pattern indices, when the value exceeds the SA RPT pattern indices, it may be used to determine an SA RPT pattern index by using modulo operation.

Also, the SA transmission subframe pattern (i.e., SA RPT pattern) set and a data transmission subframe pattern (i.e., data RPT pattern) set may be in plurality.

That is, the subframe pattern set may be several sets such as 1, 2, 3, . . . , N, and the eNB may indicate which subframe pattern set is to be used through signaling. That is, the eNB may indicate an SA RPT pattern and/or data RPT pattern set to be used by the D2D Tx UE through RRC signaling in advance.

The D2D Tx UE may receive the SA RPT pattern and/or data RPT pattern set information from the eNB through RRC signaling, and determines an SA RPT pattern and/or data RPT pattern on the basis of a value indicated in the RPT field 5103 of the DCI format.

Meanwhile, the RPT field for D2D data and/or SA may be divided into two parts so as to be defined. This will be described with reference to FIG. 54.

FIG. 54 is a view illustrating a format of downlink control information according to an embodiment of the present invention.

Referring to FIG. 54, the DCI format for D2D grant may include a frequency hopping flag (FH) field 5401, an RA field 5402 for D2D data (including frequency hopping type indication bit (N_UL_hop), an MCS (or MCS and RV) field 5403, a TPC field 5404, an RPT field 5405 for D2D data and SA, a UL index field (present only in TDD) 5406, and a downlink allocation index (DAI) field (present only in TDD) 5407.

Compared with the example of Table 9, in the DCI format for D2D grant according to FIG. 54, the DMRS CS field is excluded and a corresponding bit is used as an RPT field and other fields may be defined to be the same.

The frequency hopping flag (FH) field 5401, the MCS (or MCS and RV) field 5403, the TPC field 5404, the UL index field 5406, and the downlink allocation index (DAI) field 5407 are the same as those of Table 9 described above, and thus, descriptions thereof will be omitted.

The RA field 5402 for D2D data is configured to be the same as the field described above with reference to FIGS. 51 to 53, and thus, a description thereof will be omitted.

Bits belonging to the RPT field 5405 for D2D data and SA (hereinafter, referred to as an "RPT field") may be divided into two parts (i.e., a first part (part 1) and a second part (part 2)).

The first part (part 1) and the second part (part 2) may be differentiated by some higher bits and the other remaining bits in the RPT field 5405. For example, in a case in which the RPT field 5405 has 6 bits, the higher 2 bits (i.e., most significant bits (MSBs) belong to the first part (part 1) and the other remaining 4 bits may belong to the second part (part 2).

Also, the first part (part 1) and the second part (part 2) may also be differentiated by a status/state (or value) expressed by one RPT field 5405. For example, when the RPT field 5405 has 6 bits, it may indicate a total of 64 states (or values). Here, 16 states (or values) may belong to the first part (part 1) and the other remaining 48 states (or values) may belong to the second part (part 2).

First, the first part (part 1) will be described in detail.

The first part (part 1) grants in how many subframes, among the entire subframes in which a D2D signal can be transmitted, D2D data transmission is permitted.

For example, 2 bits of the RPT field 5405 may be utilized for the purpose of grant whether D2D transmission is permitted.

The eNB may indicate where a D2D available subframe to which one SA is applied is positioned through system information (e.g., an SIB or an MIB) or higher layer signaling (e.g., RRC signaling) in advance. Each UE may recognize how many subframes are available for D2D signal transmission as a target of a corresponding SA therethrough.

For example, the number of subframes simply configured as D2D data transmission-available subframes between two adjacent SA periods may correspond thereto. In the case of the example of FIG. 37, five subframes available for D2D data transmission within one SA period 3730 correspond thereto.

Here, it is assumed that a total A number of subframes are configured as D2D data transmission-available subframes.

Also, when receiving the D2D grant, the UE may recognize that B number of subframes, among A number of subframes available for D2D data transmission through the first part (part 1) bits of the RPT field 5405 described above, is actually allowed for data transmission of the corresponding UE.

The following methods may be used as a specific method for recognizing the number of subframes actually allowed for D2D transmission by the corresponding UE through the first part (part 1) of the RPT field 5405

1) The number of actual D2D subframes designated for each status/state (or value) of the corresponding first part (part 1) may be determined in advance.

For example, one, two, three, and four subframes may be connected (or mapped) to states (or values) "00", "01", "10", and "11" of the first part (part 1) of the RPT field 5405, respectively.

2) The number of actual D2D subframes designated for each state (or value) of the first part (part 1) of the RPT field 5405 may be determined as a ratio to the entire D2D available subframes in advance.

For example, in a case in which the entire D2D available subframes is A, floor(A/X), floor(2A/X), floor(3A/X), and floor(4A/X) number of subframes may be connected (or mapped) to states (or values) "00", "01", "10", and "11" of the first part (part 1), respectively. Here, X indicates a predetermined number. In this manner, it can be interpreted as an operation of allocating subframes corresponding to the numbers of 1/X, 2/X, 3/X, and 4/X among the substantially entire A number of D2D available subframes through each state (or value) to actual data transmission. Here, floor(x) is a function of outputting a maximum value among integers smaller than or equal to x.

3) The number of actual D2D subframes designated for each state (or value) of the first part (part 1) of the RPT field 5405 may be designated through higher layer signaling such as RRC signaling or system information (an SIB or MIB) in advance.

Based on this, the UE may recognize that D2D data transmission is allowed in B number of subframes among the entire A number of subframes.

In the case of the example of FIG. 37, two subframes allowed for D2D data transmission within one SA period 3730 corresponds thereto.

In the number of subframes allowed for D2D data transmission designated as described above, a plurality of candidate subframe patterns may be generated on the basis of a previously determined rule. Each candidate pattern determines a method for transmitting D2D data in B number of subframes among A number of subframes.

Such a candidate subframe pattern may be determined by a rule that both the UE and the eNB know in advance according to the number of subframes allowed for D2D data transmission. Also, the eNB may provide candidate subframe pattern information according to the number of subframes allowed for D2D data transmission to the UE through higher layer signaling such as RRC signaling or system information (e.g., SIB or MIB) in advance.

The eNB may designate which of candidate patterns the corresponding UE is to actually use by using the second part (part 2) among bits belonging to the RPT field 5405. For example, four bits may be used as the second part (part 2), and in this case, the eNB may operate to designate one of 16 candidate subframe patterns.

Through the aforementioned methods, the eNB may be able to dynamically adjust the number of subframes used by each UE to transmit D2D data in each SA period, and in particular, the eNB may adjust the value according to an amount of D2D data traffic of the corresponding UE.

Meanwhile, signaling regarding the number (B) of subframes allowed for actual transmission of the corresponding UE may be applied only to D2D data transmission (i.e., PSSCH transmission). In the case of SA transmission, it may be preferred not to adjust the number of transmission subframes according to a traffic situation, and thus, the number of subframes used for SA transmission may be fixed to higher layer signaling such as RRC signaling or system information (e.g., SIB or MIB).

Also, a bit field designating the number of subframes allowed for actual SA transmission (i.e., PSCCH transmission) of the corresponding UE for adjustment in the same form as that of D2D data may be re-used, and the number of subframes allowed for SA transmission may also be adjusted by applying the aforementioned principle. That is, the number of subframes allocated for SA and data transmission may be designated through the first part (part 1) of the RPT field 5405, and a subframe pattern for SA transmission and data transmission may be designated through the second part (part 2) of the RPT field 5405.

Here, although the number of subframes allocated for SA transmission and data transmission is simultaneously designated through the first part (part 1) of the RPT field 5405, the number of subframes allocated for SA transmission and the number of subframes allocated for data transmission may be different to each other. For example, in a case in which values of the first part (part 1) of the RPT field 5405 are "00", "01", "10", and "11", one, two, three, and four subframes allocated for data transmission may be connected (or mapped) thereto, respectively. Meanwhile, in a case in which values of the first part (part 1) of the RPT field 5405 are "00" and "01", one subframe allocated for SA transmission and two subframes allocated for transmission of "10" and "11" may be connected (or mapped) thereto.

Also, similarly, although subframe patterns allocated for SA transmission and data transmission through the second part (part 2) of the RPT field 5405 are simultaneously designated, a subframe pattern designated for SA transmission and subframe pattern designated for data transmission may be different.

That is, the number of subframes allocated for SA transmission and the number of subframes allocated for data transmission may be different, and one of candidate subframe patterns according to the number of subframes may be determined, respectively. For example, when two subframes are allocated for SA transmission, any one of four candidate subframe patterns may be designated and when four subframes are allocated for data transmission, any one of a total of 16 candidate subframe patterns may be designated.

Meanwhile, even in a case in which A (the number of D2D SA and/or data available subframes set through higher layer signaling, or the like) and b (the number of subframes allowed for SA and/or data transmission) are determined, subframe pattern sets corresponding thereto may be several pattern sets. This will be described with reference to FIG. 55.

FIG. 55 is a view illustrating a subframe pattern set according to an embodiment of the present invention.

Referring to FIG. 55, it is assumed that an SA period (i.e., PSCCH period) is set to 40 ms (a total of 40 subframes) and subframe #0 5501, subframe #8 5502, subframe #6 5503, subframe #4 5504, and subframe #2 5505 are set as subframes available for D2D data transmission within one WA period.

In the case of FIG. 55, set A and set B are illustrated as different types of subframe sets. The set A includes a pattern #1(5501, 5502), pattern #2(5502, 5503), pattern #3(5503, 5504), and pattern #4(5504, 5505), and the set B includes pattern #1(5501, 5503), pattern #2(5502, 5504), pattern #3(5503, 5505), and pattern #4(5501, 5504).

The subframe pattern sets may be present as several subframe patterns like 1, 2, 3, . . . N, and the eNB may indicate which subframe pattern set is to be used through signaling. That is, the eNB may provide subframe pattern set information to be used by the D2D Tx UE through RRC signaling in advance.

The D2D Tx UE receives subframe pattern set information from the eNB through RRC signaling, or the like, and performs D2D transmission (SA/and/or data) using the subframe pattern designated through the second part (part 2) of the RPT field 5405 within the corresponding subframe pattern set.

In a case in which SA and data are transmitted in the same subframe, the subframe pattern set and the subframe patterns designated within the corresponding subframe pattern set may be applied in the same manner. Thus, the eNB may transmit one subframe pattern set information to the D2D Tx UE through RRC signaling, or the like, and transmits one subframe pattern indication information through the second part (part 2) of the RPT field 5405 in FIG. 54.

Also, in a case in which a subframe in which SA is transmitted and a subframe in which data is transmitted are different, a subframe pattern set designated for SA transmission and a subframe pattern set designated for data transmission may be different. In this case, the eNB may transmit subframe pattern set information for SA transmission and subframe pattern set information for data transmission to the D2D Tx UE through RRC signaling, or the like. Also, the eNB may transmit one subframe pattern indication information through the second part (part 2) of the RPT field 5405 in FIG. 54, and here, subframe patterns for SA and data transmission may be designated within a corresponding subframe pattern set. For example, it is assumed that "set A" is designated as a subframe pattern set for SA transmission to the D2D Tx UE and "set B" is designated as a subframe pattern set for data transmission. Also, when a "pattern #3" is indicated through the second part (part 2) of the RPT field 5405, a "pattern #3" within the "set A" is designated as a subframe pattern for SA transmission, and a "pattern #3" within the "set B" is designated as a subframe pattern for data transmission.

Also, in a case in which the subframes designated for SA transmission and data transmission are not the same, a the subframe pattern set designated for SA transmission and the subframe pattern set designated for data transmission are may be the same but a subframe pattern for SA transmission and a subframe pattern for data transmission may be different within the corresponding subframe pattern set. In this case, the eNB may transmit one subframe pattern set information to the D2D Tx UE through RRC signaling, or the like. Also, as mentioned above, on the basis of one subframe pattern indication information transmitted through the second part (part 2) of the RPT field 5405 in FIG. 54, the subframe pattern for SA transmission and the subframe pattern for data transmission may be determined to be different.

Also, as described above, signaling regarding the number (B) of subframes allowed for actual transmission of the corresponding UE may be applied only to the D2D data transmission (e.g., PSSCH transmission). In this case, the subframe pattern information transmitted through RRC signaling, or the like, and subframe pattern information transmitted through the second part (part 2) of the RPT field 5405 in FIG. 54 may be applied only to D2D data transmission (i.e., PSSCH transmission).

FIG. 56 is a view illustrating a method for transmitting and receiving downlink control information according to an embodiment of the present invention.

Referring to FIG. 56, the eNB may transmit data transmission available resource information (i.e., PSSCH transmission available resource information) to a D2D transmission terminal (S5601).

Here, the D2D data transmission available resource information may be the number of subframes available for data transmission within one SA period.

Meanwhile, the eNB may not transmit the D2D data transmission available resource information to the D2D transmission terminal. In this case, step S5601 may be omitted.

The eNB may transmit downlink control information (e.g., a DCI format 5) to the D2D Tx UE, and here, the downlink control information includes resource information (i.e., PSSCH transmission allowing resource information) allowed for transmitting data to the corresponding D2D Tx UE (S5602).

Here, the data transmission allowing resource information may include a frequency resource (e.g., resource block) and/or time resource (e.g., a subframe).

For example, the data transmission allowing resource information may include resource block information allowed for transmitting data, and may be indicated by an RIV indicating a start resource block and a length of a resource block.

Also, the data transmission allowing resource information may include subframe information allowed for transmitting data and may be indicated by a subframe pattern used for transmitting data.

Here, the subframe pattern used for transmitting data may be determined as any one of preset one or more subframe pattern sets (or candidates).

Also, the data transmission allowing resource information may be indicated by the number of subframes for transmitting data and a subframe pattern within the corresponding number of subframes.

Here, the number of the data transmission allowing resource information may be determined according to an amount of data traffic to be transmitted by the D2D Tx UE.

In detail, in order to request uplink resource allocation for transmitting a buffer status report (BSR), the D2D Tx UE transmits a scheduling request to the eNB. When the eNB allocates uplink resource for BSR transmission to the D2D Tx UE, the D2D Tx UE transmits a BSR to the eNB through an allocated uplink resource. That is, the D2D Tx UE reports an amount of data traffic to be transmitted through a D2D link, to the eNB. The eNB may check the amount of data traffic to be transmitted to the D2D Tx UE through a BSR, and determine the number of subframes to be allocated to the corresponding D2D Tx UE.

The D2D Tx UE derives an SA transmission resource (i.e., PSCCH transmission resource) from resource information allowed for data transmission by downlink control information (S5603).

Here, the D2D Tx UE may derive frequency and time resource used for SA transmission from a frequency resource (e.g., a resource block) and a time resource (e.g., a subframe) from the data transmission allowing resource information.

For example, the resource block used for SA transmission may be determined as a predetermined number of resource blocks from a first or last resource block of resource blocks used for data transmission. Also, a central resource block used for SA transmission may be positioned in a central resource block used for data transmission and determined by a predetermine number of resources.

Also, in a case in which the number of resource blocks for data transmission is an odd number and the number of resource blocks for SA transmission is an even number or vice versa, a central resource block for SA transmission may be determined as a resource block having one less or one more index from the central resource block for data transmission.

Also, an RIV table regarding SA transmission may be determined according to the number of resource blocks for data transmission, and a start resource block used for SA transmission and a length of the resource block may be determined on the basis of the determined RIV table.

Also, a subframe pattern used for SA transmission may be determined on the basis of subframe pattern indication information for data transmission within a subframe pattern set (or candidate) regarding one or more preset SA transmissions.

The D2D Tx UE transmits SA (i.e., PSCCH) and/or data (i.e., PSSCH) to the D2D Rx UE (S5604).

That is, the D2D Tx UE transmits an SA through the resource derived in step S5603, and transmits data through a resource indicated by downlink control information received in step S5602.

Mapping of SA RB Index and Data RB Index

Resource allocation information (position) of data may be inferred (or derived) from resource allocation information of SA or, conversely, resource allocation information (position) of SA may be inferred (or derived) from resource allocation information of data. In this case, D2D grant may include only resource allocation information regarding any one of SA and data. For example, an RA field of the D2D grant may include only frequency-domain resource allocation information regarding any one of SA and data.

However, in order to infer (or derive) the other remaining resource allocation information on the basis of one resource allocation information, consistent relationship should exist therebetween.

In particular, in case in which a transmission granularity (or allocation granularity/indication granularity) of SA and a transmission granularity (or allocation granularity/indication granularity) of data are different, preferably, a consistent relationship exists between an index of a transmission granularity of SA and an index of a transmission granularity of data.

Here, the resource allocation information of SA and data may correspond to frequency-domain resource allocation information (e.g., RB index) or may correspond to time-domain resource allocation information (e.g., subframe index (set), etc.).

FIG. 57 is a view illustrating a method for D2D communication according to an embodiment of the present invention.

In FIG. 57, it is assumed that D2D grant includes only D2D SA resource allocation information.

Referring to FIG. 57, the eNB transmits D2D SA and D2D data transmission granularity information to the D2D Tx UE (S5701).

Here, the transmission granularity may be the same as a resource allocation granularity (or indication granularity) for the eNB to indicate resource allocation information.

In the frequency domain, the SA and/or data transmission granularity may be set to integer multiple of RB or may be set to an integer multiple of a resource block group (RBG). Also, in the time domain, the SA and/or data transmission granularity may be set to an integer multiple of subframe.

The SA and data transmission granularity information may be transmitted through system information (e.g., MIB or SIB, etc.) or higher layer signaling (e.g., RRC or MAC signaling) or through a PD2DSCH (or PSBCH), or the like.

Meanwhile, SA and data transmission granularities may be previously defined and the eNB and the UE may know them. In this case, step S5801 may be omitted.

The eNB transmits downlink control information (DCI) (i.e., D2D grant) including D2D SA resource allocation information to the D2D Tx UE through a PDCCH (or EPDCCH) (S5702).

Here, the downlink control information (i.e., D2D grant) may be configured in the aforementioned format and further include information other than the SA resource allocation information.

The D2D Tx UE infers (or derives) D2D data resource allocation information from D2D SA resource allocation information (position) on the basis of D2D SA and D2D data transmission granularity information (S5703).

A method for inferring (or deriving) data resource allocation information from the SA resource allocation information (position) on the basis of the SA and data transmission granularity information will be described hereinafter.

The D2D Tx UE transmits D2D SA through resource indicated in the D2D SA resource allocation information received in step S5702 and transmits D2D data to the D2D Rx UE through the D2D data transmission resource derived in step S5703 (S5704).

Meanwhile, in the case of mode 2, the D2D Tx UE may arbitrarily determine SA transmission resource from an SA resource pool. Also, the D2D Tx UE may derive a data transmission resource from the determined SA transmission resource (position) on the basis of the SA and data transmission granularity information.

The D2D Rx UE may perform blind-decoding on the SA resource pool to detect/decode SA transmitted from the D2D Tx UE.

Also, like the D2D Tx UE, the D2D Rx UE may derive data transmission resource (position) from the SA transmission resource position on the basis of the SA and data transmission granularity information, and decode data from the derived resource.

Also, SA transmitted from the D2D Tx UE may include data transmission resource information. In this case, as described above, the D2D Rx UE may detect/decode SA though blind decoding and obtain data transmission resource information included in the SA. Also, the D2D Rx UE may decode data in a resource indicated by the obtained data transmission resource information.

Hereinafter, a method for deriving data resource allocation information from SA resource allocation information (position) on the basis of SA and data transmission granularity information will be described.

Hereinafter, resource allocation information of a frequency domain will be largely described for the purposes of description, but the preset invention is not limited thereto.

FIG. 58 is a view illustrating a method for indicating resource for D2D data according to an embodiment of the present invention.

Data#0 RB index may be inferred (or derived) from SA#0 RB index, and Data#k RB index may be inferred (or derived) from SA#k RB index.

In a case in which a SA transmission granularity is fixed to N_sa=2 RB and a data transmission granularity is fixed to N_data=4 RB (or set by the eNB) as illustrated in FIG. 58, SA RB index×2=Data RB index. Or, (SA RB index×2)−1=Data RB index.

Here, SA/Data RB index may be a start RB index, a center RB index, or an end RB index of the SA and data transmission granularity.

In this manner, fixing the bandwidth (BW) (i.e., a transmission granularity in frequency domain) of the resource allocation granularity of SA and data is a simple solution.

However, allowing the number of RBs as a resource allocation granularity of SA and data to be changeable may be helpful to the effective use of resource.

For example, a SA RB size and data RB size may be informed to the D2D UE through system information (e.g., SIB, etc.) or RRC signaling or through PD2DSCH (or PSBCH), or the like, so as to be configured to be varied semi-statically.

Such a method includes a method for fixing an SA transmission granularity (RB number, for example, 2RB or 4RB) and varying a data transmission granularity (RB number) to 1RB to 100RB and a method for varying both the SA and data transmission granularities.

First, the case of fixing the SA transmission granularity and varying the data transmission granularity will be described.

When a transmission granularity (or allocation granularity) of one SA is set to 2RB and a transmission granularity (or allocation granularity) of data is changed to 2, 4, 6, and 8 RB so as to be set, a data RB index may be induced (or derived) from an SA RB index by a combination of SA and data transmission granularities.

If SA transmission granularity=2RB and Data transmission granularity=4RB are signaled, set, or previously defined, Data RB index=2×SA RB index (or, Data RB index=(SA RB index×2)−1), as illustrated in FIG. 58.

If SA transmission granularity=2 RB and Data transmission granularity=6 RB are signaled, set, or previously defined, Data RB index=3×SA RB index (or, Data RB index=(SA RB index×3)−2)

If SA transmission granularity=2 RB and Data transmission granularity=8 RB are signaled, set, or previously defined, Data RB index=4×SA RB index (or, Data RB index=(SA RB index×4)−3)

If SA transmission granularity=3 RB and Data transmission granularity=3 RB are signaled, set, or previously defined, Data RB index=1×SA RB index If SA transmission granularity=3 RB and Data transmission granularity=6RB are signaled, set, or previously defined, Data RB index=2×SA RB index (or, Data RB index=(SA RB index×2)−1)

That is, a multiple relationship between the SA RB index (i.e., PSCCH RB index) and the data RB index (i.e., PSSCH RB index) may be determined according to a multiple relationship between the SA transmission granularity and the data transmission granularity.

For example, when the data transmission granularity is divided by the SA transmission granularity and a share thereof is N_map, data RB index may be induced (or derived) by multiplying N_map to the SA RB index (or by multiplying N_map and subtracting N_map−1).

In order to simplify the implementation, a transmission granularity or allocation granularity of SA and data may be limited to be defined or set by a UE so as to be in an integer multiple relation to each other. For example, it may be defined or set in the UE such that when SA transmission granularity=2 RB, only a transmission granularity (e.g., 2, 4, 6, 8) of multiples of 2 or a data transmission granularity (2, 4, 8, 16, . . . ) of involution (power) of 2 (i.e., 2^x) is used as a data transmission granularity.

Such a relationship may be previously defined or set or set through higher layer signaling (e.g., system information or RRC/MAC signaling, etc.) or may be determined by an equation or calculation of a predetermined function. That is, for example, N_map may always become an integer. Such a rule may also be used for the purpose of checking an error during signaling or setting process.

In this manner, after an index of data RB is obtained, when the N_map value is multiplied to the SA RB index, a data RB index may be inferred (derived).

Here, various values such as a start RB index of SA and data, a center RB index, an end RB index, and the like, may be used as a reference RB index.

Also, in a case in which a resource gap (e.g., a reserved RB, guard RB, . . . ) is introduced in a process of allocating SA and/or data resource due to matters to be additionally considered like in-band emission, SA or data RB index should be induced in consideration of an RB used in the resource gap.

When such a resource gap is used, the resource gap should be previously defined or set by higher layer signaling (e.g., system information or RRC/MAC signaling, etc.) That is, when a resource gap is set by the eNB, the resource gap information may also be transmitted together with the SA and data transmission granularity information in step S5701 of FIG. 57.

FIG. 59 illustrates a method for indicating resource for D2D data according to an embodiment of the present invention.

For example, when 1RB resource gap (reserved gap) is used, a data RB index should be calculated on the assumption that a reserved gap is set between every data and/or SA transmission granularities. In FIG. 59, a case in which two 1RB resource gaps (reserved gaps) or 2RB resource gap (reserved gap) are/is set is illustrated.

If SA transmission granularity=2 RB and Data transmission granularity=4 RB is signaled, set or previously defined, Data RB index (i)=2 SA RB index (i)+i×resource RB gap (e.g., 1 RB), i=1, 2, 3, . . . .

Also, such a resource gap may be set only between transmission resources among SA transmission resource and data transmission resource. This will be described in detail with reference to FIG. 60.

FIG. 60 is a view illustrating a method for indicating resource for D2D data according to an embodiment of the present invention.

In FIG. 60, a case in which two 1RB resource gaps (reserved gaps) or 2RB resource gap (reserved gap) is set only between SA transmission resources is illustrated.

As illustrated in FIG. 60, since a resource gap is set only between SA transmission resources, SA#k RB index and Data#k RB index may be adjusted to be equal. In this case, data RB indices such as Data RB index=1× SA RB index, or Data RB index=1×SA RB index+i×resource RB gap (e.g., 1 RB), i=1, 2, 3, . . . may be derived.

In order to induce the data RB index from an SA RB index according to the SA RB allocation method (including resource gap), various rules may be set. Thus, although not described in this disclosure, various methods for deriving data resource allocation information (position) from SA resource allocation information (position) on the basis of SA and data transmission granularity may be interpreted to include technical features of the present invention.

In another method, a case in which SA or data of different transmission granularities coexist in the same subframe may be considered. A plurality of transmission granularities may be set and an allocation area may be divided to induce a data RB index from a SA RB index.

For example, allocation positions of SA of a 2R transmission granularity and a 3RB transmission granularity are differentiated and a boundary thereof is set and reflected in calculation. In this case, a method (i.e., formula) for deriving a data transmission resource position from an SA transmission resource position belonging to a frequency domain in which a 2RB transmission granularity is set and a method (i.e., formula) for deriving a data transmission resource position from an SA transmission resource position belonging to a frequency domain in which a 3RB transmission granularity is set may be independently determined.

Resource Assignment (RA) for D2D SA and Data

A resource allocation (RA) field for SA and/or data of D2D grant may be classified into two types. That is, an RA field may be classified into an RA part 1 and RA part 2 and each part may carry information such as in Table 11 below.

Table 11 illustrates an RA field of D2D grant.

TABLE 11

|  | RA part 1 (First resource assignment field) | RA part 2 (Second resource assignment field) |
| --- | --- | --- |
| Embodiment 1 | Time-frequency resource allocation information of the first transmission of SA T transmission (e.g. repetition, retransmission) can be derived from RA1) | Time-frequency resource allocation information of the first transmission of Data Then, that of the other transmission (e.g. repetition, retransmission) can be derived from RA2) |
| Embodiment 2 | Time-frequency RA information of the first transmission of SA and/or Data | Information for the other transmission (e.g. repetition, retransmission), except for the first transmission |
| Embodiment 3 | Resource allocation information of the all types of transmission of SA and/or Data | The transmission granularity size/granularity of SA and/or Data |

Referring to Table 11, RA part 1 and 2 of embodiment 2 and RA part 1 of embodiment 3 may include only any one time-frequency resource allocation information among SA and data. In this case, as described above, resource allocation information not included in D2D grant may be derived from resource allocation information included in D2D grant on the basis of transmission granularity of SA and/or data.

Indication of SA Time and Frequency Resource Using PUSCH Hopping Formula

When a potential SA transmission resource is defined as "TxOP", TxOP is determined with a previously determined period of periodical pattern. That is, TxOP refers to time-domain resource of SA repeatedly transmitted in an SA resource pool.

For example, when a case in which one SA cycle includes 4 times of TxOP subframes is assumed, TxOP may be determined by four subframes present in subframe index of multiple of 4 from a specific subframe. That is, subframes 0, 4, 8, 12 may be determined as SA TxOP subframes.

However, the SA TxOP subframe may also be determined in an aperiodic pattern. SA may be transmitted or not in the TxOP subframe.

However, such signaling may not be signaled due to a signaling overhead problem. In this case, the reception UE should decode SA by performing blind searching in every known TxOP subframes. That is, the reception UE should perform blind decoding without accurately knowing in which TxOP SA has been transmitted.

In this situation, it is required to determine a position of a frequency domain.

In the case of mode 1, the eNB provides frequency-domain resource allocation information of SA through D2D grant.

Here, the eNB may directly provide the frequency-domain resource allocation information of SA to the reception UE in the D2D grant, or may provide only data frequency-domain resource allocation information and the UE may derive a frequency-domain resource position of SA from the data frequency-domain resource allocation information.

In the case of mode 2, the UE may select SA frequency resource according to a previously determined rule and transmit the same.

As described above, in the case of mode 1, since the SA resource should be informed in the D2D grant, SA RA information may be included in the D2D grant DCI format. However, in the SA cycle, SA may be transmitted a plurality of times, and thus, it is required to inform also a time domain position (subframe index0 as well as a position (RB index) of the frequency domain. Thus, a method for inducing a transmission position on the basis of a first transmission of a cycle in informing about a time and frequency domain for SA transmission in the D2D grant is required.

In a method for supporting it, LTE/LTE-A PUSCH hopping formula (PUSCH frequency hopping type 1 or 2) may be utilized. An existing PUSCH hopping formula is defined for each subframe, but such a rule is applied only to a TxOP subframe set by the eNB.

That is, frequency and/or time hopping may be applied between resource for nth transmission of SA and resource for (n+1)th transmission of SA. For example, frequency and/or time hopping may be applied between resource for first transmission of SA and second transmission of SA.

In another example, on the assumption that SA cycle includes four times of TxOP subframes, when 0, 4, 8, and 12 subframes are TxOP subframes, the PUSCH hopping rule applied to the existing 0, 1, 2, and 3 subframes (i.e., each subframe) to the 0, 4, 8, and 12 subframes.

This method is advantageous in that, when the PUSCH hopping formula is shared, the PUSCH hopping method may be applied with a subframe index or a subframe index defined for D2D (e.g., SA resource pool subframe) and/or specific identifier (ID of D2D TX UE and/or D2D RX UE) using a parameter. Also, this method has advantageously characteristics in that SA hopping patterns (time-frequency) are orthogonal to each other). Of course, the eNB may repeatedly set it on purpose.

Or, a frequency hopping bandwidth may be separately set (i.e., limitedly used) according to attributes (tracking area (TA), cell size, Tx power, service type, etc.) of a TX UE or RX UE.

For example, a UE having an attribute 1 may be limited to perform hopping only in a lower half band and a UE having an attribute 2 may be limited to perform hopping only in an upper half band.

When the Rx UE knows such attributes, it may perform monitoring only in a limited bandwidth, advantageously reducing Rx processing or power. The Tx UE may receive a portion or the entirety of parameters related to the attribute through higher layer signaling (e.g., RRC signaling or SIB, etc.) in advance, and may use the same in determining a time-frequency transmission resource. This is because a transmission resource is varied according to the attributes.

Also, attributes of the TX UE and parameters such as the RX UE and PUSCH hopping, mirroring, re-index, and the like, may be associated. For example, hopping and mirroring may be classified according to a UE attribute, service attribute, timing advance, power level, and the like, so as to be set. This makes reception of a UE more simplified.

Also, the number of re-transmissions of SA and/or repeated transmissions may be associated with the parameter of the PUSCH hopping formula. That is, a hopping scheme may be determined according to the number of retransmissions and/or repeated transmissions of SA. When the number of retransmissions is, for example, 2 and 4, some parameters of the PUSCH hopping formula may be set to be different.

Or, bandwidth itself may be separated orthogonally according to the number of retransmissions and/or repeated transmissions of SA. Or, the bandwidth may be separated on a TxOP subframe of time domain according to the number of retransmissions and/or repeated transmissions of SA.

Or, for example, when the number of retransmissions and/or repeated transmissions of SA is 2, a start position may be a different TxOP subframe (e.g., second/third TxOP subframe), rather than a first TxOP within a cycle. This is to allocate SA resource to each TxOP subframe as evenly as possible.

The transmission resource pattern determined in one cycle may be varied, rather than being fixed. That is, in a follow-up cycle, the transmission resource pattern may be changed to a previously determined pattern. This may be regarded as hopping between patterns. In other words, since SA may be repeatedly transmitted in one cycle, different hopping schemes may be determined for different SAs, resultantly.

For example, when indices regarding the entire transmission resource patterns is defined, hopping is applied between transmission resource pattern indices. This may be changed according to a cycle index or the patterns may be changed by interworking with a subframe index.

The rule applied to SA may also be used as is in determining a transmission resource pattern of data. That is, a transmission pattern of SA may be known from an initial transmission value of SA, and after decoding SA, initial transmission position of data may be recognized. As for other patterns regarding re-transmission and/or repeated transmission, a time frequency position may be recognized using a PUSCH hopping formula.

The PUSCH hopping formula may be limited to a position of a frequency domain of SA, and a time domain pattern may be determined by a separate signal (RPT). The time domain pattern (RPT) may be used to inform about a cycle interval and a TxOP and substantial transmission subframe in a cycle. In this case, the proposed method using the PUSCH hopping formula may be limited to the purpose of informing about a frequency domain.

In order to determine the aforementioned SA TxOP subframe and RB position, LTE PUSCH hopping formula may be used.

The proposed method may also be applied to D2D data transmission as is.

Meanwhile, in the case of repeated transmission of SA or data, repeated resource domain may be regarded as one index (new indexing) and the forgoing rule may be applied.

Or, the method may be applied as is on the basis of a subframe index, regardless of repletion of SA or data.

As discussed above, the D2D grant is a control signal transferring control information (SA or PUCCH) for the eNB to transmit direct communication data to a direct communication link (D2D link or sidelink) to a UE (in particular, TX UE) performing D2D (direct) communication.

The D2D grant has contents and an operation scheme similar to a DCI format used in the existing (E-)PDCCH.

That is, the D2D grant may be expressed as DCI format 5, and may be transmitted from the eNB to the D2D Tx UE through the (E-) PDCCH.

Here, it is assumed that a size of the DCI format (e.g., DCI format 5) transmitting the D2D grant is the same as a size of a DCI format used in the existing (E-)PDCCH.

However, the D2D grant should include both control information regarding a channel (PSCCH) transferring control information used in a D2D link and a channel (PSSCH) transferring data and transmit the same to every D2D UE.

As a result, since an amount of information to be transferred by the D2D grant is large, the D2D grant cannot use an existing DCI format container.

Thus, the present disclosure provides a method for transmitting every control information to be transferred through D2D grant, while maintaining a size (e.g., size of DCI format 0) of the existing DCI format container.

First, when uplink resource allocation (RA) type 0) (RIV) is used, the RIV requires 13 bits in a 20 MHz, 100RB system.

Or, in the case of using uplink resource allocation type 1, i.e., a non-contiguous resource allocation method, four RB indices may be selected from N_rb in a combinatorial manner, and required bits are $$\left\lceil \log_2\left(\binom{\lceil N_{RB}^{UL}/P+1\rceil}{4}\right)\right\rceil.$$

Details of the uplink resource allocation method may be referred to the aforementioned contents.

The uplink resource allocation type 1 (non-contiguous) method is a method of indicating two resource domains by four RB indices.

Here, the two resource domains are all used as uplink PUSCH resource.

An advantage of the uplink resource allocation type 1 method is that the number of required bits is not significantly increased, although two resource domains are simultaneously indicated.

Thus, when the uplink resource allocation type 1 method is used in the D2D grant resource allocation scheme, it may be used for resource allocation, while maintaining a corresponding size without increasing a size of the existing DCI format.

D2D grant is different from a method of scheduling a PUSCH in fact.

That is, unlike the PDCCH for scheduling existing uplink (UE to eNB) data transmission, the D2D grant is used for the purpose of scheduling transmission of SA and D2D data between D2D UEs (D2D Tx UE and D2D Rx UE).

Although the PUSCH scheduling type PDCCH and the D2D grant are different as described above, they are common in that problems thereof to be solved are basically similar.

Also, the formula (Equation 3) used in the uplink resource allocation type 1 described above may be used in a similar manner even in a method for indicating a CQI subband index.

Here, in the case of using the formula (Equation 3) in the CQI subband index indicating method, a plurality of CQI subbands may be easily indicated through single control information.

That is, Table 12 illustrates an example of utilizing the formula (Equation 3) in the CQI subband index indicating method.

TABLE 12

CQI subband indexing method:
For all UE-selected subband feedback modes the UE shall report the positions of the M selected subbands using a combinatorial index r defined as follows.

$$r = \sum_{i=0}^{M-1} \binom{N-s_i}{M-i}$$

where the set $\{s_i\}_{i=0}^{M-1}$, $(1 \le s_i \le N, s_i < s_{i+1})$ contains the M sorted subband indices and $\binom{x}{y} = \begin{cases} \binom{x}{y} & x \ge y \\ 0 & x < y \end{cases}$ is the extended binomial coefficient, resulting in unique label $$r \in \left\{0, \ldots, \binom{N}{M}-1\right\}.$$

Characteristics of the formula as illustrated in Table 12 may be effectively used in selecting a specific number of samples from a plurality of samples.

That is, using such a principle, it may be used as a method for indicating a position of SA and D2D data transmission resource in D2D grant.

The coupling index r value in Table 12 is included in D2D grant and transmitted to a UE. Thus, the UE may obtain a point indicating a position of SA and D2D data transmission resource using the r value.

Hereinafter, a method for determining a position of transmission resource of SA and D2D data in D2D grant using the CQI subband index indicating method described above with reference to Table 12 will be described in detail.

Hereinafter, it is assumed that M number of resources are selected from N number of resources, for the purposes of description. Here, N and M indicate the number of resources of a D2D resource pool. In detail, it is assumed that N indicates the number of RBs of D2D resource pool or the number of RBG (Resource Block Group) present in a system bandwidth and M is an RB or RGB index selected from N number.

Also, N and M may be interpreted as described above in the SA resource pool or D2D data resource pool.

FIG. 62 illustrates an example of a method for determining a position of SA and D2D data transmission resource proposed in this disclosure.

In particular FIG. 62 illustrates an example in which M=4.

That is, in FIG. 62, a method of interpreting four selected positions (points) s0, s1, s2, and s3 is illustrated.

Here, each point indicates an RB index.

As illustrated in FIG. 62, two (s0, s1) of four points indicate positions of SA transmission resource, and the other remaining two (s2, s3) indicate positions of D2D data transmission resource.

A resource domain of SA is [s0, s1]. That is, the SA resource domain starts from an s0 RB (or RBG) index position to an s1 RB (or RBG) index position.

Similarly, resource domain of D2D data is [s2, s3]. That is, a resource domain of D2D data starts from s2 RB (or RGB) index position to s3 RB (or RBG) index position.

In addition to the forgoing interpretation, various other interpretations may be applied.

That is, two points may be selected from the four points and defined as SA resource domain, and the other remaining two points may be defined as a resource domain of D2D data.

Here, when it is assumed that size order of the point values is s0<s1<s2<s3, resource domains of SA and D2D data may correspond to a pair by twos in order, and two points of each pair may indicate a starting point and an ending point.

Or, conversely, resource positions of SA and D2D data may be reversed (SA resource domain is from s2 to s3 and D2D data resource domain is from s0 to s1), and such a matter may be configured through RRC signaling.

FIG. 63 is a view illustrating another example of a method for determining a position of SA and D2D data transmission resource proposed in this disclosure.

Like FIG. 62, FIG. 63 illustrates a case of M=4 and a method for interpreting four selected points s0, s1, s2, and s3.

That is, unlike FIG. 62, in FIG. 63, a D2D data resource domain is [s0, s3] and an SA resource domain is [s1, s2]. Interpretation is the same as that of FIG. 62.

As Illustrated in FIG. 63, it may be assumed that SA BW (BandWidth) is always included in D2D Data BW.

That is, FIG. 63 shows a method for overcoming a problem that four point information received in the same subframe cannot indicate contiguous RBs, that is, a method for overcoming a problem in which the four point information cannot indicate a form in which SA BW and data BW overlap or are included.

That is, as illustrated in FIG. 63, two points s1 and s2 present within [s0, s3' are used for SA.

Such an interpretation method is an example and may be configured through RRC signaling in advance.

In a modification of FIG. 63, it may be assumed that a starting point (or ending point) of SA and a starting point (or ending point) of D2D data are the same as s0.

In this case, information regarding s1 (or s2) is not required, but is advantageous in that the formula (Equation 30 in the aforementioned UL RA type 1 is utilized as is.

In another embodiment of interpreting four points in FIGS. 62 and 63, a method for utilizing an additional bit in a DCI format may also be used.

In a case in which specific bits are reserved in the existing DCI format (e.g., DCI format 0) and it can be utilized as bits for sending additional information, the corresponding bits may be used for the purpose of informing about a method for interpreting four point values.

That is, in the case of four points, the corresponding bits 1) may be sequentially grouped by two points so as to be used as RA information of SA and D2D data or 2) may be used as R information of SA and D2D data in the form of [s0, s3], [s1, s2].

Also, the corresponding bits may be interpreted in the case in which the order of SA and D2D data are reversed.

Such information may also be indicated through RRC signaling.

FIG. 64 is a view illustrating another example of a method for determining a position of SA and D2D data transmission resource proposed in this disclosure.

In particular, FIG. 64 illustrates an example of M=3.

That is, FIG. 64 illustrates a method for interpreting three selected points s0, s1, and s2, that is, a method for indicating resource domain of SA and D2D data using three point information.

Similarly, each point indicates an RB (or RBG) index.

As illustrated in FIG. 64, it may be interpreted that two of the three points (s0, s1, s2) indicate a start and an end of data BW and the other one point indicates a start position of SA.

Here, SA BW is configured as a fixed value in advance. That is, the SA BW may be configured as a specific B2 W like 1RB, 2RB, and 4RB or may be fixed to a specific value through RRC signaling.

Here, in a case in which there is a domain in which RA (resource allocation) information of SA and D2D data obtained through CQI subband index indicating method overlap each other, it may be interpreted as follows.

In a case in which SA and D2D data are transmitting in different subframes, overlap domain does not occur.

However, when the SA and D2D data are transmitted in the same subframe, overlap domain occurs to cause collision.

In this case, it may be defined such that, providing priority to SA transmission, a resource domain of D2D data is punctured or rate-matched in an overlap domain such that SA can be transmitted.

FIG. 65 is a view illustrating another example of a method for determining a position of SA and D2D data transmission resource proposed in this disclosure.

In particular, FIG. 65 illustrates an example of M=4.

That is, FIG. 65 illustrates a method for interpreting four selected points s0, s1, s2, and s3, that is, a method for indicating resource domain of SA and D2D data using four point information.

Similarly, each point indicates an RB (or RBG) index.

In FIG. 65, as a method for interpreting a position of a resource domain of SA and D2D data regarding four points, four schemes as illustrated in FIGS. 65a to 65d are used, for example.

First, in the first scheme (FIG. 65a), in a case in which [s0, s1] domain is interpreted as a SA transmission resource domain and, in particular, a transmission band of SA is fixed, s0 indicates a starting point of SA BW and s1 does not have any meaning.

In the second scheme (FIG. 65b), in a case in which [s1, s2] domain is interpreted as a SA transmission resource domain and, in particular, a transmission band of SA is fixed, s1 indicates a starting point of SA BW and s2 does not have any meaning.

In the third scheme (FIG. 65c), in a case in which [s2, s3] domain is interpreted as a SA transmission resource domain and, in particular, a transmission band of SA is fixed, s2 indicates a starting point of SA BW and s3 does not have any meaning.

In the fourth scheme (FIG. 65d), in a case in which [s3, (end of system bandwidth)] domain is interpreted as a SA transmission resource domain and, in particular, a transmission band of SA is fixed, s3 indicates a starting point of SA BW and from s3, a fixed bandwidth is provided.

In another embodiment, a method for indicating resource domain of SA and D2D data using 2 point information will be described.

In the case of using 2 point information, a resource indication value (RIV) used in an uplink resource allocation type 0 (UL RA type 0) may be used.

As discussed above, by interpreting two unique values that can be obtained from RIV, as two points, a resource domain (e.g., a starting point) of SA and D2D data may be indicated.

Of course, in the case of using the two point information, the formula used in the uplink resource allocation type 1 (UL RA type 1) may also be used and interpretation methods thereof may be variously defined.

Also, in this case, an interpretation method may be configured through RRC signaling in advance.

Hereinafter, a method for indicating a resource domain of SA and D2D data by utilizing 2 point information extracted from the RIV will be described in detail.

2-Point Indication (RIV)

First, in the case of 2 points, the RIV is used. That is, since two values are extracted from the RIV, the extracted two values are used as (s0, s1).

Second, two points are used as a starting point of SA and D2D data, and BW of SA may e fixed or configured through RRC signaling.

Also, BW of D2D data may be fixed or configured through RRC signaling.

Or, when the D2D data BW is intended to be dynamically changed, a candidate set of the data BW may be created and signaled by RRC in advance.

Thereafter, a specific value (BW) of the candidate set may be selected as D2D grant.

That is, the following methods are possible.

SA start index (s0)+Data BW (|s1−s0|) indication

SA BW is fixed or signaled by RRC (e.g.: 2RB), Data start index is s1

Configuration set of SA BW is possible (it may use an additional bit as described hereinafter): For example, 1, 2, or 4RB may be configured through RRC signaling.

Third, both s0 and s1 are used for the purpose of designating a starting point and an ending point of data BW, and s0 or s1 is used for the purpose of indicating a starting point or ending point of SA BW.

In this case, SA BW may be previously determined or configured through RRC signaling.

Similarly, a BW candidate set may be configured and informed in advance through RRC signaling and a specific value (BW) of the corresponding BW candidate set is indicated by D2D grant, whereby BW may be dynamically changed.

2-Point Indication (UL RA Type 1, Non-Contiguous)

First, 2 points may be used as a starting point of SA and data, BW of SA may be fixed or configured in advance through RRC signaling, and also, data BW may be fixed or configured through RRC signaling.

Or, when the data BW is intended to be dynamically changed, a candidate set of the data BW is created and signaled in advance by RRC, and a specific value (BW) of the corresponding candidate set is selected by D2D grant.

That is, the following methods are possible.

SA start RB indication (s0)+BW are configured to be fixed through RRC signaling (e.g.: 2RB)

BW selection by D2D grant (or RRC) among data start RB indication (s1)+RRC configured BW sets Use of 1 bit additional field (when additional bit is present):

1) BW indication within a given set by RRC 2) example: Set 1={2, RBG}, Set 2={2, 2*RBG}, Set 3={2, 3*RBG}, Set 4={2, 4*RBG}

Second, both s0 and s1 are used for the purpose of designating a starting point and an ending point of data BW, and s0 or s1 is used for the purpose of indicating a starting point or ending point of SA BW.

In this case, SA BW may be previously determined or configured through RRC signaling.

Of course, a BW candidate set may be configured and informed in advance through RRC signaling and a specific value (BW) of the corresponding BW candidate set is indicated through D2D grant, whereby BW may be dynamically changed.

Another Embodiment

In another embodiment, a method for allocating D2D grant information, while maintaining bits required for RA will be described.

That is, it is assumed that a size of a D2D grant DCI format is determined according to a length of DCI format 0.

In this case, in an existing single cluster transmission, required bits of UL RA is $\log 2\_(N(N+1)/2)$ bits, bits are calculated by separating the required bits of UL RA by $\log 2\_(N/2)+\log 2\_(N+1)$, and corresponding D2D grant information is allocated.

Here, $\log 2\_(N/2)+\log 2\_(N+1)$ is an example and may be generalized to be configured in the form of $\log 2\_X+\log 2\_Y$.

Here, $\log 2\_(N/2)$ or $\log 2\_X$ may be expressed as a first part, and $\log 2\_(N+1)$ or $\log 2\_Y$ may be expressed as a second part.

In actuality, each bit number should be an integer, and thus, it is $\text{ceiling}(\log 2(N(N+1)/2))$ corresponding to the required bits of UL RA of DCI format 0.

Thus, in the above, the UL RA bits may be separated into $\text{ceiling}(\log 2(N/2))+\text{ceiling}(\log 2(N+1))$ bits.

Here, $\text{ceiling}(X)$ refers to a function generating a minimum integer greater than or equal to X.

That is, due to the ceiling function, $\text{ceiling}(\log 2(N/2))+\text{ceiling}(\log 2(N+1))$ may be equal to or greater by 1 than $\text{ceiling}(\log 2(N(N+1)/2))$.

In this situation, in order to maintain a length of the D2D grant DCI format to be equal to a length of the DCI format 0, remaining bits excluding the bits required for RA are set to be smaller by x bit than the DCI format 0 always in the D2D grant (x is an integer greater than or equal to 1), and zero may be padded to the D2D grant DCI format such that lengths of the two DCI formats are equal.

Hereinafter, a method for designing such that a size of the D2D grant DCI format corresponds to a size of the DCI format 0 by adding up the number of bits obtained by separating the bits required for UL RA and the other remaining bit field will be described.

For example, it is assumed that a PRB pair of SA is determined by one of 1RB and 2RB or configured in advance through RRC signaling.

In a case in which the PRB pair of SA is 2RB, the $\log 2(N/2)$ portion of the separated formula described above may be used for the purpose of designating a location of SA and the $\log 2(N+1)$ portion may be used as RA of data.

Table 13 to Table 15 below illustrate calculation of required bits of each of the separated parts (first part and second part) according to a system BW.

TABLE 13

| BW (MHz) | Required bit (P1) | log2_{(N/2)} | RB ≒ |
|---|---|---|---|
| 20 | 6 | 5.672425342 | 100 |
| 10 | 5 | 4.700439718 | 50 |
| 5 | 4 | 3.754887502 | 25 |
| 3 | 3 | 2.906890596 | 13 |
| 1.4 | 2 | 2 | 6 |

TABLE 14

| BW (MHz) | Required bit (P2) | log2_{(N + 1)} | RB ≒ |
|---|---|---|---|
| 20 | 7 | 6.658211483 | 100 |
| 10 | 6 | 5.672425342 | 50 |
| 5 | 5 | 4.700439718 | 25 |
| 3 | 4 | 3.807354922 | 13 |
| 1.4 | 3 | 2.807354922 | 6 |

TABLE 15

| BW (MHz) | Required bit (P) | log2_{N * (N + 1)/2} | RB ≒ | (P1 + P2) |
|---|---|---|---|---|
| 20 | 13 | 12.30206767 | 100 | 13 |
| 10 | 11 | 10.31628153 | 50 | 11 |
| 5 | 9 | 8.344295908 | 25 | 9 |
| 3 | 7 | 6.50779464 | 13 | 7 |
| 1.4 | 5 | 4.392317423 | 6 | 5 |

As illustrated in Table 13 to Table 15, when a case in which two parts are separated (first part and second part) and a case in which the parts are not separated are compared, it can be seen that the number of required bits of RA are equal.

That is, on the assumption of 20 MHz system, it can be seen that P1=6, P2=8, i.e., P1+P2=13 bits, are required and P also requires 13 bits.

Here, P refers to required bits.

Thus, in the method of indicating a resource domain of SA and/or D2D data by separating into first part and second part, one of the N/2 positions may be indicate using the P1 bit and one of (N+1) number of positions may be indicated using the P2 bit.

Here, since the separated indication method (P1, P2) and the integrated indication method (P) show the same number of required bits, a length of the RA field of the DCI format is not required to be adjusted.

In this manner, a resource domain of data, i.e., RB position, may be indicated using the P1 bit, and data BW may be separately designated using higher layer signaling.

Here, in case of considering designation of the N/2 position, it can be seen that an indication granularity in 2RB granularity is applied.

Also, a start position of transmission resource domain of SA may be indicated using the P2 bit, and similarly, SA BW may be separately designated in advance through higher layer signaling.

Or, the SA BW may be fixed to a specific value (BW).

That is, the method of indicating a start position (or specific position) of the transmission resource domain of data and SA using P1 and P2 in Table 13 and Table 15 has been described.

That is, the method may be generalized as follows.

First, log 2_{N(N+1)/2}=log 2_{N/Y1}+log 2_{(N+1)/Y2}+log 2_{Y3} is expressed and Y1*Y2/Y3=2 is assumed.

Here, P1'=log 2_{N/Y1} bit may designate a starting point of SA, based on RB of Y1 as indication granularity, and P2'=log 2_{(N+1)/Y2} bit may designate a starting point of D2D data based on RB of Y2 as indication granularity.

Here, the remaining P3'=log 2_{Y3} may be used for any other purpose.

For example, the remaining P3' bit may be used for the purpose of designating bandwidth (BW) of D2D data.

Of course, as defined above, since the number of entire RBs is N, N+1) of P2' may be replaced with N.

In order to secure 1 bit in P3, P1' and P2' should be changed as follows.

For example, in case of 20 MHz system, it may be changed to obtain P1'+P2'=12 bit, P3=1 bit, P=13 bit to secure an additional bit (P3). That is, it may be expressed by Equation 5 to Equation 7 and Table 16.

$$P3'=1=\log 2\_\{2\}, Y3=2 \quad [\text{Equation 5}]$$

$$P1'=P1)=\log 2\_\{N/2\}, Y1=2, 2RB \text{ granularity} \quad [\text{Equation 6}]$$

$$P2'=\log 2\_\{N/2\}, Y2=2, 2RB \text{ granularity} \quad [\text{Equation 7}]$$

TABLE 16

| BW (MHz) | Required bit (P2') | log2_{(N + 1)/Y2}, Y2 = 2 | RB ≒ | (P1 + P2') |
|---|---|---|---|---|
| 20 | 6 | 5.658211483 | 100 | 12 |
| 10 | 5 | 4.672425342 | 50 | 10 |
| 5 | 4 | 3.700439718 | 25 | 8 |
| 3 | 3 | 2.807354922 | 13 | 6 |
| 1.4 | 2 | 1.807354922 | 6 | 4 |

That is, in P1 or P2, P3' bit (e.g.: 1 bit or 2 bits) may be borrowed to be used for the purpose of indicating BW.

In a case in which P1 bit borrows P3' bit, (P1-P3') bit may be substantially used for the purpose of indicating a position of a data transmission resource domain (RB).

In a case in which P2 bit borrows P3' bit (e.g.: 1 bit or 2 bits) to indicate BW, (P2-P3') bit may be substantially used for the purpose of indicating a position of a SA transmission resource domain.

Or, P3' bit may be borrowed in the P1 bit and P2 bit, and in this case, the P3' bit may be used for any other purpose.

In another method, the entirety of P3' bit may be used for the purpose of designating data BW in real time (D2D grant).

When it is assumed that SA BW is fixed (when it is assumed that SA BW is not required to be dynamically changed), P3' bit may be used only for the purpose of indicating data BW.

In this manner, in a case in which the P3' bit is used only for the purpose of indicating data BW, it may be indicate data BWs of various sizes.

Also, in case of P3'=2 (bit), since 2 bits can be used to designate BW, four types of BW may be indicated by D2D grant.

For example, several sets having different BW values such as set1={B1, B2, B3, B4} are defined.

Here, the plurality of sets having different BW values are informed in advance through RRC signaling, and D2D grant may be used for the purpose of indicating one of four BW values of the corresponding set.

In another method, a method of differently designating D2D data BW according to a subframe in which D2D grant is transmitted or a subframe position may be considered.

In this manner, when the method of differently designating D2D data BW according to a subframe in which D2D grant is transmitted, it is not required to use an additional bit such as P3' to designate a D2D data BW.

Of course, it is also possible to designate D2D data BW using both the method of using a subframe position in which the D2D grant is transmitted and the method of using an additional bit (P3' bit).

That is, a combination of the position of the DWD grant SF and the value indicated by P3' may be used for the purpose of indicating data BW and/or SA BW.

Here, the expression of "A and/or B" may be interpreted as having the same concept of at least one of A or B, and includes all of the cases of A, B, or A and B.

Also, P3' may also be borrowed in any other field of a DCI format, as well as in the RA field.

The resource block group (RBG) used in this disclosure may refer to an RBG defined in 3GPP standard document, but a separate RBG for D2D may be defined in the aspect of D2D resource allocation.

Thus, in this case, the methods proposed in this disclosure on the basis of the separate RBG for D2D may be applied.

Here, it may be assumed that the RBG is simply interpreted as a basic unit of resource allocation so as to be used in addition to the purpose mentioned in the 3GPP standard document.

Also, a resource allocation granularity for SA and a resource allocation granularity for data may be configured to be different, and in this case, an interpretation method regarding the resource allocation of SA and data may differ.

Also, the resource allocation granularity for SA and the resource allocation granularity for data may be configured to be different according to BW.

Also, when SA BW is configured through RRC signaling or fixed, it may be designated as one value or specific value (e.g., 2RB).

However, the fixed SA BW value may be varied according to a system BW.

For example, in a case in which a system bandwidth is small, a configured or fixed SA BW may be limited to a smaller value (e.g., 1RB).

This method may also be applied to BW of D2D data. That is, when BW of D2D data is configured or fixed, a BW value of D2D data may be set to be different according to a size of a system BW.

When a size of the system BW is large, a D2D data BW may be configured or fixed to a greater value.

In particular, the method of determining a SA BW or D2D data BW according to a system BW may include even a case in which an interpretation is different according to a system BW although the same signal information is transferred in terms of signaling.

That is, although the same signaling mechanism is used, an interpretation thereof may be different according to a situation such as a system BW.

In another embodiment, D2D grant defines a (D2D) DCI format always including a zero padding bit.

For example, regarding the same DL/UL BW with respect to FDD, zero padding bit is always present.

In the case of FDD, a UL BW can be paired to be always smaller than or equal to a DL BW, the zero padding bit is always present even in the case of different BW.

In the case of TDD, since all of DAI 2 bits are added to the DCI format 1/0A, the zero padding bit is a required bit in TDD.

In other cases, the zero padding bit may be used for any other purposes.

For example, the zero padding bit may be used for the purpose of indicating a starting point order of SA and data, indicating an inclusion relationship of resource domain of SA and data, indicating the number of cases in which resource domains of SA and data overlap, indicating designation (e.g., a starting point and an ending point) of points at which resource domains of SA and data are matched, indicating a BW indication granularity, and the like.

In addition, in a state in which an RB size of SA and data is fixed or configured through RRC signaling in advance, a starting point of SA and data may be applied by 1RB granularity.

That is, on the assumption of the N number of entire RBs, when two points (starting points of SA and data) are applied by 1RB granularity using a combinatorial index, the total bits are $$\left\lceil \log_2 \binom{N}{2} \right\rceil = \left\lceil \log_2 \left( \frac{N!}{2!(N-2)!} \right) \right\rceil$$
$$= \left\lceil \log_2 \left( \frac{N(N-1)}{2} \right) \right\rceil < \left\lceil \log_2 \left( \frac{N(N+1)}{2} \right) \right\rceil.$$

Here, there is a problem in that the combinatorial index cannot indicate the same two points in terms of characteristics.

In this case, a modification of an existing interpretation method may be applied such that when a second point is (implicitly) applied to a final RB index, a first point is interpreted as a common starting point for both SA and data, or the like.

Table 17 illustrates an example of a D2D DCI format proposed in this disclosure. That is, Table 17 illustrates an example of an SA field indicating a starting point of a frequency having various indication granularities.

TABLE 17

| Usage | DCI format 0 | | D2D grant |
|---|---|---|---|
| 0/1A | 1 | | 0 |
| FH | 1 | FH | 1 |
| MCS/RV | 5 | MCS/RV | 5 |
| NDI | 1 | | 0 |
| TPC | 2 | TPC | 2 |
| DM RS | 3 | | 0 |
| CS | | | |
| CQI | 1 | | 0 |
| ZP | 1 | ZP | 1 |
| RA | 13 (20 MHz) | RA | 13 |
| (TDD) | | TD.pattern1 (TDD) | 6 |
| | 28 | | 28 |

Table 18 illustrates an example of a structure in which lengths of RA fields included in the DCI format 0 are varied according to bandwidth (BW).

TABLE 18

| BW (MHz) | Required bit (P) | log2_{N * (N + 1)/2} | RB number |
|---|---|---|---|
| 20 | 13 | 12.30206767 | 100 |
| 15 | 12 | 11.4767462 | 75 |
| 10 | 11 | 10.31628153 | 50 |
| 5 | 9 | 8.344295908 | 25 |
| 3 | 7 | 6.50779464 | 13 |
| 1.4 | 5 | 4.392317423 | 6 |

Meanwhile, Table 19 illustrates an example of a case in which when fields of the D2D grant are configured as illustrated in Table 19, RA of data is assumed to utilize an RA field of the existing DCI format 0 but a separate field is reserved for SA.

TABLE 19

|  | DCI format 0 |  | D2D grant |
|---|---|---|---|
| 0/1A | 1 |  |  |
| FH | 1 | FH | 1 |
| MCS/RV | 5 |  |  |
| NDI | 1 |  |  |
| TPC | 2 | TPC | 2 |
| DM RS CS | 3 |  |  |
| CQI | 1 |  |  |
| ZP | 1 | ZP | 1 |
| RA | 13 | Data RA | 13 |
|  |  | T-RPT | 6 |
|  |  | SA RA | 6 |
|  | 28 |  | 29 |

In a case in which 6 bits are separately reserved with respect to a system BW as 20 MHz, since bandwidth is reduced, required bits should e reduced together.

In this case, however, since the DCI format size is varied, a coding rate is also changed accordingly, causing an additional problem in that the reduction should be recognized by a UE.

In order to solve the problem, an SA field may be reserved with maximum bits according to a maximum bandwidth (e.g., 20 MHz) and a length of the SA field may be maintained even though the bandwidth is reduced.

Table 20 below illustrates SA bits substantially required according to system bandwidths.

TABLE 20

| BW (MHz) | SA [bit] | log2_{N/2} | RB number |
|---|---|---|---|
| 20 | 6 | 5.64385619 | 100 |
| 15 | 6 | 5.22881869 | 75 |
| 10 | 5 | 4.64385619 | 50 |
| 5 | 4 | 3.64385619 | 25 |
| 3 | 3 | 2.700439718 | 13 |
| 1.4 | 2 | 1.584962501 | 6 |

In Table 20, surplus bits which are not required to be used as a bandwidth is reduced are increased, compared with a reserved fixed bit.

Table 21 below illustrates calculation of surplus bits according to Table 20.

TABLE 21

| Surplus bit | BW (MHz) | SA [bit] | log2_{N/2} | RB number |
|---|---|---|---|---|
| 0 | 20 | 6 | 5.64385619 | 100 |
| 0 | 15 | 6 | 5.22881869 | 75 |
| 1 | 10 | 5 | 4.64385619 | 50 |
| 2 | 5 | 4 | 3.64385619 | 25 |
| 3 | 3 | 3 | 2.700439718 | 13 |
| 4 | 1.4 | 2 | 1.584962501 | 6 |

As illustrated in Table 21, surplus bits may be filled with specific bits and used as a virtual CRC to lower a substantial coding rate to enhance performance.

However, the surplus bits may also be used for the purpose of complementing an RB index indication granularity (i.e., a problem in which an RB index indication granularity 2RB is greater than that of the existing 1RB) of SA RA.

For example, when a system bandwidth is 10 MHz or lower, a method of securing 1 bit from each of 1, 2, 3, and 4 bits used for surplus bits and indicating an RB position of SA RA in 1RB granularity may be applied.

In particular, as the system bandwidth is reduced, the 2RB SA RA indication method is severely restricted in an indication of resource allocation position, compared with 1RB, and thus, preferably, a different RB indication granularity is used according to a system bandwidth.

That is, a reference of a system bandwidth may be 10 MHz or lower, 5 MHz or lower, 3 MHz or lower, or 1.4 MHz or lower.

Or, any other RB granularity may be defined according to the number of substantially used RBs, rather than using the system bandwidth as a reference.

For example, when the number of RBs is 65 RBs or smaller, an RB indication in 1RB granularity may be applied.

Or, when the number of RBs is SORB or smaller, 25RB or smaller, 13RB or smaller, and 6RB or smaller, an RB indication granularity of 1RB granularity may be defined.

Table 22 illustrates calculation of bits required for RB indication in 1RB granularity. A surplus bit may be induced by comparing Table 22 and Table 23.

TABLE 22

| BW (MHz) | SA [bit] | log2_{N} | RB number |
|---|---|---|---|
| 20 | 7 | 6.64385619 | 100 |
| 15 | 7 | 6.22881869 | 75 |
| 10 | 6 | 5.64385619 | 50 |
| 5 | 5 | 4.64385619 | 25 |
| 3 | 4 | 3.700439718 | 13 |
| 1.4 | 3 | 2.584962501 | 6 |

TABLE 23

| Insufficient bit | BW (MHz) | SA [bit] | log2_{N/2} | RB number |
|---|---|---|---|---|
| 1 | 20 | 6 | 5.64385619 | 100 |
| 1 | 15 | 6 | 5.22881869 | 75 |
| 1 | 10 | 5 | 4.64385619 | 50 |
| 1 | 5 | 4 | 3.64385619 | 25 |
| 1 | 3 | 3 | 2.700439718 | 13 |
| 1 | 1.4 | 2 | 1.584962501 | 6 |

In particular, by comparing Table 22 and Table 23, how many bits are additionally required to perform RB indication in 1RB granularity may be recognized.

Also, when the system bandwidth is narrow, that is, in a case in which the RA indication in 1RB granularity descried above is applied to only a narrow system bandwidth, the number of bits substantially used in SA RA are calculated as illustrated in Table 24.

Table 24 is based on an assumption that SA RA indication in 1RB granularity is applied only to a system bandwidth of 10 MHz or lower.

However, this reference may be changed according to system bandwidth or the number of total RBs.

In addition, the method for applying SA RA indication in 1RB granularity may be applied only to a system whose system bandwidth is 1.4 MHz (or 6RB).

That is, Table 24 illustrates calculation of the number of bits required for SA RA again.

TABLE 24

| Residual bit | BW (MHz) | SA [bit] | log2_{N/2} | RB number |
|---|---|---|---|---|
| 0 | 20 | 6 | 5.64385619 | 100 |
| 0 | 15 | 6 | 5.22881869 | 75 |
| 0 | 10 | 6 | 4.64385619 | 50 |
| 1 | 5 | 5 | 3.64385619 | 25 |
| 2 | 3 | 4 | 2.700439718 | 13 |
| 3 | 1.4 | 3 | 1.584962501 | 6 |

It can be seen that residual (or surplus) bits (1 bit, 2 bits, and 3 bits are generated in 5 MHz, 3 MHz, and 1.4 MHz, respectively).

As mentioned above, the surplus or residual bits may be filled with a specific bit sequence or a known sequence so as to be used to lower a coding rate and increase decoding performance in a UE.

Or, the residual bit may be utilized to indicate a bandwidth of SA, as well as a starting point of SA, in a vary small system bandwidth such as 1.4 MHz.

Or, the surplus bit may also be utilized for the purpose of changing an RB index set that can be indicated by SA RA, instead of adjusting an indication granularity regarding SA RA.

That is, in a system of a narrow bandwidth, an even-numbered RB index set or an odd-numbered RB index set may be indicated by utilizing the surplus bit, whereby positions of every RB may be indicated even though it is an RB indication of a substantially RB granularity.

This method is helpful to enhancement of resource scheduling flexibility in a system of a narrow bandwidth.

That is, this method may have an effect the same as or similar to that of the SA RA indication method of 1RB granularity.

Table 25 illustrates an example of a method for utilizing the surplus bit to change an RB index set, that is, utilizing it as an RB index set selection bit.

TABLE 25

| Residual bit (reserved) | RB index set selection bit | BW (MHz) | SA [bit] | log2_{N/2} | RB number |
|---|---|---|---|---|---|
| 0 | 0 | 20 | 6 | 5.64385619 | 100 |
| 0 | 0 | 15 | 6 | 5.22881869 | 75 |
| 0 | 1 | 10 | 5 | 4.64385619 | 50 |
| 1 | 1 | 5 | 4 | 3.64385619 | 25 |

TABLE 25-continued

| Residual bit (reserved) | RB index set selection bit | BW (MHz) | SA [bit] | log2_{N/2} | RB number |
|---|---|---|---|---|---|
| 2 | 1 | 3 | 3 | 2.700439718 | 13 |
| 3 | 1 | 1.4 | 2 | 1.584962501 | 6 |

The aforementioned method may be related to the number of basic RBs and SA resource unit used as SA.

That is, when a transmission resource granularity of SA is changed dependently according to a bandwidth, the SA RB indication granularity of the aforementioned method is also changed accordingly.

For example, in a case in which a system bandwidth (BW) is 5 MHz or lower and a resource unit size is 1 RB (it is assumed that an SA resource unit size is 2RB when a system bandwidth is 5 MHz or greater), the SA RA indication granularity is adjusted to be changed to 1RB granularity from 2RB granularity at the 5 MHz or lower in the same manner.

Here, the system bandwidth is described as an example of a reference for changing the SA RA indication granularity, but the SA RA indication granularity may also be changed on the basis of a bandwidth expressed by RB.

FIG. 66 is a flow chart illustrating an example of a method for transmitting and receiving data in D2D communication proposed in this disclosure.

First, a base station (BS) (or an eNB) transmits a resource pool to be used for D2D communication to a D2D transmission terminal (or a D2D Tx UE).

The resource pool includes at least one of a scheduling assignment (SA) resource pool indicating a resource domain in which SA is transmitted and a data resource pool indicating a resource domain in which D2D data is transmitted.

Also, the resource pool is included in a downlink control information (DCI) format related to the D2D communication.

The DCI format is received from the BS via a physical downlink channel (PDCH) and includes control information related to a position of SA and/or D2D data transmission resource.

The DCI format related to the D2D communication may be expressed as a DCI format 5.

Also, the PDCH may be a PDCCH (Physical Downlink Control Channel) or an E-PDCCH (Enhanced Physical Downlink Control Channel).

Also, the SA may be transmitted via a PSCCH (Physical Sidelink Control Channel), and the D2D data may be transmitted via a PSSCH (Physical Sidelink Shared Channel).

Here, the control information indicates a combinatorial index and r is defined as $$\sum_{i=0}^{M-1} \binom{N - s_i}{M - i}.$$

Details thereof may be referred to Table 12.

Here, N denotes the number of RBs within a system bandwidth, M denotes an index of an RB selected from N, and $s_i$ denotes an RB index set including the M number of selected RB indices.

Also, the position of the SA and/or the D2D data transmission resource is determined by the M number of RB indices selected on the basis of the control information from the N number of RB indices.

The M number of selected RB indices is in the form of an RB index set.

Here, a portion of the M number of selected RB indices may indicate a starting position of the SA and/or D2D data transmission resource, and another portion of the M number of selected RB indices may indicate an ending position of the SA and/or D2D data transmission resource.

Or, a portion of the M number of selected RB indices may indicate a position of the SA transmission resource, and another portion of the M number of selected RB indices may indicate a position of the D2D data transmission resource.

Here, a BW of the SA and/or D2D data transmission resource may be fixed or configured through RRC signaling.

Also, in a case in which a transmission resource domain of the SA and a transmission resource domain of the D2D data overlap in a specific subframe, the transmission resource domain of the D2D data is punctured or rate-matched in the overlapping resource domain.

Also, in a case in which a size of a DCI format related to the D2D communication is smaller than a size of the DCI format 0, a zero bit is padded to the DCI format related to the D2D communication until the size of the DCI format is equal to the size of the DCI format 0.

Thereafter, the D2D transmission terminal transmits a scheduling assignment (SA) including information related to D2D data transmission to a D2D reception terminal through the SA resource pool.

Thereafter, the D2D transmission terminal transmits D2D data to the D2D reception terminal.

Device to which Present Invention is Applicable

FIG. 67 is a block diagram of a wireless communication device according to an embodiment of the present invention.

Referring to FIG. 67, a wireless communication system includes a base station (BS) (or an eNB) 6710 and a plurality of terminals (or UEs) 6720 positioned within an area of the BS 6710.

The BS 6710 includes a processor 6711, a memory 6712, and a radio frequency (RF) unit 6713. The processor 6711 implements the function, process, and/or method proposed in FIGS. 1 to 66. Layers of a radio interface protocol may be implemented by the processor 6711. The memory 6712 is connected to the processor 6711 and stores various types of information for driving the processor 6711. The RF unit 6713 is connected to the processor 6711 and transmits and/or receives a radio signal.

The terminal 6720 includes a processor 6721, a memory 6722, and an RF unit 6723. The processor 6721 implements the function, process, and/or method proposed in FIGS. 1 to 66. Layers of a radio interface protocol may be implemented by the processor 6721. The memory 6722 is connected to the processor 6721 and stores various types of information for driving the processor 6721. The RF unit 6723 is connected to the processor 6721 and transmits and/or receives a radio signal.

The memories 6712 and 6722 may be present within or outside the processors 6711, 6721 and connected to the processors 6711 and 6721 through various well known units, respectively.

Also, the BS 6710 and/or the terminal 6720 may have a single antenna or multiple antennas.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or Characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention may be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

INDUSTRIAL APPLICABILITY

In the wireless communication system of this disclosure, an example of the method for performing or supporting D2D communication applied to a 3GPP LTE/LTE-A system has been described, but the method for performing or supporting D2D communication may also be applied to various wireless communication systems other than the 3GPP LTE/LTE-A system.

What is claimed is:

1. A method for transmitting and receiving, by a first terminal, device-to-device (D2D) data in a wireless communication system, the method comprising:
   receiving, from a base station (BS), a resource pool to be used for D2D communication, the resource pool including at least one of a scheduling assignment (SA) resource pool for a resource domain in which an SA is transmitted or a data resource pool for a resource domain in which the D2D data is transmitted;

transmitting, to a second terminal, the SA including information related to D2D data transmission through the SA resource pool; and transmitting the D2D data to the second terminal, wherein:

the resource pool is included in a downlink control information (DCI) format related to the D2D communication;

the DCI format is received from the BS through a physical downlink channel (PDCH);

the DCI format includes control information related to a position of at least one of an SA transmission resource or a D2D data transmission resource;

the control information is a combination index (r);

the position is determined by M number of resource block (RB) indices selected based on the control information from N number of RB indices; and N denotes a number of RBs within a system bandwidth, and M denotes a number of RBs selected from the N number of RBs.

2. The method of claim 1, wherein the M number of selected RB indices is in the form of an RB index set.

3. The method of claim 1, wherein a portion of the M number of selected RB indices indicates a starting position of the at least one of the SA transmission resource or the D2D data transmission resource, and another portion of the M number of selected RB indices indicates an ending position of the at least one of the SA transmission resource or the D2D data transmission resource.

4. The method of claim 1, wherein a portion of the M number of selected RB indices indicates a position of the SA transmission resource, and another portion of the M number of selected RB indices indicates a position of the D2D data transmission resource.

5. The method of claim 1, wherein a bandwidth (BW) of the at least one of the SA transmission resource or the D2D data transmission resource is fixed or configured through RRC signaling.

6. The method of claim 1, wherein when a transmission resource domain of the SA and a transmission resource domain of the D2D data overlap in a specific subframe, the transmission resource domain of the D2D data is punctured or rate-matched in the overlapping resource domain.

7. The method of claim 1, wherein a DCI format related to the D2D communication is DCI format 5.

8. The method of claim 1, wherein the PDCH is a physical downlink control channel (PDCCH) or an enhanced physical downlink control channel (E-PDCCH).

9. The method of claim 1, wherein the SA is transmitted via a physical sidelink control channel (PSCCH), and the D2D data is transmitted via a physical sidelink shared channel (PSSCH).

10. A first terminal, for transmitting and receiving device-to-device (D2D) data in a wireless communication system, the first terminal comprising:

a radio frequency (RF) unit transmitting and receiving a wireless signal; and a processor controlling the first terminal, wherein the processor controls the RF unit to:

receive, from a base station (BS), a resource pool to be used for D2D communication, the resource pool including at least one of a scheduling assignment (SA) resource pool for a resource domain in which an SA is transmitted and a data resource pool for a resource domain in which the D2D data is transmitted;

transmit, to a second terminal, the SA including information related to D2D data transmission through the SA resource pool; and transmit the D2D data to the second terminal, wherein:

the resource pool is included in a downlink control information (DCI) format related to the D2D communication, the DCI format is received from the BS through a physical downlink channel (PDCH);

the DCI format includes control information related to a position of at least one of an SA transmission resource or a D2D data transmission resource;

the control information is a combination index (r);

the position is determined by M number of resource block (RB) indices selected based on the control information from N number of RB indices; and N denotes a number of RBs within a system bandwidth, and M denotes a number of RBs selected from the N number of RBs.

* * * * *